(12) United States Patent
McCandlish et al.

(10) Patent No.: US 11,517,874 B2
(45) Date of Patent: Dec. 6, 2022

(54) METHOD AND APPARATUS FOR CURING $CO_2$ COMPOSITE MATERIAL OBJECTS AT NEAR AMBIENT TEMPERATURE AND PRESSURE

(71) Applicant: Solidia Technologies, Inc., Piscataway, NJ (US)

(72) Inventors: Larry E. McCandlish, Highland Park, NJ (US); Orlando Narine, Westfield, NJ (US); Daniel Castoro, Lincroft, NJ (US)

(73) Assignee: SOLIDIA TECHNOLOGIES, INC., Piscataway, NJ (US)

( * ) Notice: Subject to any disclaimer, the term of this patent is extended or adjusted under 35 U.S.C. 154(b) by 628 days.

(21) Appl. No.: 14/602,313

(22) Filed: Jan. 22, 2015

(65) Prior Publication Data

US 2015/0225295 A1 Aug. 13, 2015

Related U.S. Application Data

(60) Provisional application No. 61/930,404, filed on Jan. 22, 2014, provisional application No. 62/033,366, filed on Aug. 5, 2014.

(51) Int. Cl.
*C04B 22/10* (2006.01)
*C04B 22/00* (2006.01)
(Continued)

(52) U.S. Cl.
CPC ............. *B01J 19/24* (2013.01); *B28B 11/245* (2013.01); *C04B 28/04* (2013.01); *C04B 40/024* (2013.01);
(Continued)

(58) Field of Classification Search
CPC .............. C04B 20/0096; C04B 40/025; C04B 40/0295; C04B 40/0231; C04B 28/188;
(Continued)

(56) References Cited

U.S. PATENT DOCUMENTS

| | | | | |
|---|---|---|---|---|
| 1,916,949 A | * | 7/1933 | Harrison | ................. C04B 28/10 106/681 |
| 4,117,059 A | | 9/1978 | Murray | |

(Continued)

FOREIGN PATENT DOCUMENTS

| | | |
|---|---|---|
| CN | 101139182 A | 3/2008 |
| DE | 19646991 A1 | 5/1998 |

(Continued)

OTHER PUBLICATIONS

Del Williams, To Tarp or Not to Tarp, http://www.mcsmag.com/tarp-tarp/.*

(Continued)

*Primary Examiner* — Shuangyi Abu Ali
(74) *Attorney, Agent, or Firm* — Dentons US LLP

(57) ABSTRACT

Apparatus and methods for curing composite compositions that react with $CO_2$. The apparatus in general includes an easily transportable and easily assembled curing structure, such as a plastic sheet housing supported by gas pressure and/or by mechanical supports. Apparatus for providing reagent $CO_2$, for measuring water content and for removing water, and for controlling temperature, flow rates and flow directions through the curing structure. Examples of curing procedures and examples of cured materials in desired shapes are described.

16 Claims, 52 Drawing Sheets

(51) Int. Cl.
*B01J 19/24* (2006.01)
*B28B 11/24* (2006.01)
*C04B 28/04* (2006.01)
*C04B 40/02* (2006.01)

(52) U.S. Cl.
CPC . *C04B 40/0231* (2013.01); *B01J 2219/00051* (2013.01); *Y02P 40/18* (2015.11)

(58) Field of Classification Search
CPC ....... C04B 14/043; C04B 24/06; C04B 28/04; C04B 40/024; C04B 20/12; C04B 14/06; C04B 2103/22; C04B 22/0013; C04B 22/085; C04B 22/124; C04B 22/16; C04B 24/10; C04B 40/0263; C04B 40/0281; C04B 22/04; C04B 28/02; C04B 14/10; C04B 14/28; C04B 14/304; C04B 18/08; C04B 18/141; C04B 20/1066; C04B 20/107; C04B 2111/00017; C04B 22/064; C04B 22/082; C04B 22/142; C04B 22/143; C04B 24/2647; C04B 24/38; C04B 28/10; C04B 28/18; C04B 28/24; C04B 32/02; C04B 7/32; C04B 7/323; C04B 7/345; C04B 12/04; C04B 14/30; C04B 14/307; C04B 14/308; C04B 2103/32; C04B 2103/408; C04B 2111/21; C04B 2111/802; C04B 24/24; C04B 24/286; C04B 26/02; C04B 35/16; C04B 35/62876; C04B 40/0039; C04B 7/43; C04B 7/44; C04B 7/4476; Y02P 40/18; Y02P 40/121; B01J 2219/00051; B01J 19/0013; B01J 19/0033; B01J 19/24; B01J 2219/00164; B28B 11/245; B28B 11/247; B28B 1/00; B28B 7/186; C01B 33/24; E04B 5/02; F27B 5/04; G05B 19/4142; G05B 2219/49056; Y02W 30/92; Y02W 30/94
See application file for complete search history.

(56) References Cited

U.S. PATENT DOCUMENTS

| | | | |
|---|---|---|---|
| 4,117,060 | A | 9/1978 | Murray |
| 4,362,679 | A | 12/1982 | Malinowski |
| 4,436,498 | A | 3/1984 | Murray |
| 4,772,439 | A | 9/1988 | Trevino-Gonzalez |
| 4,862,827 | A | 9/1989 | Getson |
| 5,089,198 | A | 2/1992 | Leach |
| 5,694,701 | A | 12/1997 | Huelsman et al. |
| 5,800,752 | A | 9/1998 | Charlebois |
| 5,935,317 | A | 8/1999 | Soroushian et al. |
| 6,065,224 | A | 5/2000 | Eigner |
| 6,308,436 | B1 | 10/2001 | Stipp |
| 7,225,561 | B2 | 6/2007 | Louw et al. |
| 7,272,895 | B2 | 9/2007 | La Gioia |
| 7,363,729 | B2 | 4/2008 | Tanaka et al. |
| 7,390,444 | B2 | 6/2008 | Ramme et al. |
| 7,877,895 | B2 | 2/2011 | Otsuka et al. |
| 8,096,064 | B2 | 1/2012 | Matsunaga et al. |
| 8,114,367 | B2 | 2/2012 | Riman et al. |
| 8,313,802 | B2 | 11/2012 | Riman et al. |
| 8,407,912 | B2 | 4/2013 | Hubbard et al. |
| 8,499,471 | B2 | 8/2013 | Coronella et al. |
| 8,709,960 | B2 | 4/2014 | Riman et al. |
| 8,845,940 | B2 | 9/2014 | Niven et al. |
| 8,898,927 | B2 | 12/2014 | Shan et al. |
| 9,216,926 | B2 | 12/2015 | Riman et al. |
| 2009/0142578 | A1 | 6/2009 | Riman et al. |
| 2011/0104469 | A1 | 5/2011 | Riman et al. |
| 2012/0055560 | A1* | 3/2012 | Gopalan ............... F15C 1/22 137/14 |
| 2012/0312194 | A1 | 12/2012 | Riman et al. |
| 2013/0122267 | A1 | 5/2013 | Riman et al. |
| 2014/0127450 | A1 | 5/2014 | Riman et al. |
| 2014/0127458 | A1 | 5/2014 | Zambrzycki et al. |
| 2014/0322083 | A1 | 10/2014 | Kuppler et al. |
| 2014/0361471 | A1 | 12/2014 | Hu et al. |

FOREIGN PATENT DOCUMENTS

| | | |
|---|---|---|
| EP | 2092831 A1 | 8/2009 |
| GB | 2396209 A | 6/2004 |
| JP | 2-18368 A | 1/1990 |
| JP | 05093529 A | 4/1993 |
| JP | 05339070 A * | 12/1993 |
| JP | 2006-143531 A | 6/2006 |
| JP | 2010-095443 A | 4/2010 |
| SU | 88345 | 1/1951 |
| SU | 1717371 A1 | 3/1992 |
| WO | 2007131989 A2 | 11/2007 |
| WO | 2009102360 A2 | 8/2009 |
| WO | 2011053598 A1 | 5/2011 |
| WO | 2011090967 A1 | 7/2011 |
| WO | 2012079173 A1 | 6/2012 |
| WO | 2014036777 A1 | 3/2014 |
| WO | 2014160168 A1 | 10/2014 |

OTHER PUBLICATIONS

The Chamtech Rollcov-RTM System: Retractable Curing Enclosure. Nov. 2009, http://www.bft-international.com/en/artikel/bft_2009-11_Retractable_Curing_Enclosure_339903.html.*
"About Temperature". Dec. 31, 2005. https://web.archive.org/web/20051231152955/http://eo.ucar.edu/skymath/tmp2.html.*
Girard, Jeff. Temperature and relative humidity: What they mean for you and your concrete countertops. May 11, 2012. http://www.concretecountertopinstitute.com/blog/tag/curing-practices/.*
How to Measure Carbon Dioxide. Vaisala. 2012. http://www.vaisala.com/Vaisala%20Documents/Application%20notes/CEN-TIA-Parameter-How-to-measure-CO2-Application-note-B211228EN-A.pdf.*
JP2010095443A translation 2010.*
List of References in 14209238 dated Aug. 10, 2015.
International Search Report for PCT/US 2014/025958. dated Sep. 4, 2014.
International Search Report for PCT/US2015/012333. dated Jul. 15, 2015.
Written Opinion for PCT/US2015/012333. dated Jul. 15, 2015.
European Search Report, for Application No. 15740850.1, dated Jun. 5, 2020.
Canadian Examination Report, for Application No. 2937822, dated Mar. 30, 2021.

* cited by examiner (a)

(b)

(c)

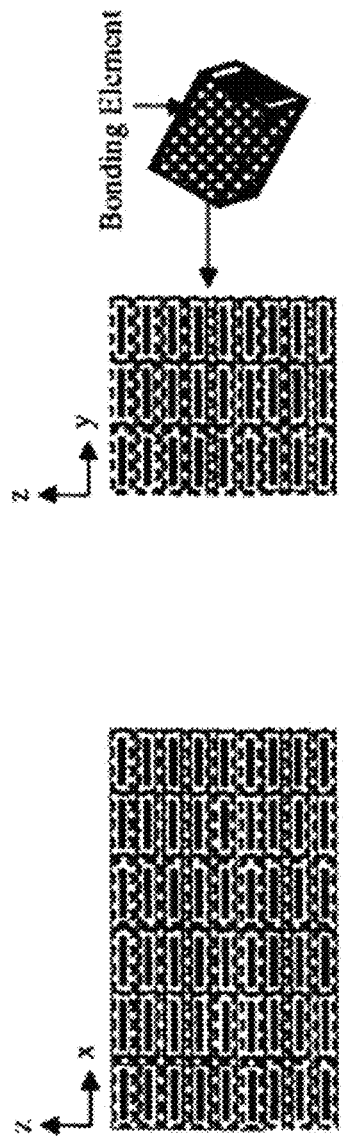
FIG. 13E
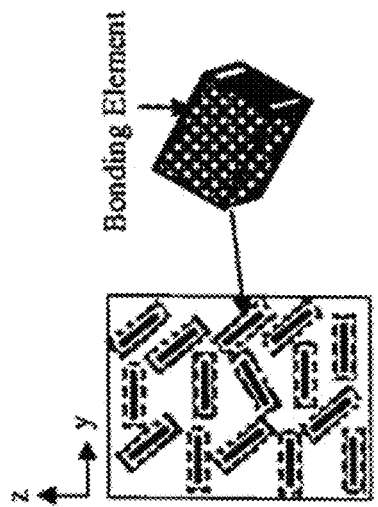
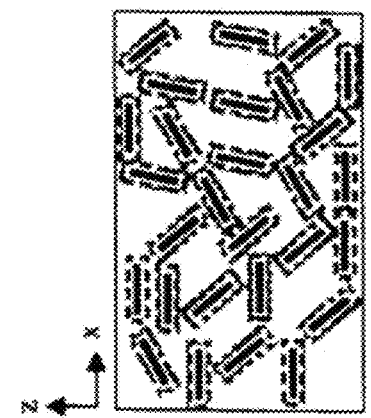
FIG. 13F

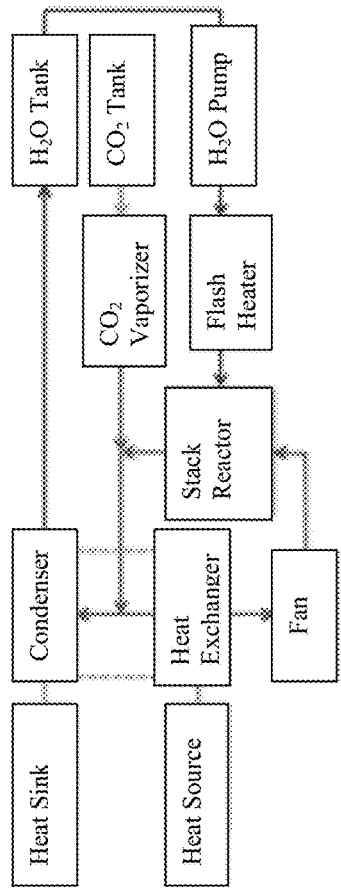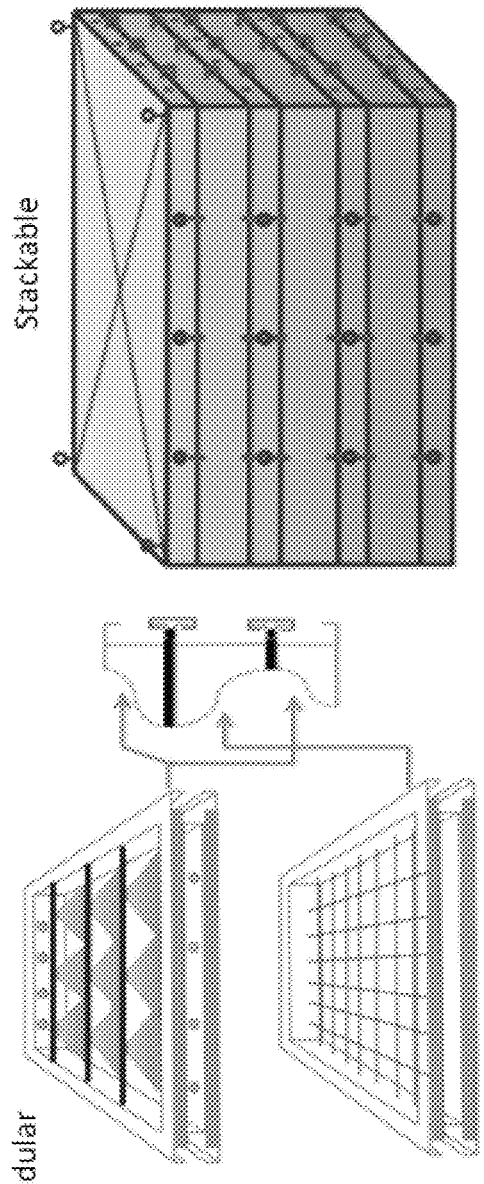
FIG. 14A FIG. 14B FIG. 14C FIG. 14D

Vibratory Casting & Simulation Setup

Re-infiltration with Water by Submersion weighted gas seal 3830   polymer sheet cover 3810   gas outlet hose 3820

Cable supports 3910

Inlet duct 4010   fans 4030  cables 4050 outlet duct 4020   end wall 4040   hygrometer 4060   pressure sensor 4070 diverter dampers 4610 at gas processing unit differential pressure transmitter 5410

$CO_2$ concentration monitor 5510 gas temperature controllers 5610 humidity/temperature sensor 5710

FIG. 58 Blower 5830 water condenser 5810 butterfly valves 5840 chiller 5820

METHOD AND APPARATUS FOR CURING CO₂ COMPOSITE MATERIAL OBJECTS AT NEAR AMBIENT TEMPERATURE AND PRESSURE

CROSS-REFERENCE TO RELATED APPLICATIONS

This application claims priority to and the benefit of co-pending U.S. provisional patent application Ser. No. 61/930,404, filed Jan. 22, 2014, and co-pending U.S. provisional patent application Ser. No. 62/033,366, filed Aug. 5, 2014, each of which applications is incorporated herein by reference in its entirety.

FIELD OF THE INVENTION

The invention relates to materials processing in general and particularly to apparatus and methods for curing composite materials.

BACKGROUND OF THE INVENTION

It is known in the art to cure conventional cements and concretes using hydration. This has been practiced in various forms for centuries. One of the problems associated with conventional materials that are cured by hydration is that once the water needed to effect the cure is mixed into the composition to be cured, a finite time period starts during which all of the positioning, compacting and finishing steps that are intended to be performed must be completed. If there is a delay for any reason, there is a danger that the wet mix will either have to be discarded before it can be used as intended, or will set in locations that are disadvantageous, such as in mixing and transporting equipment. Such adverse outcomes can and do cause additional time effort and money to be expended needlessly.

There is a need for systems and methods that allow the curing of composite materials without the limitation of a set time for completing the curing process.

SUMMARY OF THE INVENTION

According to one aspect, the invention features a curing apparatus for material that cures by reaction with a gaseous reagent. The curing apparatus comprises a housing the housing having a plurality of ports, each of the plurality of ports configured to allow gas to enter or exit, at least one of the ports being an inlet and at least one of the ports being an outlet, the housing configured to contain a material to be cured by reaction with a gaseous reagent, the housing configured to permit the control for the gaseous reagent of at least one of a flow rate, a partial pressure, an inlet temperature, an outlet temperature, a gas composition at the inlet and a gas composition at the outlet; and a gas delivery system for the gaseous reagent, the gas delivery system configured to supply the gaseous reagent at, at least, one of a desired flow rate, a desired partial pressure and/or an inlet temperature, the gas delivery system configured to control a gas flow direction in the housing, the gas flow direction being defined as a flow of the gas within the housing from a first one or more of the plurality of ports to another one or more of the plurality of ports, the gas delivery system configured to alter the gas flow direction from time to time.

In one embodiment, the gaseous reagent is $CO_2$.

In one embodiment, the curing apparatus further comprises a heated bed configured to support the material to be cured by reaction with a gaseous reagent.

In another embodiment, the housing comprises a flexible membrane material, the membrane material being impervious to the gaseous reagent.

In yet another embodiment, the housing is supported by a pressure of the gaseous reagent.

In still another embodiment, the housing comprises support cables.

In a further embodiment, the housing comprises ribs.

In yet a further embodiment, the curing apparatus further comprises a heater located at a selected one of the inlet and the outlet.

In an additional embodiment, the curing apparatus further comprises a water condenser configured to remove water vapor from the gaseous reagent.

In one more embodiment, the gas delivery system includes valves configured to control the direction of flow of the gaseous reagent.

In still a further embodiment, the curing apparatus further comprises a hygrometer.

In one more embodiment, the curing apparatus further comprises a humidity measuring device.

In one embodiment, the curing apparatus further comprises at least one of a $CO_2$ flow meter and a $CO_2$ concentration meter.

In another embodiment, the curing apparatus further comprises a temperature measurement device.

In still another embodiment, the temperature measurement device is a selected one of a thermocouple, a thermometer and an RTD.

According to another aspect, the invention relates to a process of carbonating a material in a $CO_2$-bearing reagent gas. The process comprises the steps of: positioning a material to be carbonated in a housing having a membrane constructed from material impervious to the $CO_2$-bearing reagent gas; and controlling during the process a gas flow direction in the housing, the gas flow direction being reversed from time to time; thereby causing the carbonation reaction to proceed substantially uniformly through the material.

In one embodiment, the process further comprises the step of controlling at least one process variable selected from the group of process variables consisting of a flow rate, a partial pressure, an inlet temperature, an outlet temperature, a gas composition at an inlet, and a gas composition at an outlet.

In another embodiment, the temperature of the material to be carbonated is controlled.

In yet another embodiment, the water content of the material to be carbonated is controlled.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIGS. 13(a)-13(f) are schematic illustrations of side view and cross section views of composite materials according to exemplary embodiments of the present invention, illustrating (a) 1D oriented fiber-shaped bonding elements in a dilute bonding matrix (bonding elements are not touching), (b) 2D oriented platelet shaped bonding elements in a dilute bonding matrix (bonding elements are not touching), (c) 3D oriented platelet shaped bonding elements in a dilute bonding matrix (bonding elements are not touching), and (d) randomly oriented platelet shaped bonding elements in a dilute bonding matrix (bonding elements are not touching), wherein the composite materials includes the bonding matrix and filler components such as polymers, metals, inorganic particles, aggregates etc., (e) a concentrated bonding matrix (with a volume fraction sufficient to establish a percolation network) of bonding elements where the matrix is 3D oriented, and (f) a concentrated bonding matrix (with a volume fraction sufficient to establish a percolation network) of randomly oriented bonding elements, wherein filler components such as polymers, metals, inorganic particles, aggregates etc. may be included.

FIG. 14A is a schematic diagram of a field deployable stackable reactor.

FIG. 14B is a schematic diagram of one layer of a modular stackable reactor which carries material to be cured.

FIG. 14C is a schematic diagram of a spacer module.

FIG. 14D is a schematic diagram showing a stack of a plurality of modules as illustrated in FIG. 14B separated by spacers as illustrated in FIG. 14C.

DETAILED DESCRIPTION

Chemical Discussion

Figure 1:
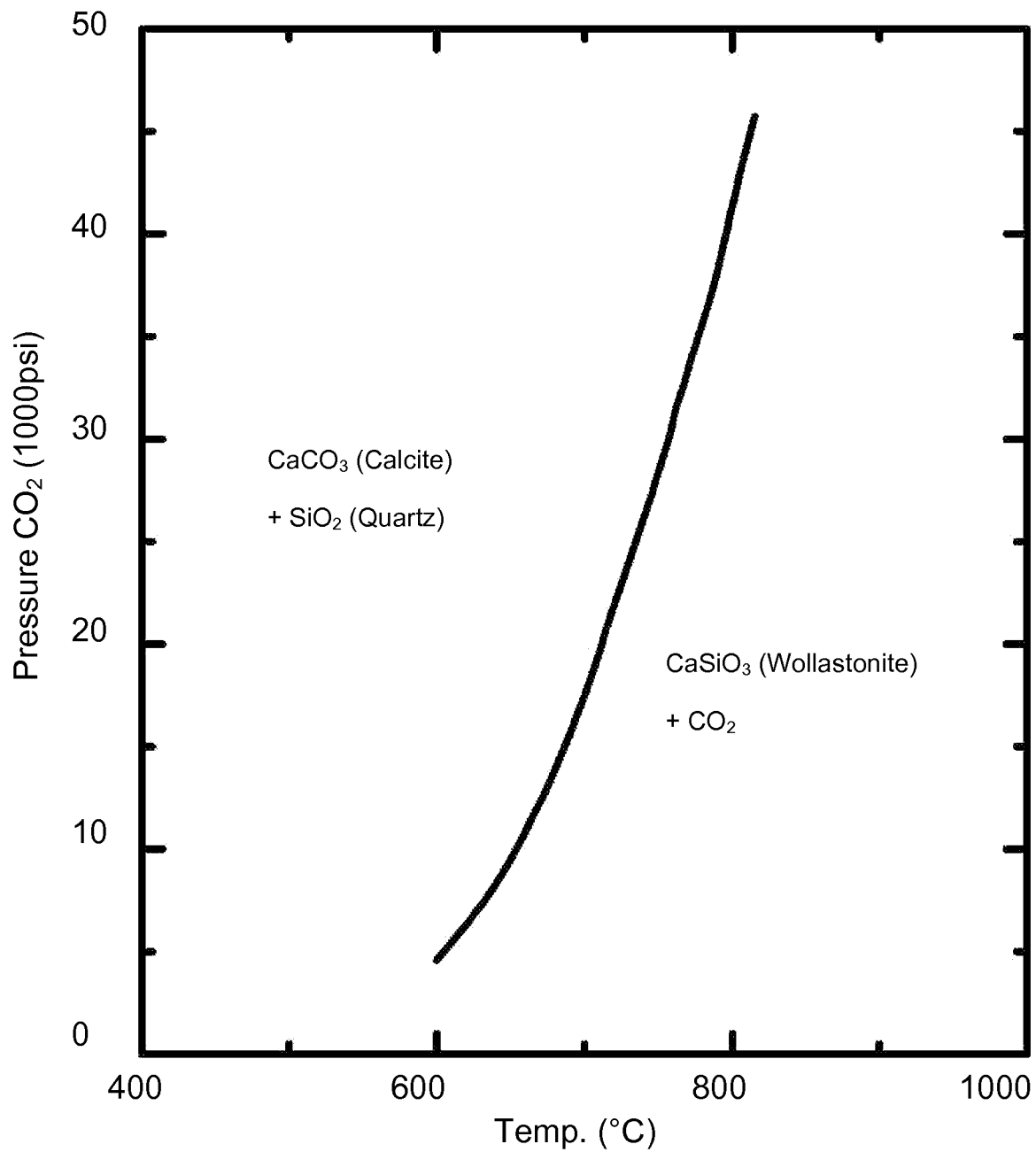
FIG. 1 is a pressure-temperature phase diagram showing the phases present in the reversible reaction $CaCO_3 + SiO_2 \leftrightarrow CaSiO_3$ (Wollastonite) $+ CO_2$.
Figure 2:
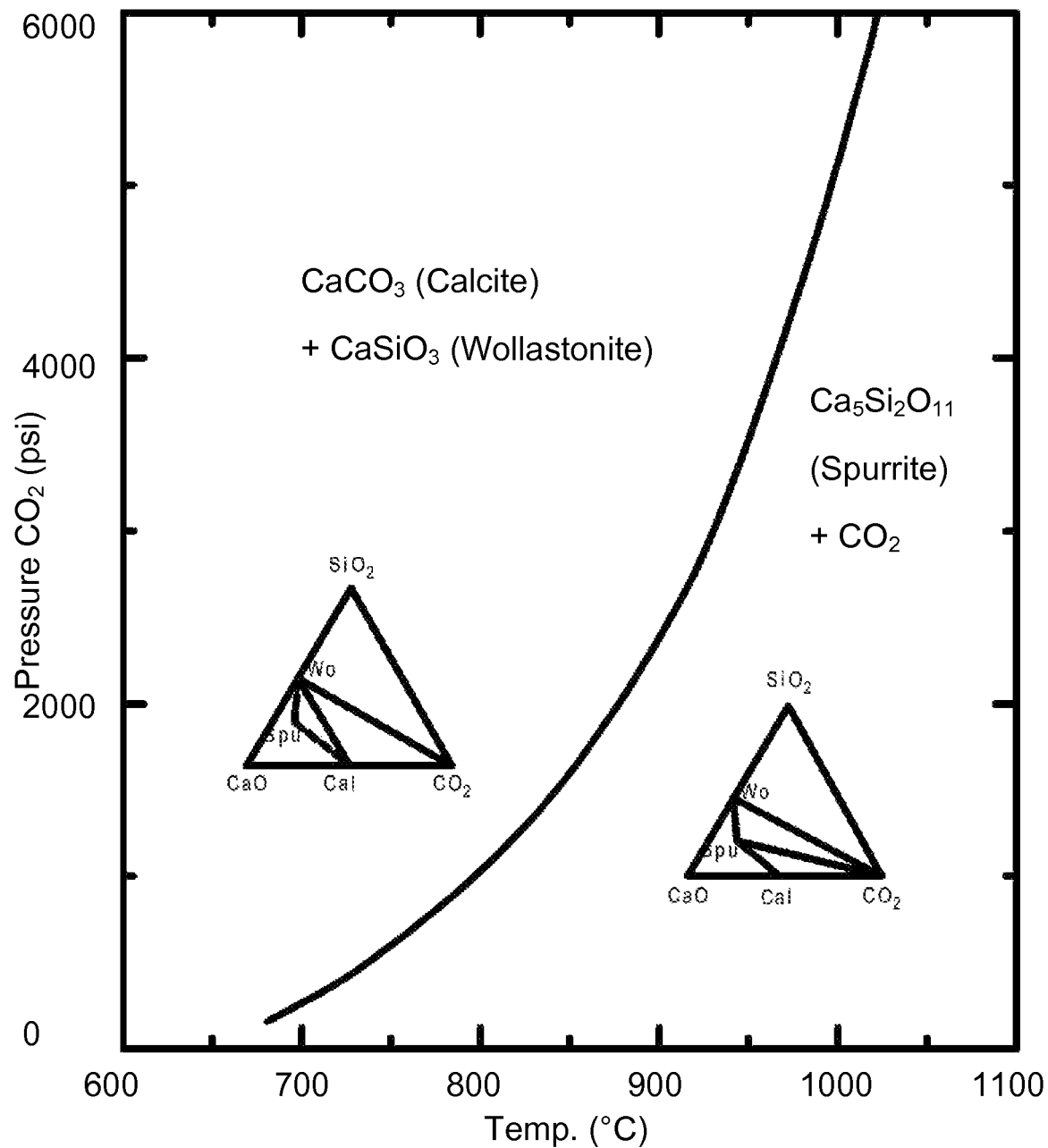
FIG. 2 is a pressure-temperature phase diagram showing the phases present in the reversible reaction $3CaCO_3 + 2CaSiO_3 \leftrightarrow 2Ca_2SiO_4 \cdot CaCO_3 + CO_2$.
Figure 3:
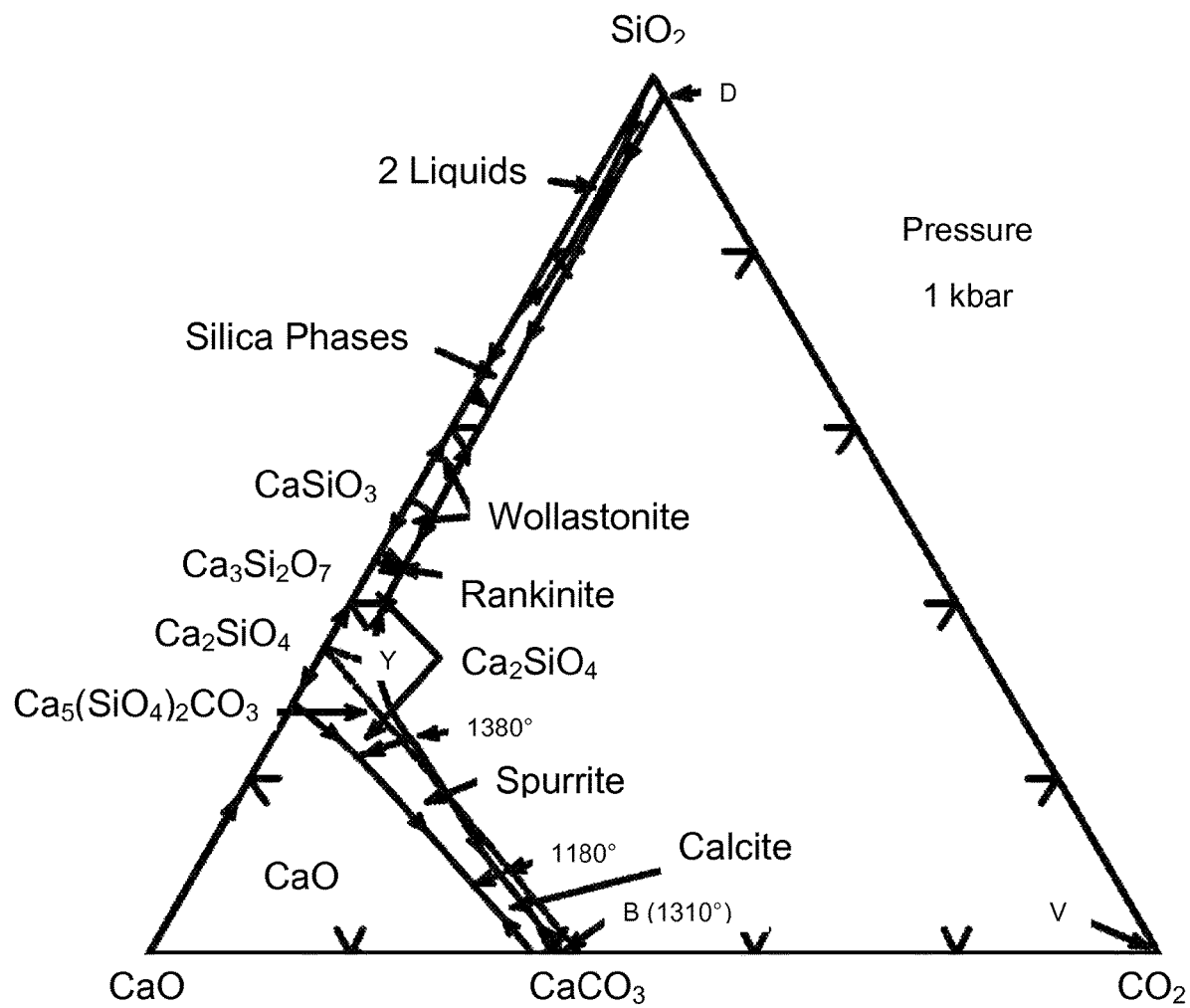
FIG. 3 is a phase diagram of the $CaO$—$SiO_2$—$CO_2$ system at a pressure of 1 kilobar.
Figure 4:
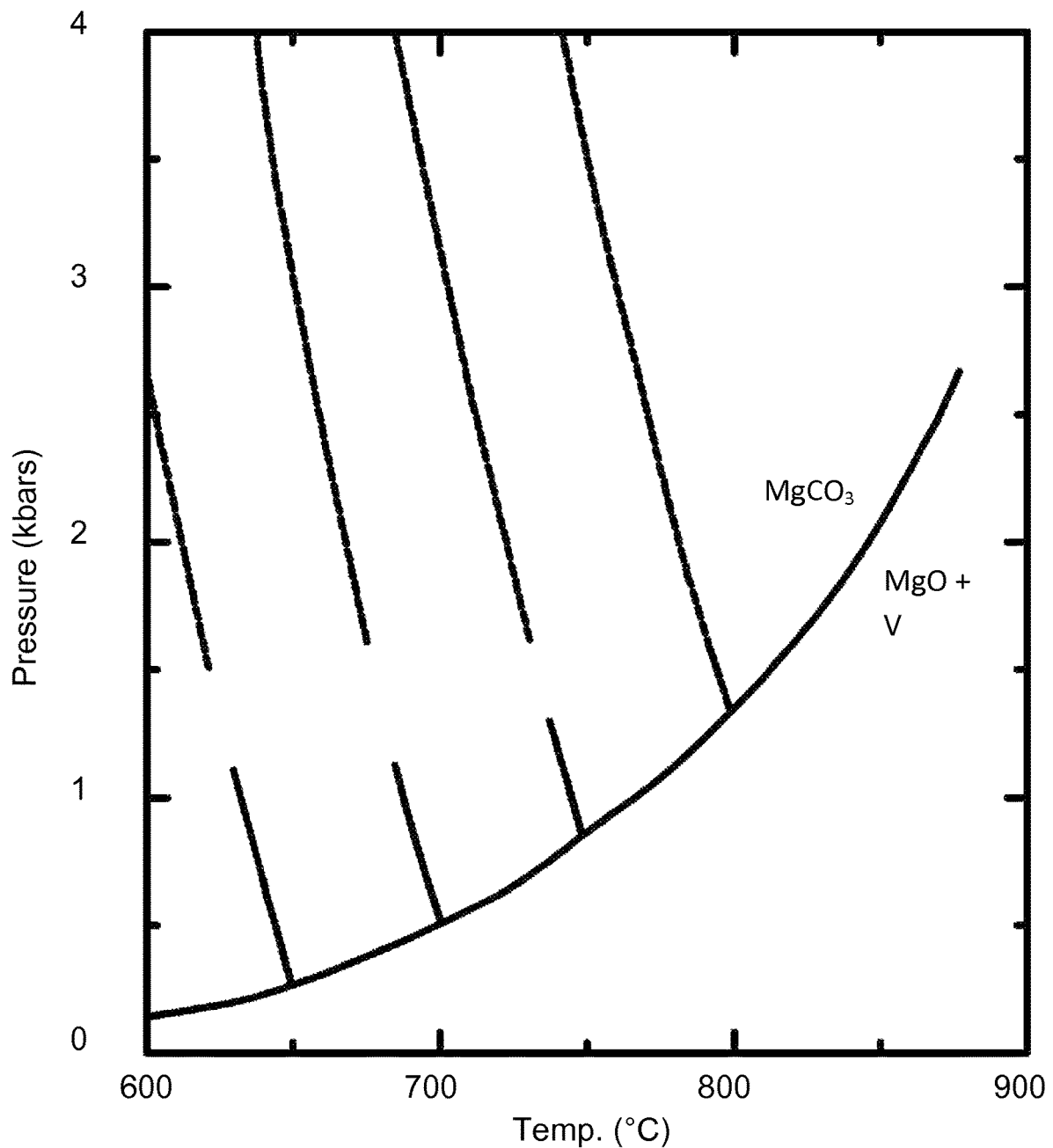
FIG. 4 is a pressure-temperature phase diagram showing the phases present in the reversible reaction $MgO + CO_2 \leftrightarrow MgCO_3$.
Figure 5:
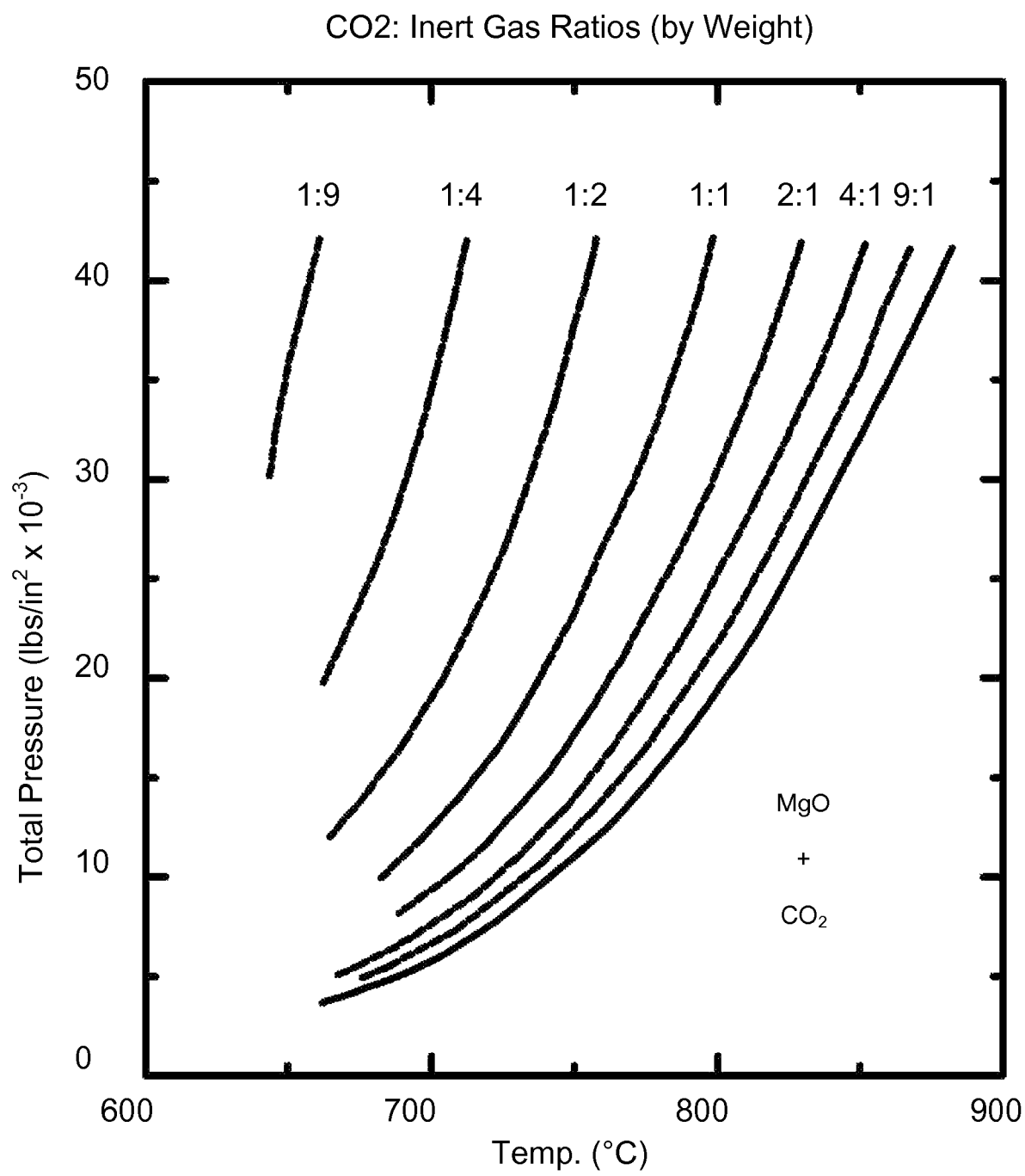
FIG. 5 is a pressure-temperature phase diagram showing the equilibrium curves for the reversible reaction $MgO + CO_2 \leftrightarrow MgCO_3$ as a function of the proportion of $CO_2$ in an inert gas.
Figure 6:
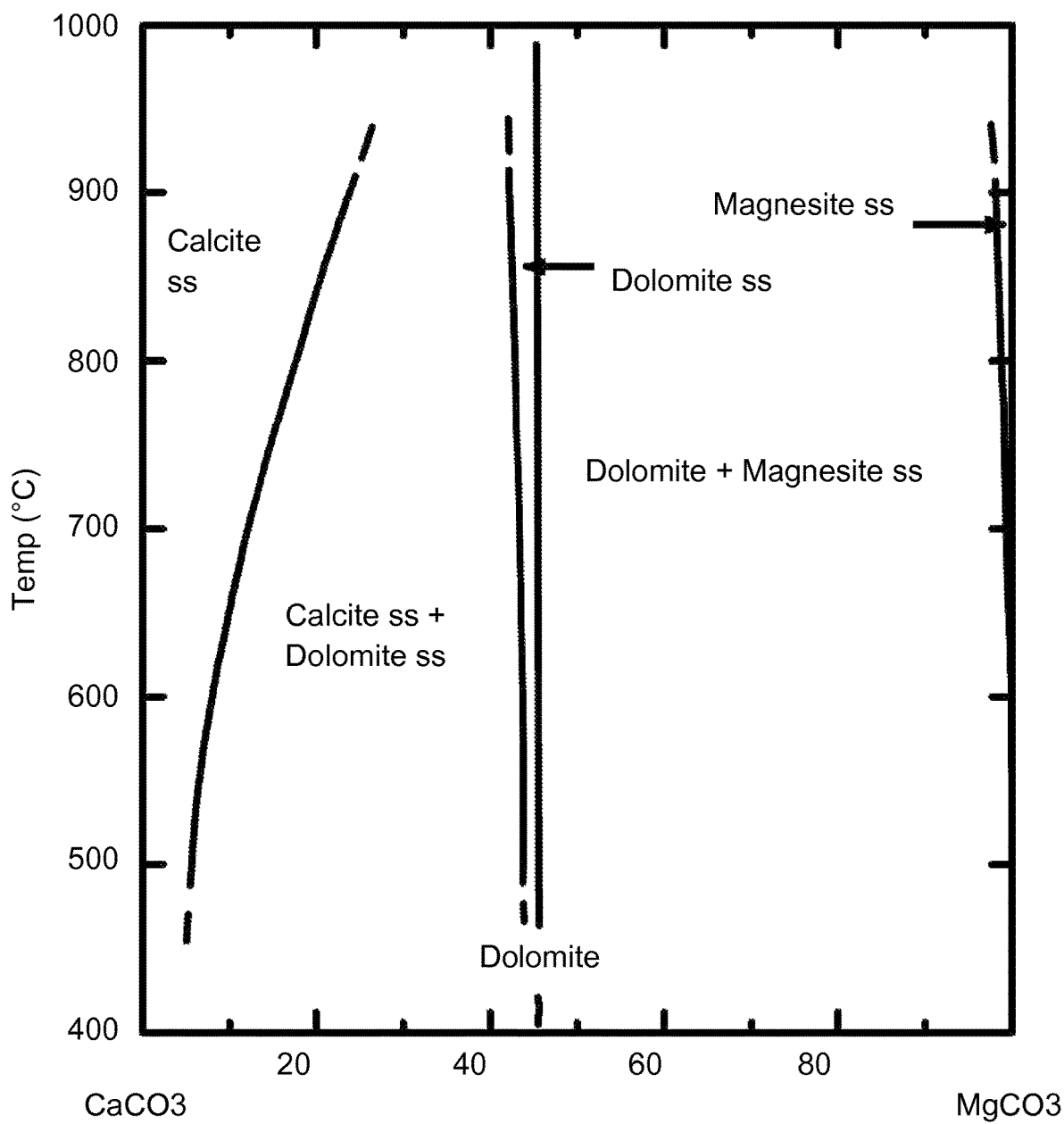
FIG. 6 is a temperature-composition phase diagram that illustrates the stability regions for various phases in the $CaCO_3$—$MgCO_3$ system.
Figure 7:
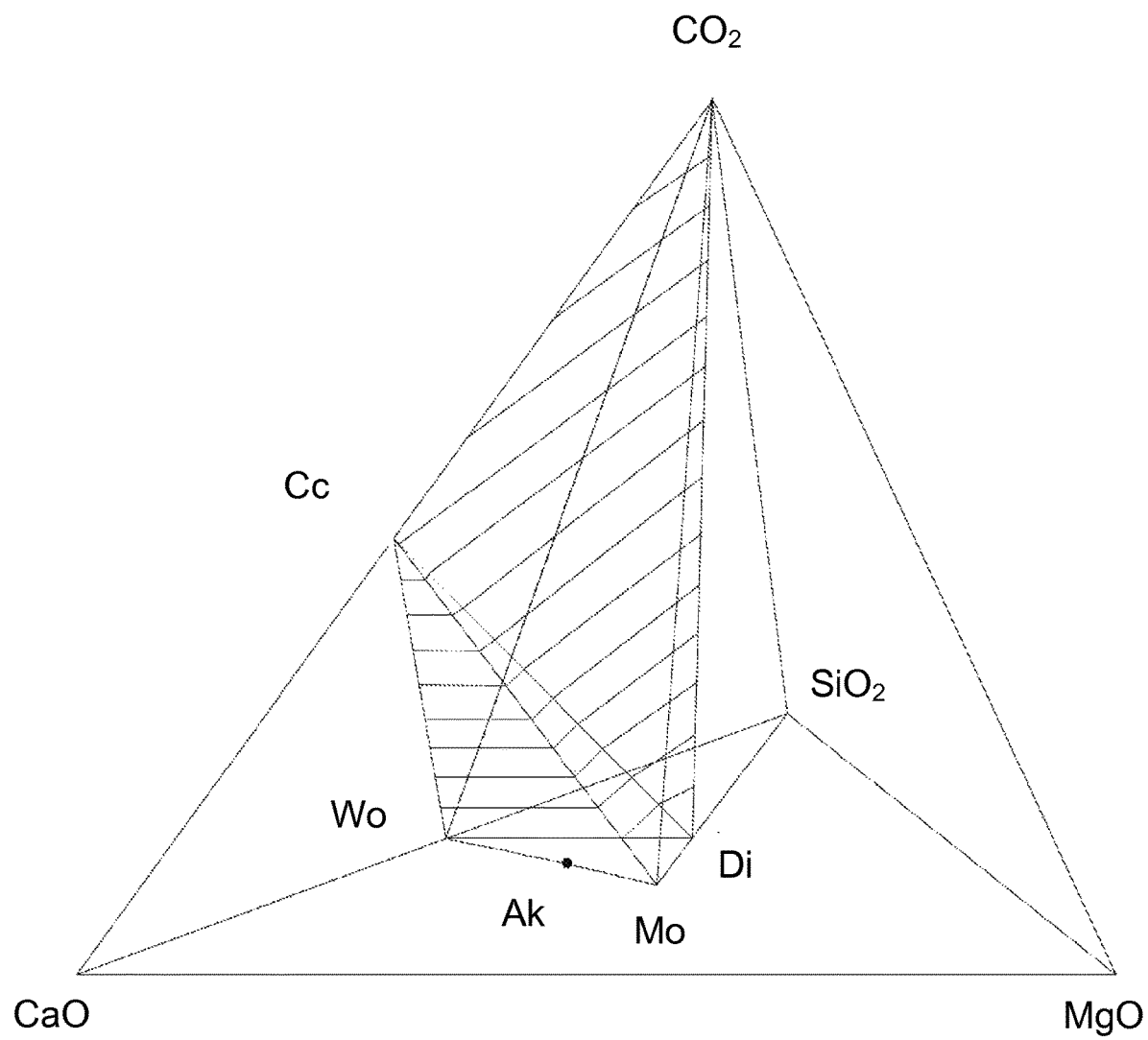
FIG. 7 is a tetrahedron diagram illustrating the phase relationships among the compounds CaO, MgO, $SiO_2$ and $CO_2$, and showing the $CO_2$ deficient region below the Cc-Di-Wo and the CC-Wo-Mo planes (shaded), where Cc denotes calcite, Wo denotes Wollastonite, Ak denotes Akermanite, Di denotes diopside, and Mo denotes monticellite ($CaMgSiO_4$).
Figure 8:
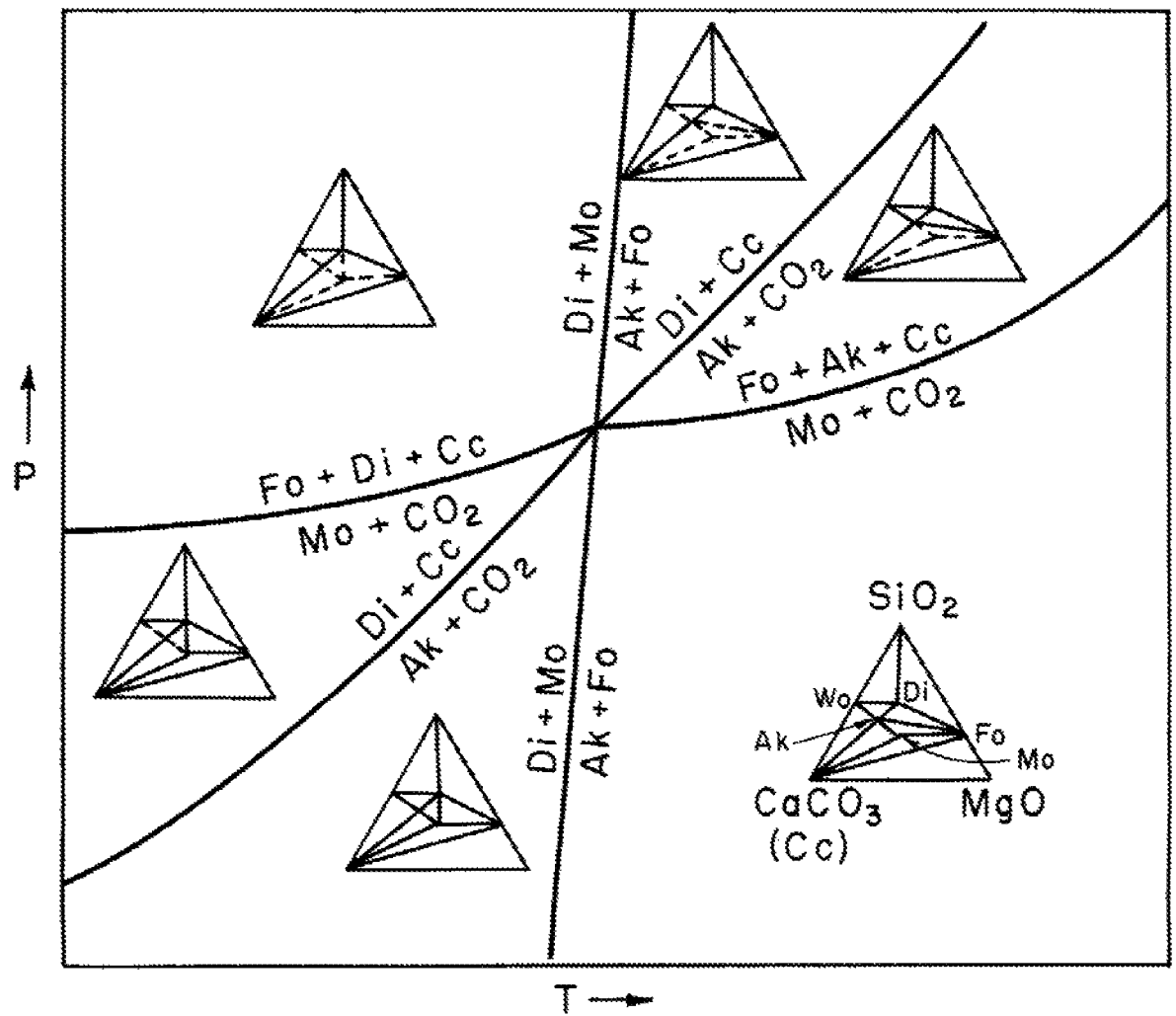
FIG. 8 is a pressure-temperature phase diagram illustrating the phase relationships among the compounds CaO, MgO, $SiO_2$ and $CO_2$, with univariant curves emanating from the quaternary invariant point involving the phases calcite (Cc), diopside (Di), forsterite (Fo), monticellite (Mo), Akermanite (Ak), and $CO_2$. The inset is the phase diagram for the three compound system $CaCO_3$, MgO, $SiO_2$.

This invention provides apparatus and methods used to manufacture novel composite materials that are cured predominantly by a $CO_2$ consumption reaction. The materials exhibit useful properties and can be readily produced from widely available, low cost precursor materials by a process suitable for large-scale production with minimal environmental impact. The precursor materials include inexpensive and abundant calcium silicate rich materials, fine particles and coarse particles. The calcium silicate rich materials may be comprised of ground Wollastonite. The fine and coarse particles may be comprised of ground limestone or other calcium carbonate based materials, ground quartz or other $SiO_2$ based materials, sand and crushed rock. The fine and coarse particles may also be comprised of crushed minerals such as granite, mica and feldspar. Other process components include water and $CO_2$. Various additives can be used to modify and fine-tune the physical appearance and/or mechanical properties of the resulting composite material, such as additives selected from one or more of pigments (e.g., black iron oxide, cobalt oxide and chromium oxide), colored glass and/or colored quartz. Additives regarding water usage reduction and changes in rheology can also be used.

The composite materials can be produced, as disclosed herein, using the energy-efficient Hydrothermal Liquid Phase Sintering (HLPS) process to create bonding elements which hold together the various components of the composite material. The composite materials can be manufactured at low cost and with favorable environmental impact. For example in preferred embodiments of the invention, $CO_2$ is used as a reactive species resulting in sequestration of $CO_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because gaseous diffusion and liquid diffusion in a solution (aqueous or nonaqueous) are used to transport reactive species instead of using a high melting point fluid or high temperature solid-state medium.

Discussions of various features of HLPS can be found in U.S. Pat. No. 8,114,367, U.S. Pub. No. US 2009/0143211 (Application Ser. No. 12/271,566), U.S. Pub. No. US 2011/0104469 (Application Ser. No. 12/984,299), U.S. Pub. No. 20090142578 (Application Ser. No. 12/271,513), WO 2009/102360 (PCT/US2008/083606), WO 2011/053598 (PCT/US2010/054146), WO 2011/090967 (PCT/US2011/021623), U.S. application Ser. No. 13/411,218 filed Mar. 2, 2012 (Riman et al.), U.S. application Ser. No. 13/491,098 filed Jun. 7, 2012 (Riman et al), U.S. Provisional Patent Application No. 61/708,423 filed Oct. 1, 2012, and U.S. Provisional Patent Application Nos. 61/709,435, 61/709,453, 61/709,461, and 61/709,476, all filed Oct. 4, 2012, each of which is expressly incorporated herein by reference in its entirety for all purposes.

As used herein, the term "calcium silicate" refers to naturally-occurring minerals or synthetic materials that are comprised of one or more of a group of calcium-silicon-containing compounds including $CaSiO_3$ (also known as "Wollastonite" or "pseudo-wollastonite" and sometimes formulated as $CaO.SiO_2$), $Ca_3Si_2O_7$ (also known as "Rankinite" and sometimes formulated as $3CaO.2SiO_2$), $Ca_2SiO_4$ (also known as "Belite" and sometimes formulated as $2CaO.SiO_2$), $Ca_3SiO_5$ (also known as "Alite" and sometimes formulated as $3CaO.SiO_2$), and $Ca_5(SiO_4)_2CO_3$ (also known as "Spurrite" and sometimes formulated as $2Ca_2SiO_4.CaCO_3$), each of which materials may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight. FIG. 1 through FIG. 8 are phase diagrams that show various phase interrelationships among some of the materials described.

It should be understood that, compositions and methods disclosed herein can be adopted to use magnesium silicate in place of or in addition to calcium silicate. As used herein, the term "magnesium silicate" refers to nationally-occurring minerals or synthetic materials that are comprised of one or more a groups of magnesium-silicon-containing compounds including, for example, $Mg_2SiO_4$ (also known as "Fosterite"), $Mg_3Si_4O_{10}(OH)_2$ (also known as "Talc"), and $CaMgSiO_4$ (also known as "Monticellite"), each of which materials may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

The term "quartz", as used herein, refers to any $SiO_2$-based material, including common sands (construction and masonry), as well as glass and recycled glass. The term also includes any other recycled natural and synthetic materials that contain significant amounts of $SiO_2$ (e.g., mica sometimes formulated as $KAl_2(AlSi_3O_{10})$).

In certain preferred embodiments, the plurality of bonding elements are prepared by chemical transformation from ground Wollastonite (or a non-Wollastonite precursor calcium silicate or magnesium silicate) by reacting it with $CO_2$ via a gas-assisted HLPS process.

In certain embodiments, the composite material is characterized by a compressive strength from about 90 MPa to about 175 MPa (e.g., about 90 MPa to about 150 MPa, about 90 MPa to about 140 MPa, about 90 MPa to about 130 MPa, about 90 MPa to about 120 MPa, about 90 MPa to about 110 MPa, about 100 MPa to about 175 MPa, about 120 MPa to about 175 MPa, about 130 MPa to about 175 MPa, about 140 MPa to about 175 MPa, about 150 MPa to about 175 MPa, about 160 MPa to about 175 MPa).

In certain embodiments, the composite material is characterized by a flexural strength from about 5 MPa to about 30 MPa (e.g., about 5 MPa to about 25 MPa, about 5 MPa to about 20 MPa, about 5 MPa to about 15 MPa, about 5 MPa to about 10 MPa, about 10 MPa to about 30 MPa, about 20 MPa to about 30 MPa, about 25 MPa to about 30 MPa).

In certain embodiments, the composite material is characterized by water absorption of less than about 10% (e.g., less than about 8%, 5%, 4%, 3%, 2%, or 1%).

The composite material may display one or more of desired textures, patterns and physical properties, in particular those that are characteristic of natural stone. In certain preferred embodiments, the composite material exhibits a visual pattern similar to natural stone. Other characteristics include colors (e.g., black, white, blue, pink, grey (pale to dark), green, red, yellow, brown, cyan (bluish-green) or purple) and textures.

Equipment and Processing Discussion

Figure 9:
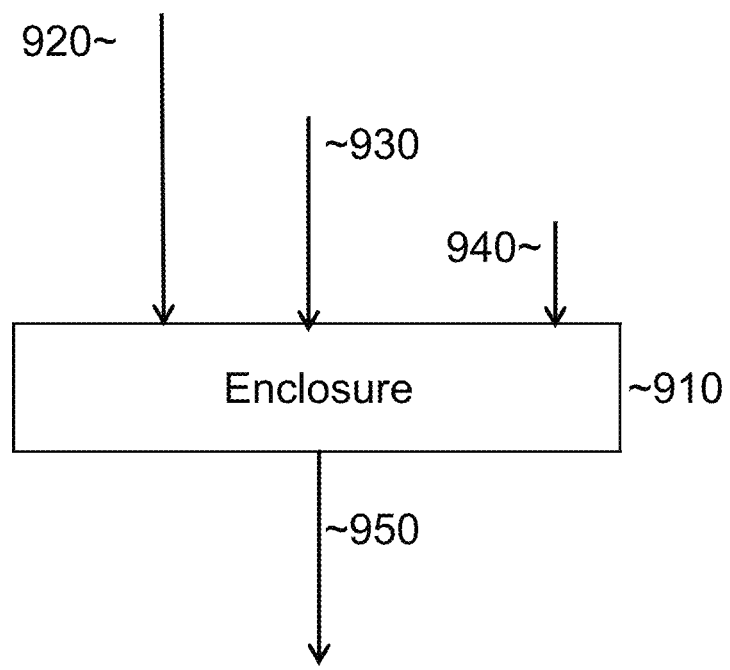
FIG. 9 is a schematic diagram of a simple processing enclosure that allows the control of one or more of the $CO_2$ concentration, the humidity and the temperature that a material that is processed using the HLPS technology described herein.

FIG. 9 is a schematic diagram of a simple processing enclosure that allows the control of one or more of the $CO_2$ concentration, the humidity and the temperature that a material that is processed using the HLPS technology described herein. In the apparatus of FIG. 9, an enclosure 910 is provided, in which the material to be processed is enclosed. The enclosure can be a simple covering, as with a tarpaulin or plastic sheeting, or it can be a frame covered with simple walls and a roof. The enclosure is fed with a source of $CO_2$ 920, a source of water vapor 930 and a thermal energy source 940 so that the material to be processed is provided with an environment having a predefined concentration of $CO_2$, a predefined humidity and a predefined temperature. The system allows an outflow of gas as shown by arrow 950. In such a simple system, the predefined values are provided using an "open loop" control method, in which a "recipe" is followed, and in which measurements to check on the actual values of $CO_2$ concentration, humidity and temperature during the course of the curing process are rarely performed, or are not performed at all. Such a curing approach is useful when a "known good recipe" is available, for example one used repeatedly and known to provide adequate curing for a specific product. An example where such a curing method is useful is in the curing of large volume, low cost products that do not have to conform to a very tight standard, but simply have to be adequately cured so as to exceed a predefined standard of quality. In such a system, one can check the adequacy of the curing by removing a small number of samples of the product and testing them to see if they are properly cured, and terminating the curing when the samples meet the predefined standard.

CO$_2$ Control

In the embodiments described, industrial grade CO$_2$ at about 99% purity is used, which is provided by a variety of different industrial gas companies, such as Praxair, Inc., Linde AG, Air Liquide, and others. This supply can be held in large pressurized holding tanks in the form of liquid carbon dioxide regulated at a temperature such that it maintains a vapor pressure of approximately 300 PSIG. This gas is then piped to a CO$_2$ curing enclosure or chamber. In the simplest system, CO$_2$ is flowed through the enclosure at a rate sufficient to displace the ambient air in the enclosure. In general, the purge time will depend on the size of the enclosure and the rate that CO$_2$ gas is provided. In many systems, this process of purging the enclosure of air can be performed in times measured in minutes to get the CO$_2$ concentration up to a reasonable level so that curing can be performed thereafter. In simple systems, CO$_2$ gas is then fed into the system at a predefined rate so as to maintain a concentration of CO$_2$ sufficient to drive the curing reaction.

As an example, we now describe a method for sustaining carbon dioxide concentrations during the reaction that is well suited for keeping a highly consistent concentration, although it is a "closed loop" process which tends to be the most expensive technique. This method uses the measurement of CO$_2$ concentration in the system directly, and employs a controller such as a PLC to control the CO$_2$ concentration at a set point with an electronic/automated control valve. A measurement technique to measure CO$_2$ directly such as NDIR should preferably be employed. In the NDIR measurement method, a gas sample stream is pulled from the system via a low flow pump. A chiller is used to drop moisture out of the gas stream before it is sampled by the NDIR instrument. Therefore the measurement provided by the analyzer is missing the water vapor component of the gas stream and needs be adjusted to account for the humidity that has been removed from the test sample. A measurement of the humidity in the system gas flow can be performed using a dry bulb-wet bulb psychrometric technique, using a dry bulb-wet bulb humidity measurement device or using a different type of moisture sensor. The true CO$_2$ concentration can be calculated using the computer control system or PLC. Once the true CO$_2$ concentration is known, the actuated proportioning control valve can add dry CO$_2$ into the system when it has been consumed and has gone below the set point that is desired at that time. In various embodiments, the set point can vary with time, if necessary, based on experience in curing specific compositions, shape and sizes of composite material specimens.

Humidity Control

Figure 10:
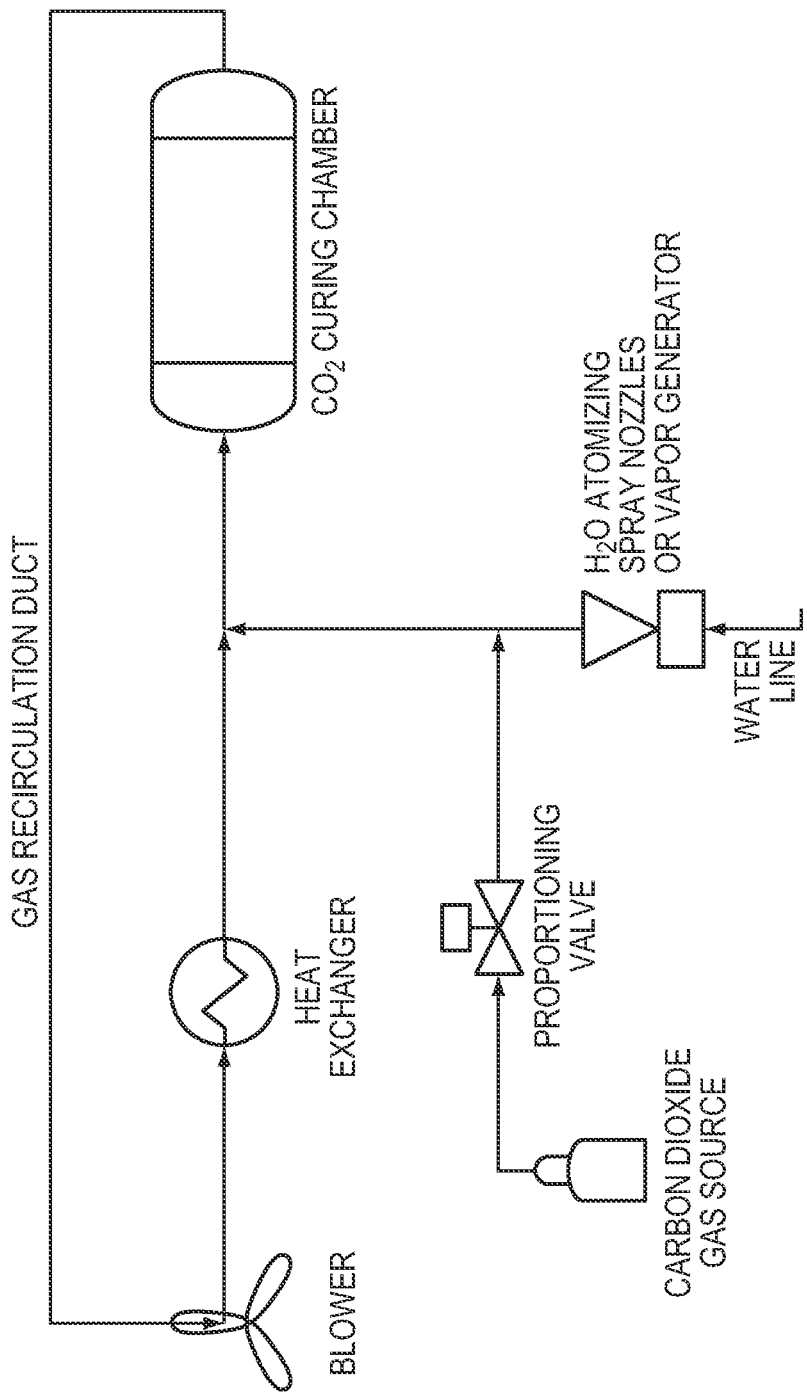
FIG. 10 is a schematic diagram of a $CO_2$ composite material curing chamber that provides humidification according to principles of the invention.

FIG. 10 is a schematic diagram of a CO$_2$ composite material curing chamber that provides humidification according to principles of the invention. In FIG. 10, a water supply is provided and water vapor is added to the atmosphere that is circulating within the curing chamber. The water can be any convenient source of potable water. In some embodiments, ordinary tap water is used. In some embodiments, the water can be converted to vapor by flowing through a misting nozzle or an atomizing spray nozzle, an electric vapor generator, a gas fired vapor generator, or by being heated above the gas temperature in the chamber so as to cause evaporation from a liquid water supply an example being a drum reactor with an immersion heater. In yet another embodiment, the CO$_2$ supply can be flowed into the systems after having been bubbled through a heated water supply in order to increase relative humidity of the incoming gas stream an example being a drum reactor configured for "flow through" or "open loop" processing.

Relative humidity is an important parameter in both traditional concrete curing as well as in CO$_2$ composite material curing. In a traditional curing chamber a moist air atmosphere exists that is comprised of mostly nitrogen, oxygen, and water vapor. In these systems relative humidity is most often measured by a standard capacitive sensor technology. However, CO$_2$ curing chambers have a gas atmosphere comprised predominately of carbon dioxide that is incompatible with some types of these sensors. Sensing technology such as dry-bulb wet-bulb techniques that utilize the psychrometric ratios for carbon dioxide and water vapor or dipole polarization water vapor measurement instruments or chilled mirror hygrometers or capacitive humidity sensors can be used in the CO$_2$ composite material curing systems described herein.

Depending on the type and geometry of the product being cured, the design of the chamber, and the packing efficiency of product in the chamber the humidity may need to be either decreased or increased and regulated to a specified set point. Set points may range anywhere from 1% to 99% relative humidity. Three different methods for humidity control may exist in CO$_2$ composite material curing processes that could be combined into a single system. One method for humidification in one embodiment of a CO$_2$ curing system is represented in FIG. 10. Another method allows one to remove moisture from the system to cure the composite material products with CO$_2$. A simple method of reducing the relative humidity is by displacing the humid gas in the system with a dry gas, such as carbon dioxide. In still another embodiment, one can reduce relative humidity and therefore remove water vapor from the gas by a non-purging method, which in one preferred embodiment is a chilled heat exchanger that performs water extraction.

Figure 11:
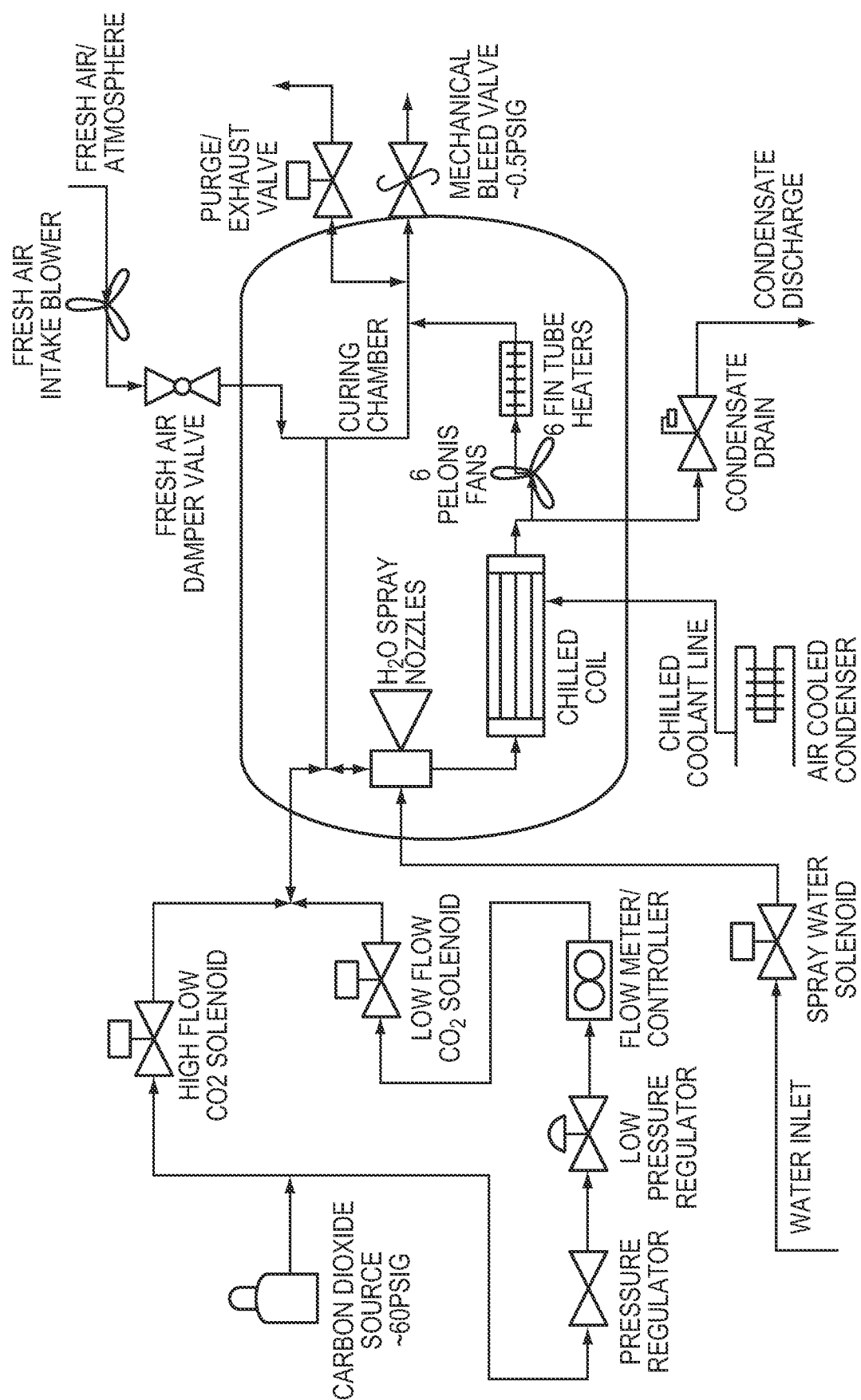
FIG. 11 is a schematic diagram of a curing chamber with multiple methods of humidity control as well as ability to control and replenish $CO_2$ using constant flow or pressure regulation and that can control the temperature according to principles of the invention.

FIG. 11 is a schematic diagram of a curing chamber with multiple methods of humidity control as well as ability to control and replenish CO$_2$ using constant flow or pressure regulation and that can control the temperature according to principles of the invention. This system is an example of a system that can provide closed loop control or control using feedback, in which set values of operating parameters such as CO$_2$ concentration, humidity, and temperature that are desired at specific times in the process cycle are provided, and measurements are taken to see whether the actual value of the parameter being controlled is the desired value. If deviation from the desired value is measured, corrective action is taken to bring the value of the parameter into agreement with the desired value. Such control systems can be expensive and complex, and may be useful with regard to high value products or products that require very precise process conditions.

Temperature Control

In some embodiments, temperature is measured utilizing a temperature measurement device such as a thermocouple, a thermometer or an RTD. The measurement signal is directed back to a controller or computer that is able to regulate energy into the heat exchanger and thereby adjust the temperature of the entire system over time. The blower is an important component of the heating system as it is able to help transfer the heat energy to the gas which transfers to the products and the chamber itself which is an important part of controlled moisture of the samples. The method of heating can be electric or gas fired. Jacket heaters may be utilized to control the temperature of the $CO_2$ that flows through a chamber in contact with the heating jacket, any convenient source of heat can be used. The means of external heating may include but are not limited to electric heating, hot water heating, or hot oil heating. For $CO_2$ curing chambers indirect gas fired systems have been utilized thus far and direct fired gas burners have been avoided because they will pull air and products of combustion into the system, thereby diluting the $CO_2$ and making control of the $CO_2$ concentration problematic. Some smaller scale systems such as the Drum Reactors utilize electric jacket heaters to heat the entire surface of the chamber rather than a heating element within the chamber. In other embodiments the reactant gas stream is heated before it flows into the curing chamber.

Gas Flow Control

Another control parameter is gas velocity across the material that is to be cured in the system. The gas velocity can be very dependent on process equipment variables including but not limited to chamber design, baffle design, fan size, fan speed/power, number of fans, temperature gradient within the system, rack design within the system, and sample geometry within the system. The simplest method to control the gas velocity within the chamber is by adjusting the blower speed (RPM's), typically done by utilization of a variable frequency drive to allow for control of the blower motor speed. The blower can be used to circulate gas at a desired velocity in the curing chamber. Gas velocity in the system is measured in the system via a variety of different techniques including but not limited to pitot tubes measurement and laser Doppler detection systems. The measurement signal for gas velocity can be sent back to a computer system or programmable logic controller and be utilized as a control parameter in the curing profile.

We describe a process for preparing a composite material. The process includes: mixing a particulate composition and a liquid composition to create a slurry mixture; forming the slurry mixture into a desired shape, either by casting the slurry into a mold, pressing the slurry in a mold, pressing the slurry in a vibrating mold, extruding the slurry, slip forming the slurry, or using any other shape-forming method common in concrete production, and curing the formed slurry mixture at a temperature in the range from about 20° C. to about 150° C. for about 1 hour to about 80 hours under a vapor comprising water and $CO_2$ and having a pressure in the range from about ambient atmospheric pressure to about 50 psi above ambient atmospheric pressure and having a $CO_2$ concentration ranging from about 10% to about 90% to produce a composite material exhibiting a texture and/or a pattern and the desired physical properties related to compressive strength, flexural strength, density, resistance to degradation, and so forth.

The particulate composition includes a ground calcium silicate having a median particle size in the range from about 1 μm to about 100 μm. In addition the particulate composition may include a ground calcium carbonate or a $SiO_2$ bearing material having a median particle size in the range from about 3 μm to about 25 mm. The liquid composition includes water and may include a water-soluble dispersant.

The process can further include, before curing the casted mixture, the step of drying the casted mixture. The particulate composition further comprises a pigment or a colorant as discussed herein.

In certain embodiments, curing the formed slurry mixture is performed at a temperature in the range from about 30° C. to about 120° C. for about 1 hour to about 70 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature in the range from about 60° C. to about 110° C. for about 1 hour to about 70 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature in the range from about 80° C. to about 100° C. for about 1 hour to about 60 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature equal to or lower than about 60° C. for about 1 hour to about 50 hours under a vapor comprising water and $CO_2$ and having an ambient atmospheric pressure.

For example, in some embodiments, the ground calcium silicate has a median particle size from about 1 μm to about 100 μm (e.g., about 1 μm, 5 μm, 10 μm, 15 μm, 20 μm, 25 μm, 30 μm, 40 μm, 90 μm), a bulk density from about 0.6 g/mL to about 0.8 g/mL (loose) and about 1.0 g/mL to about 1.2 g/mL (tapped), a surface area from about 1.5 $m^2$/g to about 2.0 $m^2$/g.

In certain preferred embodiments, the liquid composition includes water and a water-soluble dispersant comprising a polymer salt (e.g., an acrylic homopolymer salt) having a concentration from about 0.1% to about 2% w/w of the liquid composition.

Composite materials prepared according to a process disclosed herein can exhibit a compressive strength from about 90 MPa to about 175 MPa and a flexural strength from about 5.4 MPa to about 20.6 MPa.

We also describe one or more articles of manufacture made from a composite material.

Any suitable precursor materials may be employed. For example calcium silicate particles formed primarily of Wollastonite, $CaSiO_3$, can react with carbon dioxide dissolved in water. It is believed that calcium cations are leached from the Wollastonite and transform the peripheral portion of the Wollastonite core into calcium-deficient Wollastonite. As the calcium cations continue to be leached from the peripheral portion of the core, the structure of the peripheral portion eventually become unstable and breaks down, thereby transforming the calcium-deficient Wollastonite peripheral portion of the core into a predominantly silica-rich first layer. Meanwhile, a predominantly calcium carbonate second layer precipitates from the water.

More specifically, the first layer and second layer may be formed from the precursor particle according the following reaction (1) which can use water as a reaction medium, and not as a reagent (that is, the water is not consumed):

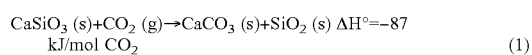

$$CaSiO_3 \text{ (s)} + CO_2 \text{ (g)} \rightarrow CaCO_3 \text{ (s)} + SiO_2 \text{ (s)} \quad \Delta H° = -87 \text{ kJ/mol } CO_2 \qquad (1)$$

For example, in a silicate mineral carbonation reaction such as with Wollastonite, $CO_2$ is introduced as a gas phase that dissolves into an infiltration fluid, such as water. The dissolution of $CO_2$ forms acidic carbonic species (such as carbonic acid, $H_2CO_3$) that results in a decrease of pH in solution. The weakly acidic solution incongruently dissolves calcium species from $CaSiO_3$. The released calcium cations and the dissociated carbonate species lead to the precipitation of insoluble carbonates. Silica-rich layers are thought to remain on the mineral particles as calcium depleted layers.

Thus, according to a preferred embodiment of the invention, $CO_2$ preferentially reacts with the calcium cations of the Wollastonite precursor core, thereby transforming the peripheral portion of the precursor core into a silica-rich first layer and a calcium carbonate-rich second layer. Also, the presence of the first and second layers on the core act as a barrier to further reaction between Wollastonite and carbon dioxide, resulting in the bonding element having the core, first layer and second layer.

In some embodiments, silicate materials having metals other than Ca or in addition to Ca, for example Fosterite ($Mg_2SiO_4$), Diopside ($CaMgSi_2O_6$), and Talc ($Mg_3Si_4O_{10}(OH)_2$) can react with carbon dioxide dissolved in water in a manner similar to the reaction of Wollastonite, as described above. It is believed that such silicate materials can be used, alone, in combination, and/or in combination with Wollastonite, as precursors for bonding elements according to principles of the invention.

Preferably, gas-assisted HLPS processes utilize partially infiltrated pore space so as to enable gaseous diffusion to rapidly infiltrate the porous preform and saturate thin liquid interfacial solvent films in the pores with dissolved $CO_2$. $CO_2$-based species have low solubility in pure water (1.5 g/L at 25° C., 1 atm.). Thus, a substantial quantity of $CO_2$ must be continuously supplied to and distributed throughout the porous preform to enable significant carbonate conversion. Utilizing gas phase diffusion offers a huge (about 100-fold) increase in diffusion rate over that of diffusing soluble $CO_2$ in a liquid phase. ("Handbook of chemistry and physics", Editor: D. R. Lide, Chapters 6 and 8, $87^{th}$ Edition 2006-2007, CRC.) This partially infiltrated state enables the reaction to proceed to a high degree of carbonation in a fixed period of time.

Liquid water in the pores speeds up the reaction rate because it provides a medium for ionization of both carbonic acid and calcium species. However, water levels need to be low enough such that $CO_2$ gas can diffuse into the porous matrix prior to dissolution in the pore-bound water phase. Furthermore, the actively dissolving porous preform serves as a template for expansive reactive crystal growth. Thus, the bonding element and matrices can be formed with minimal distortion and residual stresses. This enables large and complex shapes to result, such as those needed for infrastructure and building materials, in addition to many other applications.

Thus, various combinations of curing conditions may be devised to achieve the desired production process, including varied reaction temperatures, pressures and reaction times. In a first exemplary embodiment, water is present in the precursor material (e.g., as residual water from prior mixing step) and liquid water is provided to precursor materials (e.g., to maintain water level and/or control the loss of water from evaporating) along with $CO_2$ and the curing process is conducted at about 90° C. and about 20 psig (i.e., 20 psi above ambient pressure) for times ranging from about 2 to 90 hours.

In a second exemplary embodiment, water is present in the precursor material (e.g., as residual water from prior mixing step) and water vapor is provided to precursor materials (e.g., to maintain water level and/or control the loss of water from evaporating) along with $CO_2$ and the curing process is conducted at about 90° C. and about 20 psig (i.e., 20 psi above ambient pressure) for times ranging from about 2 to 90 hours.

In a third exemplary embodiment, water is present in the precursor material (e.g., as residual water from prior mixing step) and water vapor is provided to precursor materials (e.g., to maintain water level and/or control the loss of water from evaporating) along with $CO_2$ and the curing process is performed at about 25 to 90° C. and 0 psig (at ambient atmospheric pressure) for about 2 to 72 hours.

In the above embodiments, the time required for curing of a composite material object is determined by the ability of water vapor and $CO_2$ gas to diffuse throughout the object. In general, thicker objects take longer to cure than thinner objects. Similarly, objects with high density (and fewer open pore spaces) take longer to cure than objects with low density (and more open pore spaces). Table 1 provides examples of how the curing times may vary with respect to the smallest thickness (or wall thickness or section thickness) of the three dimensions and the bulk density of an object that is being manufactured.

TABLE 1

| Composite Material Smallest Thickness (mm) | Composite Material Bulk Density (gm/cm$^3$) | Approximate Curing Time (h) |
| --- | --- | --- |
| 10 | 2.4 | 2 |
| 25 | 1.6-2.3 | 8-12 |
| 75 | 2.1-2.3 | 16 |
| 100 | 0.4-0.8 | 8-12 |
| 200 | 1.5 | 72 |
| 200 | 2.4 | 72 |

Discussion of Manufactured Microstructures

Figure 12A:
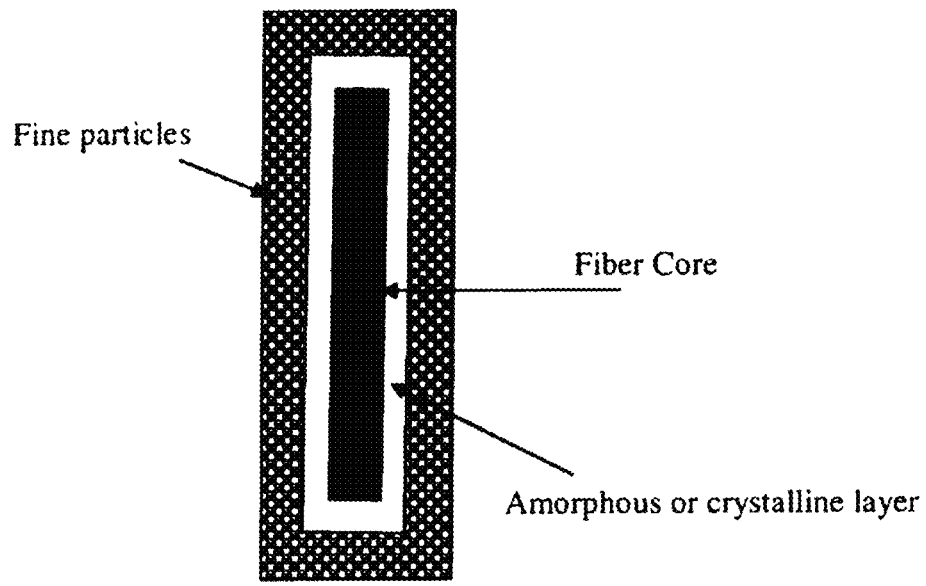
FIGS. 12(a)-12(c) are schematic illustrations of cross-sections of bonding elements according to exemplary embodiments of the present invention, including three exemplary core morphologies: (a) fibrous, (b) elliptical, and (c) equiaxed.
Figure 12B:
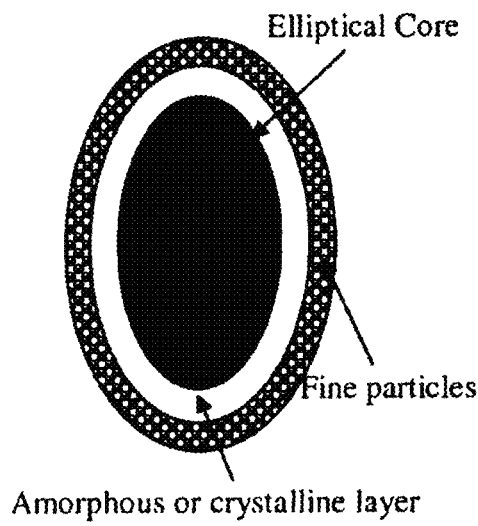
Figure 12C:
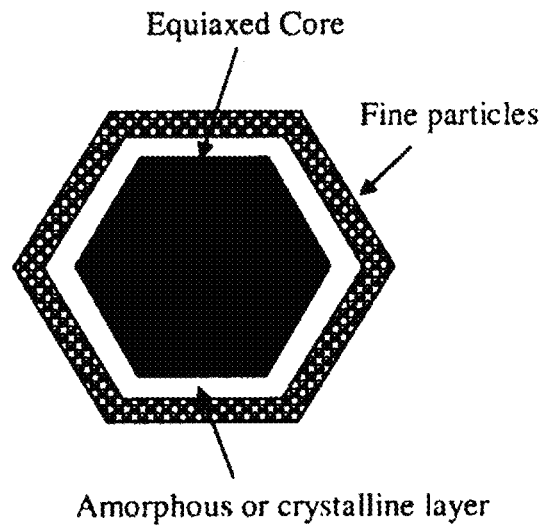

As schematically illustrated in FIGS. 12(a)-12(c), a bonding element includes a core (represented by the black inner portion), a first layer (represented by the white middle portion) and a second or encapsulating layer (represented by the outer portion). The first layer may include only one layer or multiple sub-layers and may completely or partially cover the core. The first layer may exist in a crystalline phase, an amorphous phase or a mixture thereof, and may be in a continuous phase or as discrete particles. The second layer may include only one layer or multiple sub-layers and may also completely or partially cover the first layer. The second layer may include a plurality of particles or may be of a continuous phase, with minimal discrete particles.

A bonding element may exhibit any size and any regular or irregular, solid or hollow morphology depending on the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granulars, oblongs, rods, ripples, etc.

In general, as discussed in greater detail herein, a bonding element is produced from reactive precursor materials (e.g., precursor particles) through a transformation process. The precursor particles may have any size and shape as long as they meet the needs of the intended application. The transformation process generally leads to the corresponding bonding elements having similar sizes and shapes of the precursor particles.

Figure 13A:
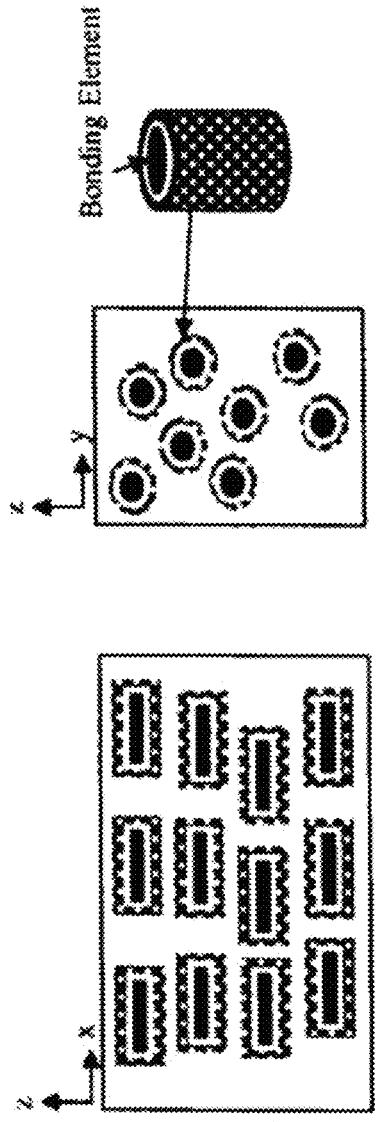
Figure 13B:
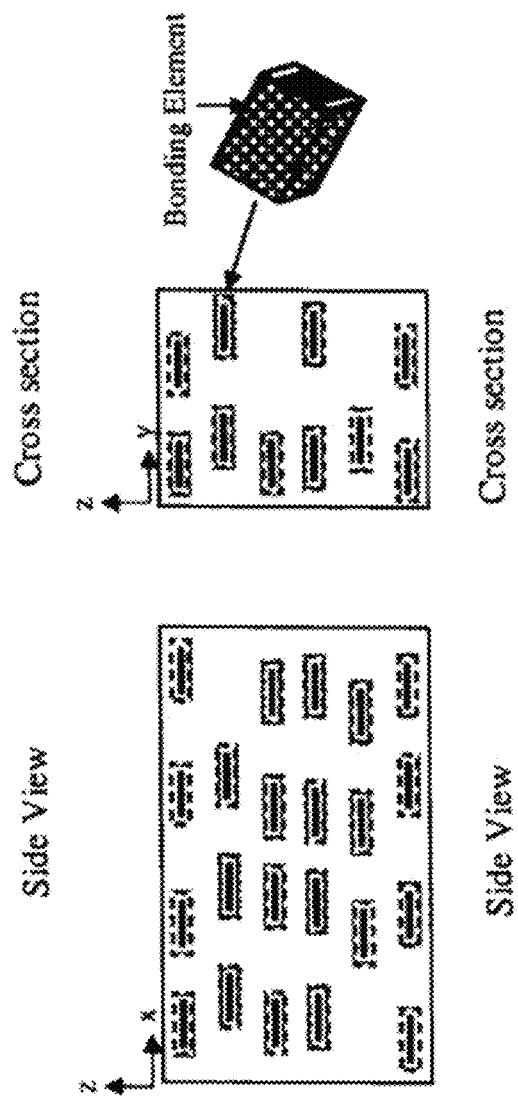
Figures 13C, 13D:
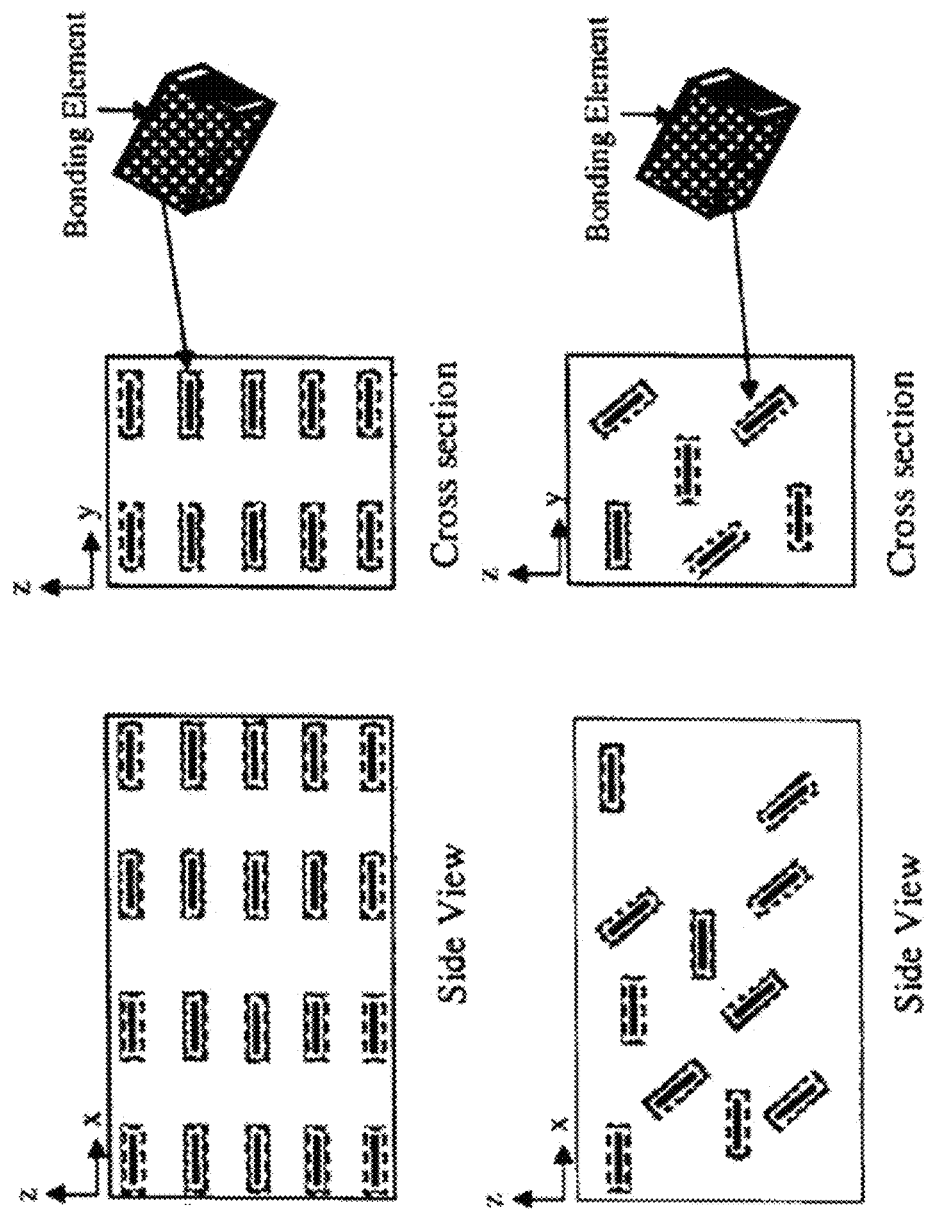
Figures 15A, 15B, 15C, 15D:
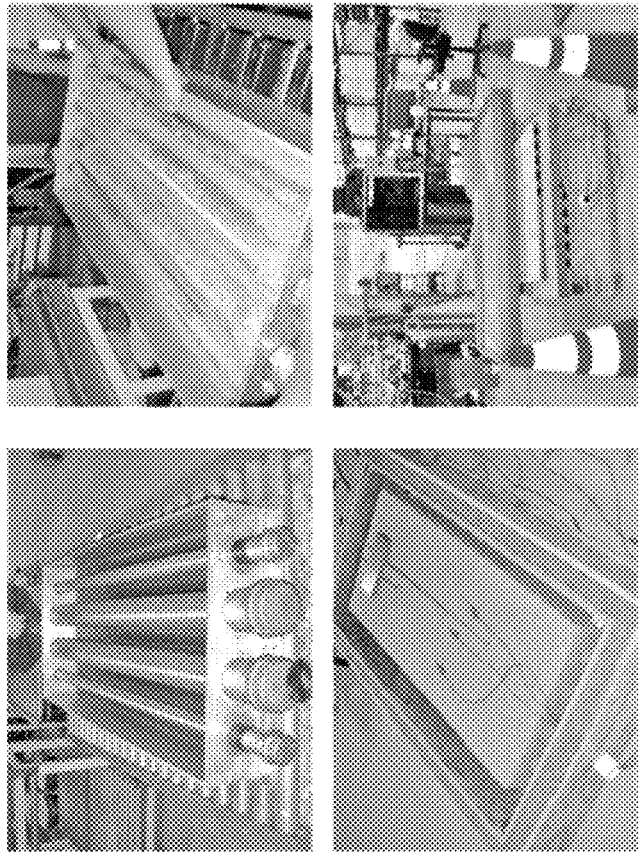
FIG. 15A is an image of a form used to cast a hollow core slab, in which tubular structures are used to create cylindrical openings defined in the hollow core slab.
FIG. 15B is an image of a hollow core slab casting process.
FIG. 15C is an image of an uncured hollow core slab after the tubular structures used to create cylindrical openings are removed from the hollow core slab. The slab is shown within a hard wall curing chamber.
FIG. 15D is a view of the curing chamber of FIG. 15C with the top closed.

Within the bonding matrix, the bonding elements may be positioned, relative to each other, in any one of a number of orientations. FIGS. 13(a)-13(f) schematically illustrate an exemplary bonding matrix that includes fiber- or platelet-shaped bonding elements in different orientations possibly diluted by the incorporation of filler material, as represented by the spacing between the bonding elements. FIG. 13(a), for example, illustrates a bonding matrix that includes fiber-shaped bonding elements aligned in a one-direction ("1-D") orientation (e.g., aligned with respect to the x direction). FIG. 13(b) illustrates a bonding matrix that includes platelet-shaped bonding elements aligned in a two-direction ("2-D") orientation (e.g., aligned with respect to the x and y directions). FIG. 13(c) illustrates a bonding matrix that includes platelet-shaped bonding elements aligned in a three-direction ("3-D") orientation (e.g., aligned with respect to the x, y and z directions). FIG. 13(d) illustrates a bonding matrix that includes platelet-shaped bonding elements in a random orientation, wherein the bonding elements are not aligned with respect to any particular direction. FIG. 13(e) illustrates a bonding matrix that includes a relatively high concentration of platelet-shaped bonding elements that are aligned in a 3-D orientation. FIG. 13(f) illustrates a bonding matrix that includes a relatively low concentration of platelet-shaped bonding elements that are situated in a random orientation (a percolation network). The composite material of FIG. 13(f) achieves the percolation threshold because a large proportion of the bonding elements are touching one another such that a continuous network of contacts are formed from one end of the material to the other end. The percolation threshold is the critical concentration above which bonding elements show long-range connectivity with either an ordered, e.g., FIG. 13(e), or random orientation, e.g., FIG. 13(f), of bonding elements. Examples of connectivity patterns can be found in, for example, Newnham, et al., "Connectivity and piezoelectric-pyroelectric composites", *Mat. Res. Bull. vol.* 13, pp. 525-536, 1978).

The plurality of bonding elements may be chemically transformed from any suitable precursor materials, for example, from a precursor calcium silicate other than Wollastonite. The precursor calcium silicate may include one or more chemical elements of aluminum, magnesium and iron.

The plurality of bonding elements may have any suitable median particle size and size distribution dependent on the desired composite material. In certain embodiments, the plurality of bonding elements have a median particle size in the range of about 5 μm to about 100 μm (e.g., about 5 μm to about 80 μm, about 5 μm to about 60 μm, about 5 μm to about 50 μm, about 5 μm to about 40 μm, about 5 μm to about 30 μm, about 5 μm to about 20 μm, about 5 μm to about 10 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm).

In some instances a composite material includes: a plurality of bonding elements and a plurality of filler particles. Each bonding element includes: a core comprising primarily calcium silicate, a silica-rich first or inner layer, and a calcium carbonate-rich second or outer layer. The plurality of bonding elements and the plurality of filler particles together form one or more bonding matrices and the bonding elements and the filler particles are substantially evenly dispersed therein and bonded together, whereby the composite material exhibits one or more textures, patterns and physical properties. In some instances, the bonding elements may have a core of magnesium silicate, and a silica-rich first or inner layer, and a magnesium carbonate-rich second or outer layer. The magnesium silicate can include aluminum, calcium, iron or manganese oxides.

The plurality of filler particles may have any suitable median particle size and size distribution. In certain embodiments, the plurality of filler particles has a median particle size in the range from about 5 μm to about 7 mm (e.g., about 5 μm to about 5 mm, about 5 μm to about 4 mm, about 5 μm to about 3 mm, about 5 μm to about 2 mm, about 5 μm to about 1 mm, about 5 μm to about 500 μm, about 5 μm to about 300 μm, about 20 μm to about 5 mm, about 20 μm to about 4 mm, about 20 μm to about 3 mm, about 20 μm to about 2 mm, about 20 μm to about 1 mm, about 20 μm to about 500 μm, about 20 μm to about 300 μm, about 100 μm to about 5 mm, about 100 μm to about 4 mm, about 100 μm to about 3 mm, about 100 μm to about 2 mm, about 100 μm to about 1 mm).

In certain preferred embodiments, the filler particles are made from a calcium carbonate-rich material such as limestone (e.g., ground limestone). In certain materials, the filler particles are made from one or more of SiO2-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, calcium carbonate-rich material and magnesium carbonate-rich material.

The weight ratio of (bonding elements) : (filler particles) may be any suitable rations dependent on the desired composite material, for example, in the range of about (10 to 50):about (50 to 90).

In certain embodiments, these composite materials may display various patterns, textures and other characteristics, such as visual patterns of various colors. In addition, the composite materials of the invention exhibit compressive strength, flexural strength and water absorption properties similar to conventional concrete or the corresponding natural materials.

In certain embodiments, the composite further includes a pigment. The pigment may be evenly dispersed or substantially unevenly dispersed in the bonding matrices, depending on the desired composite material. The pigment may be any suitable pigment including, for example, oxides of various metals (e.g., iron oxide, cobalt oxide, chromium oxide) The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%).

Apparatus and Methods

The invention involves the recognition that the drying sub-process and the carbonation sub-process in the curing of $CO_2$ composite material are directly coupled to each other, so that the carbonation rate and extent can be controlled by controlling the drying rate.

The invention involves the recognition of the adverse effects of temperature and humidity gradients on the uniformity of physical properties of large scale cured $CO_2$ composite material.

The invention provides a solution to these recognized issues so that in the embodiment of symmetric curing chambers one can manipulate spatial gradients in temperature and humidity over the course of the curing process so that they time-average to nearly zero. This has resulted in the demonstration that more spatially uniform reaction completion and more spatially uniform physical properties are produced in a cured $CO_2$ composite material.

The Problems Solved by the Invention

A significant problem in curing $CO_2$ composite material (such as carbonated concretes) is to make the $CO_2$ composite material curing process competitive with curing Portland cement concrete (PCC) while avoiding a level of complexity that would be a barrier to adoption of the process by the building and construction industries. To accomplish this goal, a $CO_2$ composite material curing process should be as compatible as possible to the PCC curing process that it replaces, be as simple as possible, and have a low (or lower) cost. Nonetheless, the $CO_2$ composite material process must deal with the differences in chemistry between $CO_2$ composite material and PCC.

Curing (or the hardening reaction) of $CO_2$ composite material differs from curing of PCC in several important ways that limit potential acceptable curing processes.

PCC curing involves hydration, while $CO_2$ composite material curing involves carbonation. Water, which is consumed by hydration is incorporated in the mixture of Portland cement, sand and aggregate before PCC is formed and cured. Water is evenly dispersed throughout the mixture at the time of mixing. Uniform dispersion of water throughout the formed body leads to uniform curing and uniform physical properties. Additional water, above that required for the hydration reactions, is usually needed to facilitate forming PCC into its final shape. The hydration reactions begin as soon as Portland cement becomes wet and continues to progress over months and years. However, Portland cement-based materials cure sufficiently in a relatively short time, such as hours, that they must be positioned in the place and in the shape desired within a short time window before the curing process makes them no longer susceptible to manipulation such as pouring and shaping. By way of example, a concrete mixer truck used to deliver Portland cement-based concrete to a building site usually must be unloaded in less than about 3 hours from the time the concrete mixture has water added.

In the case of $CO_2$ composite material, $CO_2$ for the carbonation reaction is not incorporated in the mixture of Solidia cement, sand and aggregate before $CO_2$ composite material is formed and cured. As in the PCC case, water is added to the mixture to facilitate forming Water is also a necessary participant in the carbonation reaction even though it is not consumed in the net reaction. This water should be removed from $CO_2$ composite material as it cures. Unlike the case of PCC, $CO_2$ composite material does not begin to cure when water is introduced. No hardening can happen until $CO_2$ is present along with water. The carbonation reaction stops in the absence of either $CO_2$ or water, or when the calcium silicate (or other silicate) cement is effectively consumed by reaction. $CO_2$ composite material has achieved its full hardness at the end of the curing process and does not further cure for additional months or years as is the case with PCC.

In curing $CO_2$ composite material, one needs to get $CO_2$ into the formed body so that carbonation can take place as rapidly as possible and one needs to get $H_2O$ out of the formed body throughout the carbonation process. The transport of these species is diffusively controlled under mild conditions. Initially the pores of the formed body are full of liquid water. $CO_2$ diffusion through liquid water is very slow compared to diffusion through gaseous water. These transport tasks are nontrivial in the case of large $CO_2$ composite material objects because of temperature and mass gradients that arise because of mass and heat transfer limitations. These gradients can lead to uneven curing and consequently to non-uniform physical properties. Any solution to the $CO_2$ composite material curing problem preferably should operate at near-ambient temperature and pressure conditions to be competitive with PCC curing.

The chemistry of the $CO_2$ composite material curing process has been described in patents already identified hereinabove. Prior efforts in $CO_2$ composite material curing have involved carbonation of Solidia Cement binders, mortars and concrete in gallon-size high-pressure autoclaves (Parr Reactors), in small (several gallon capacity) 20 psig 'pressure cooker'-type vessels, in 55-gallon drum reactors operated at several psig and in a large autoclave operated mainly at about 90° C. and 20 psig but also more recently at lower temperature and pressure. Large autoclaves are prohibitively expensive to be of practical use in the building and construction industry. The invention of new, large but simple, cost effective curing chambers are important to the commercialization of $CO_2$ composite material technologies.

Figure 59:
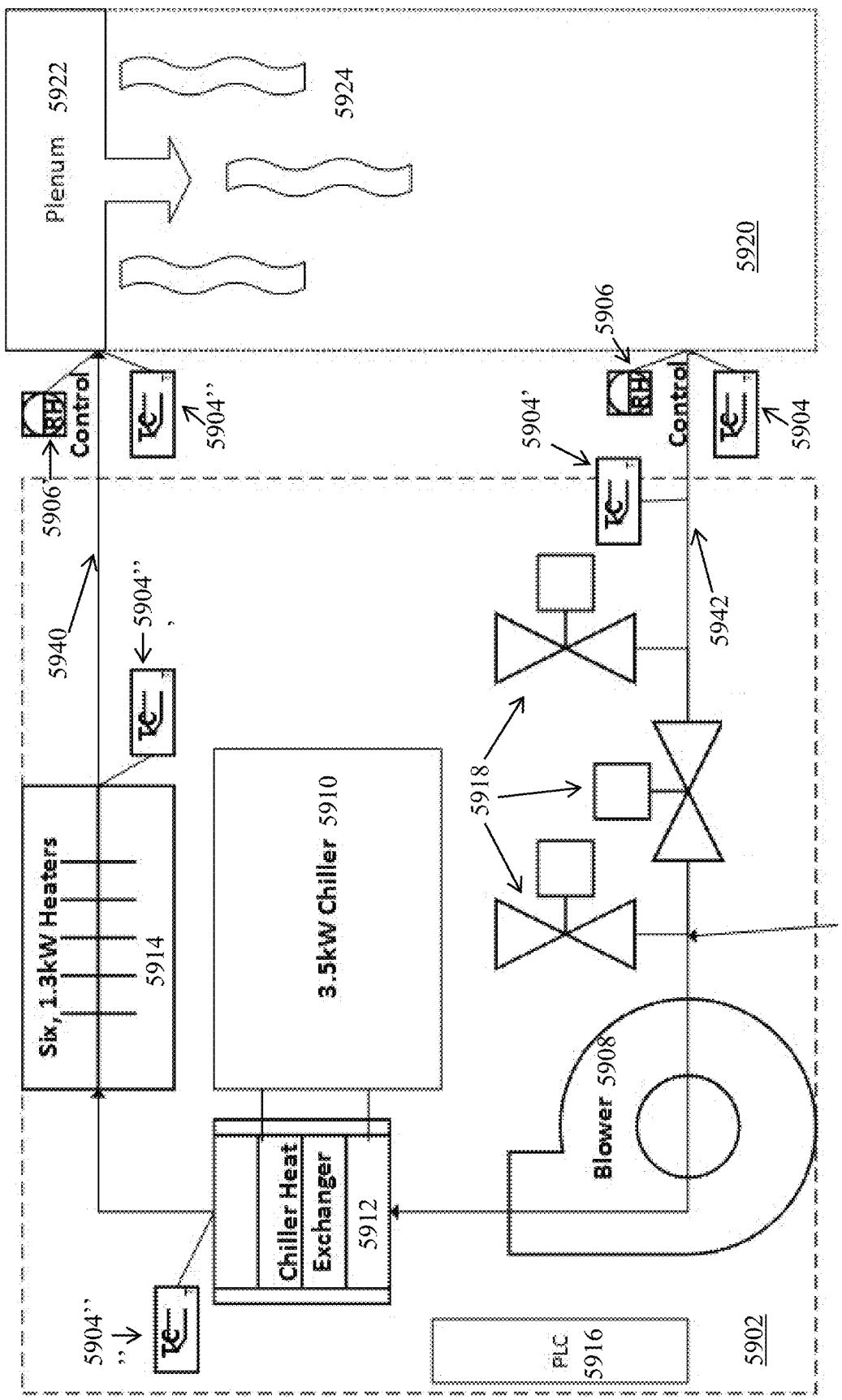
FIG. 59 is a schematic diagram of a curing system for use with $CO_2$ Composite Material.

A characteristic of the present invention is the separation of the "curing chamber," which contains the $CO_2$ composite material formed body or bodies that are to be cured, from the gas (or water or heat) conditioning and delivery (or extraction) subsystems. See for example. FIG. 59. This characteristic contrasts with the prior art large autoclave chamber, for example, wherein the gas circulation fan, gas heat exchanger, and water condenser are all contained within the autoclave shell along with the objects to be cured. A mid-scale curing chamber has fans, heaters, water spray nozzles, and a water condenser located inside the curing chamber. Similarly, drum reactors and "pressure-cooker" type reactors also contain fans, heaters, and water condensers within the curing chamber. In all of these cases the placement of these subsystems within the curing chamber makes the curing chamber geometrically complex and lowers its intrinsic symmetry. This design naturally results in temperature and humidity gradients in the curing chamber that are difficult to control.

FIG. 14A though FIG. 14D, for a field-deployable, stackable, low-temperature, low-pressure reactor illustrates the separation characteristic of this invention. The separation of the curing chamber from the rest of the curing system is advantageous because it allows the simplest possible chamber design. Chamber geometry and the placement geometry of the curing load are basic determinants of mass flow and heat flow through the chamber. For large objects or chambers filled with many small objects, temperature gradients and humidity gradients are virtually unavoidable. Highly symmetric, simple geometries simplify the shape of the gradients and make it easier to mitigate effects of the gradients on the uniformity of the cure and the uniformity of physical properties of cured bodies.

An experimental simulation of the curing of a hollow core slab on a heated casting bed was performed to determine the time evolution of temperature gradients as a means of exploring the relation between curing and drying. Three main "sub-processes" are active within the curing body during curing: carbonation, which is exothermic and drives the slab temperature up; drying, which is endothermic and drives the slab temperature down; and heating, which drives the slab temperature up.

FIG. 15A through FIG. 15D show how a hollow core slab can be fabricated.

FIG. 16 through FIG. 22 describe how the effects of these "sub-processes" on slab temperature can be measured and de-convolved. The de-convolution shows how drying "drives" the carbonation reaction. Thus drying can be used to control reaction speed and extent.

It emerges that during curing a drying front establishes itself and moves from the outside of the formed object toward its interior. A reaction front also forms almost coincident with the drying front. The curing reaction can only occur near the drying front/reaction front because $CO_2$ is supplied as a gas and is not present initially in the water at any significant concentration. In front of the drying front (e.g., on the wet side of the front) water is present in the pores, which inhibits $CO_2$ diffusion. Behind the front (e.g., on the dry side of the front) the pores contain too little water to support carbonation, but $CO_2$ can diffuse quickly to the region of the front and water can diffuse from the front back to the surface of the formed body. If these fronts move quickly through a region of the formed body the extent of reaction will be lower than if the fronts move slowly compared to the intrinsic rate of chemical reaction. The shape of the drying front will depend on the external shape of the formed body, the relative drying rates through its external surfaces and the diffusion distances from the front to the surface of the formed body. Heat and mass transfer effects make the curing processes for commercial $CO_2$ composite material products inherently tricky to engineer. Even so, the basics are emerging from experiments as now described.

Figure 16:
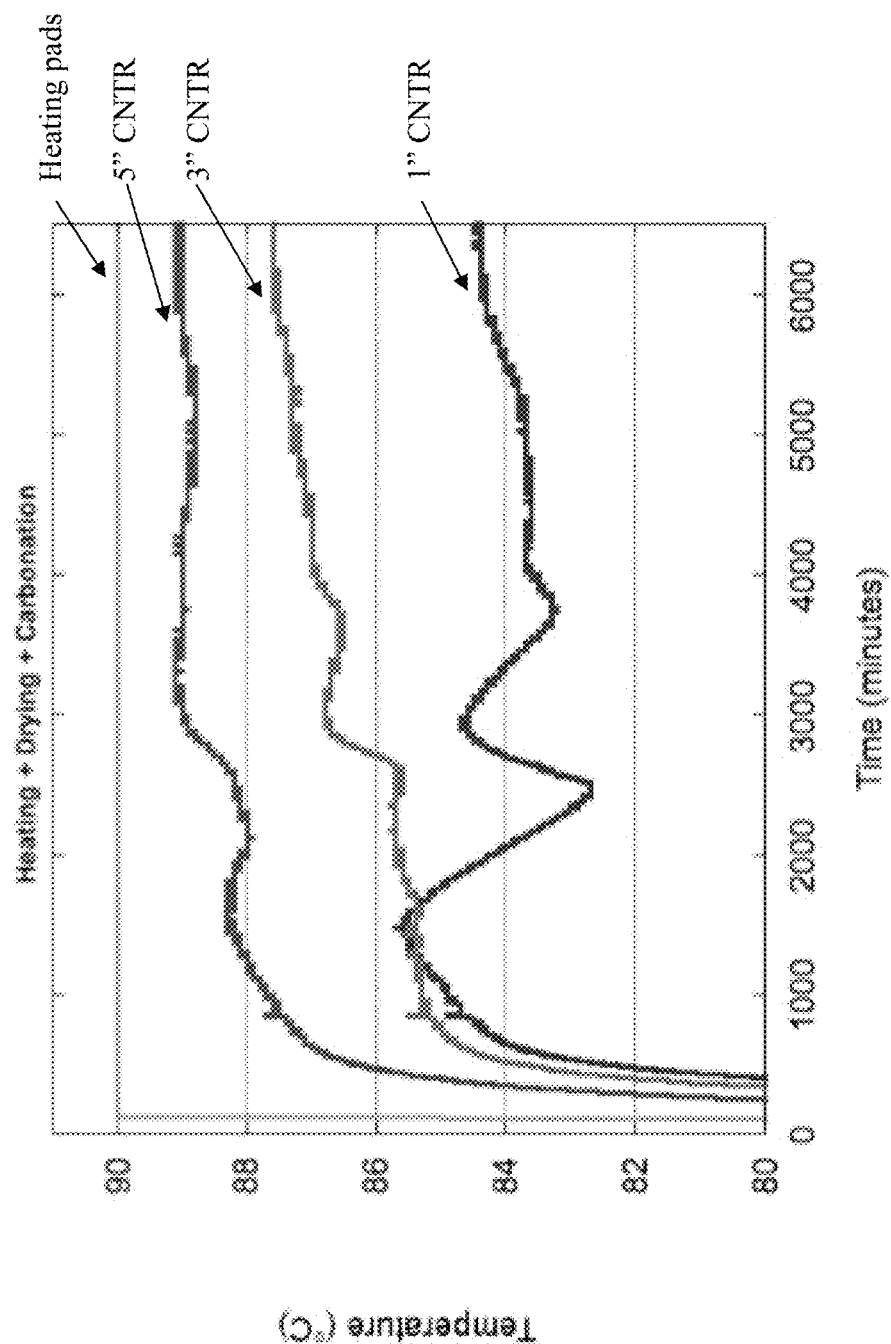
FIG. 16 is a graph of the temperature at heating pads used to heat the slab, and at different height locations defined within the slab as a function of time during a process in which heating, drying and carbonation processes are all taking place.

FIG. 16 is a graph showing data for a simulation of the reaction of a hollow-core slab on a heated casting bed. FIG. 16 shows the time dependence of temperature at three places within the slab at different distances from the slab bottom. It is seen that the vertical temperature gradient in the slab changes over the course of the curing process. A vibratory cast 4'×2'×6" hollow-core slab containing inert aggregate/sand, 13% $CaSiO_3$ and 7% $H_2O$ was used. Heat for reaction was supplied from the bottom only to simulate a heated casting bed. The flow of $CO_2$ at a pressure of 1 atmosphere and a flow rate of 9 liter/minute through the cores, over the top and along the sides of HC slab was used. The temperatures as drying and carbonation proceeds was measured using embedded thermocouples.

The operating conditions for FIG. 16 included ramping the bottom surface temperature of the slab from 28° C. to 90° C. in 120 minutes, and recording temperatures until the thermocouples reach steady-state, indicating that the slab is totally dry and no further reaction is taking place, and then cooling to room temperature.

The extent of reaction completion was calculated by comparing final solids weight to initial solids weight. The weight difference corresponds to the amount of $CO_2$ sequestered by the carbonation reaction:

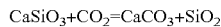

$$CaSiO_3+CO_2=CaCO_3+SiO_2$$

For this procedure the extent of reaction=65%.

Figure 17:
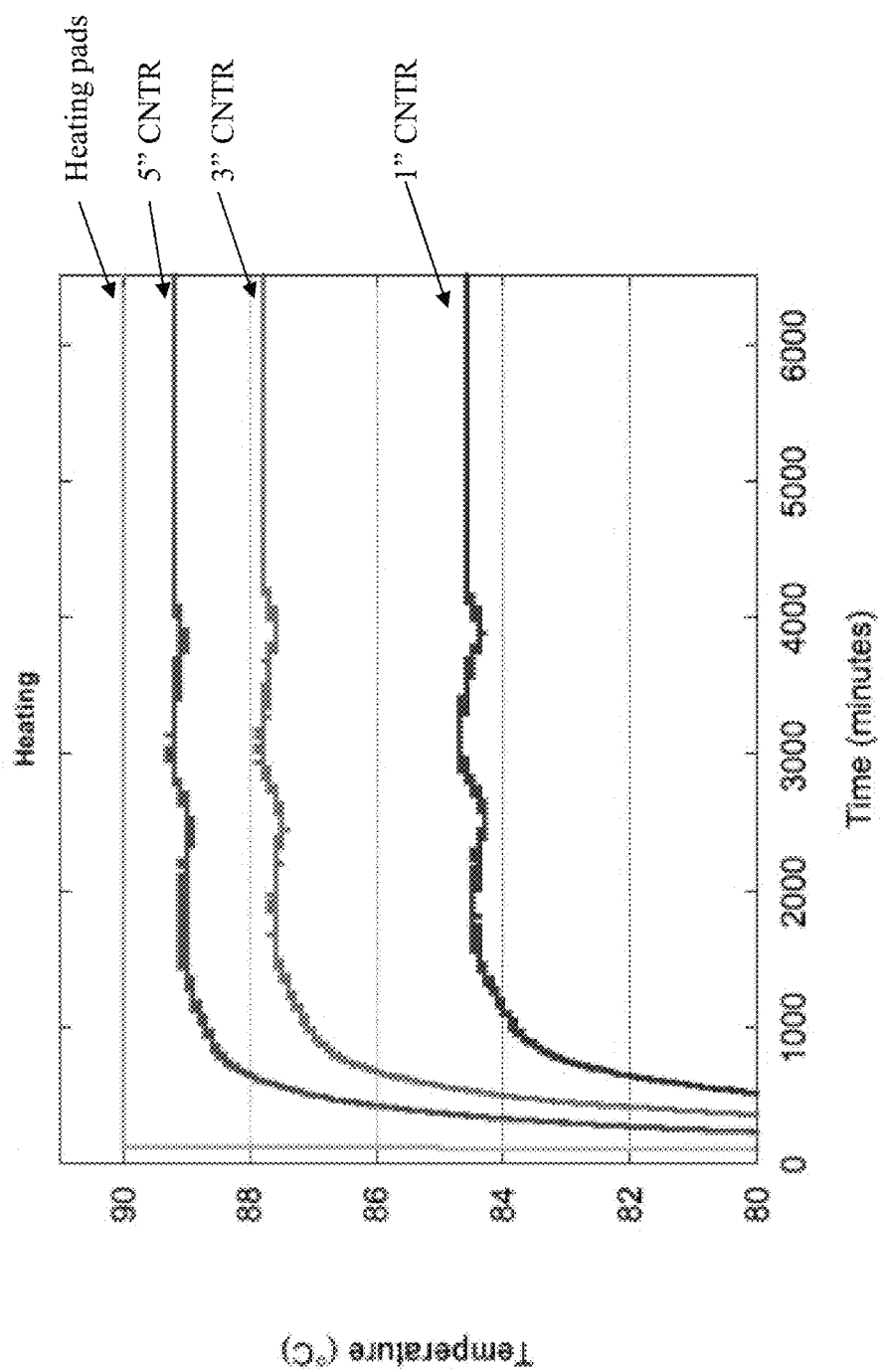
FIG. 17 is a graph of the temperature at heating pads used to heat the slab, and at different height locations defined within the slab as a function of time during a process in which heating alone is taking place.

FIG. 17 shows the time dependence of temperature at three places within a hollow-core slab at different distances from the slab bottom in a heating only operation. In the case of FIG. 17 the slab was similar to that used in FIG. 16 with the exception that it contained no water, and therefore there was no drying and no carbonation reaction. The operational conditions were the same as given for FIG. 16. This is a case of heating alone, and the vertical temperature gradient remains almost constant after the initial heat up of the slab.

Figure 18:
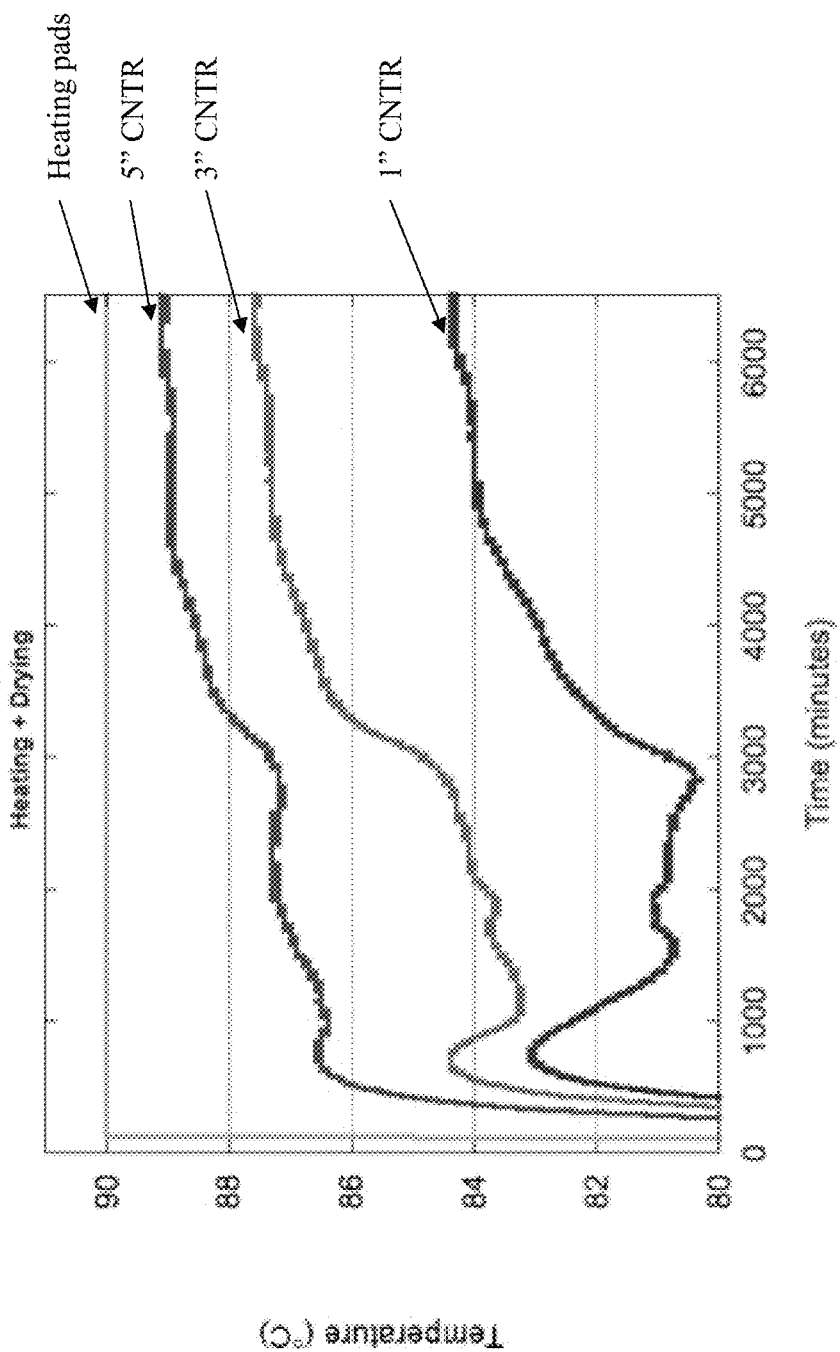
FIG. 18 is a graph of the temperature at heating pads used to heat the slab, and at different height locations defined within the slab as a function of time during a process in which heating and drying processes are taking place.

FIG. 18 shows the time dependence of temperature at three places within a hollow-core slab at different distances from the slab bottom in a heating and drying operation. In this case the prereacted, dry slab was filled with water by submerging in water over night. For the data shown in FIG. 18, air was used as the gas (rather than $CO_2$) and was caused to low at 1 atmosphere pressure and 9 liters/minute as in FIG. 16 and FIG. 17. Because no $CO_2$ was present, no carbonation reaction took place but heating and drying were performed.

Figure 19:
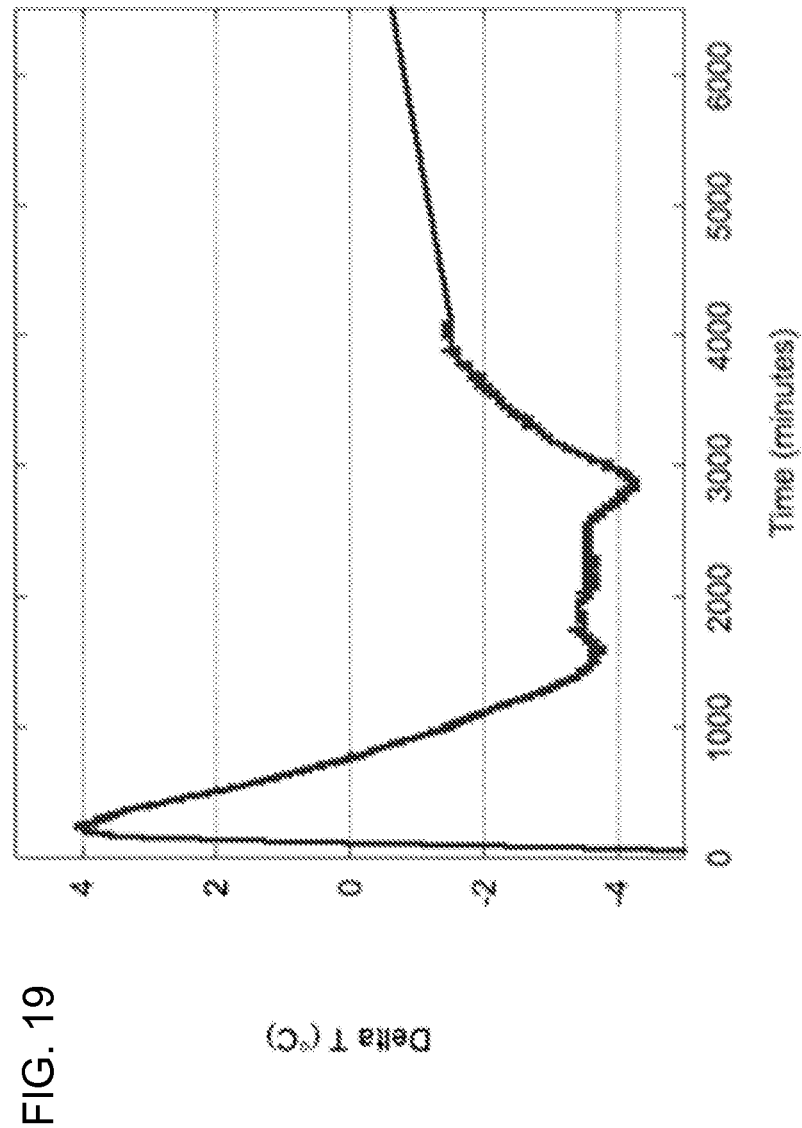
FIG. 19 is a graph showing the calculated temperature change with time for a drying process alone, obtained by subtracting the heating data in FIG. 17 from the heating and drying data in FIG. 18.

FIG. 19 is a graph showing the calculated temperature change with time for a drying process alone, obtained by subtracting the heating data in FIG. 17 from the heating and drying data in FIG. 18.

Figure 20:
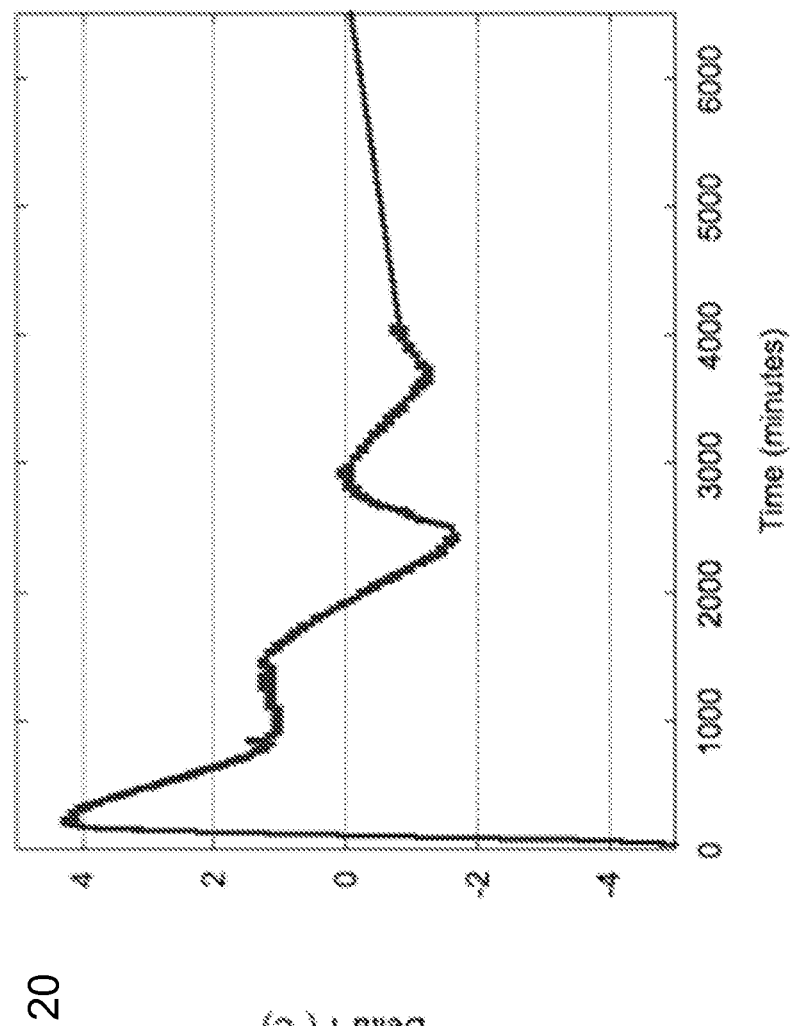
FIG. 20 is a graph showing the calculated temperature change with time for drying and curing (carbonation) processes, obtained by subtracting the data in FIG. 18 from the data in FIG. 16.

FIG. 20 is a graph showing the calculated temperature change with time for drying and curing (carbonation) processes, obtained by subtracting the data in FIG. 18 from the data in FIG. 16.

Figure 21:
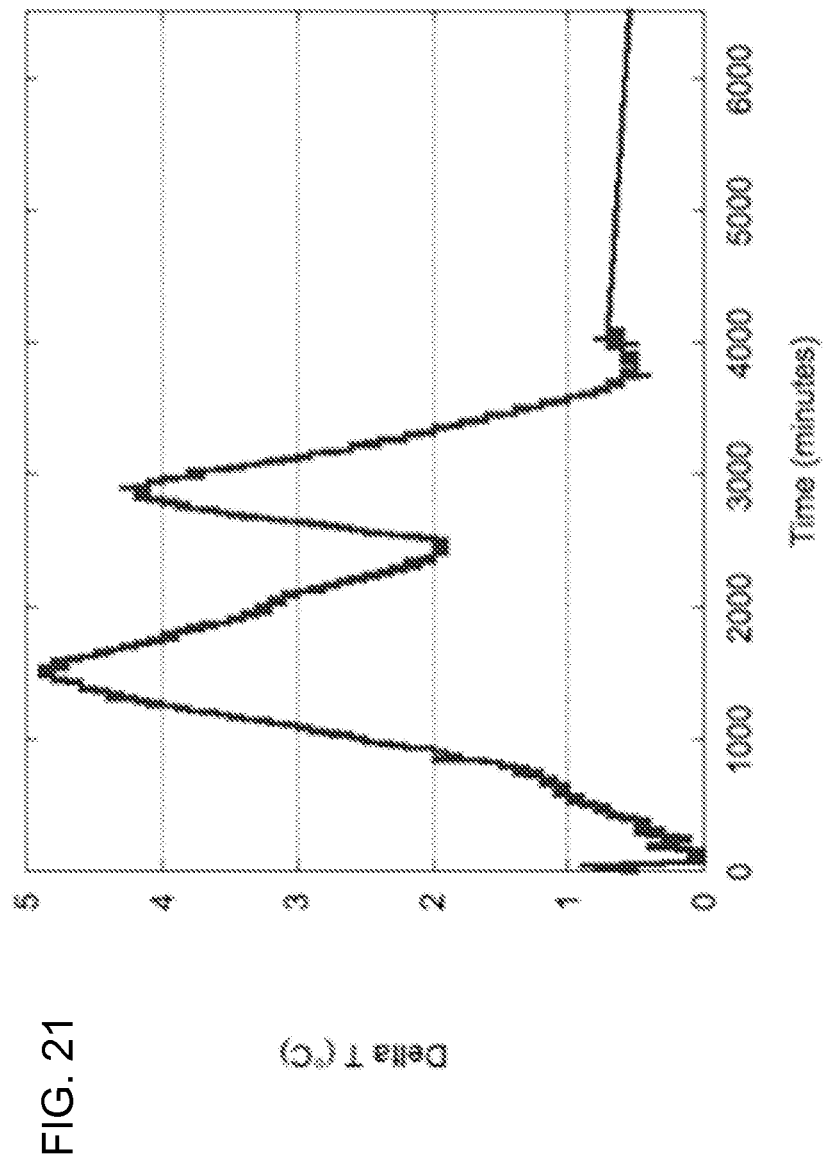
FIG. 21 is a graph showing the calculated temperature change with time for the carbonation process, obtained by subtracting the data in FIG. 19 (drying) from the data in FIG. 20 (drying and carbonation).

FIG. 21 is a graph showing the calculated temperature change with time for the carbonation process, obtained by subtracting the data in FIG. 19 (drying) from the data in FIG. 20 (drying and carbonation).

Figure 22:
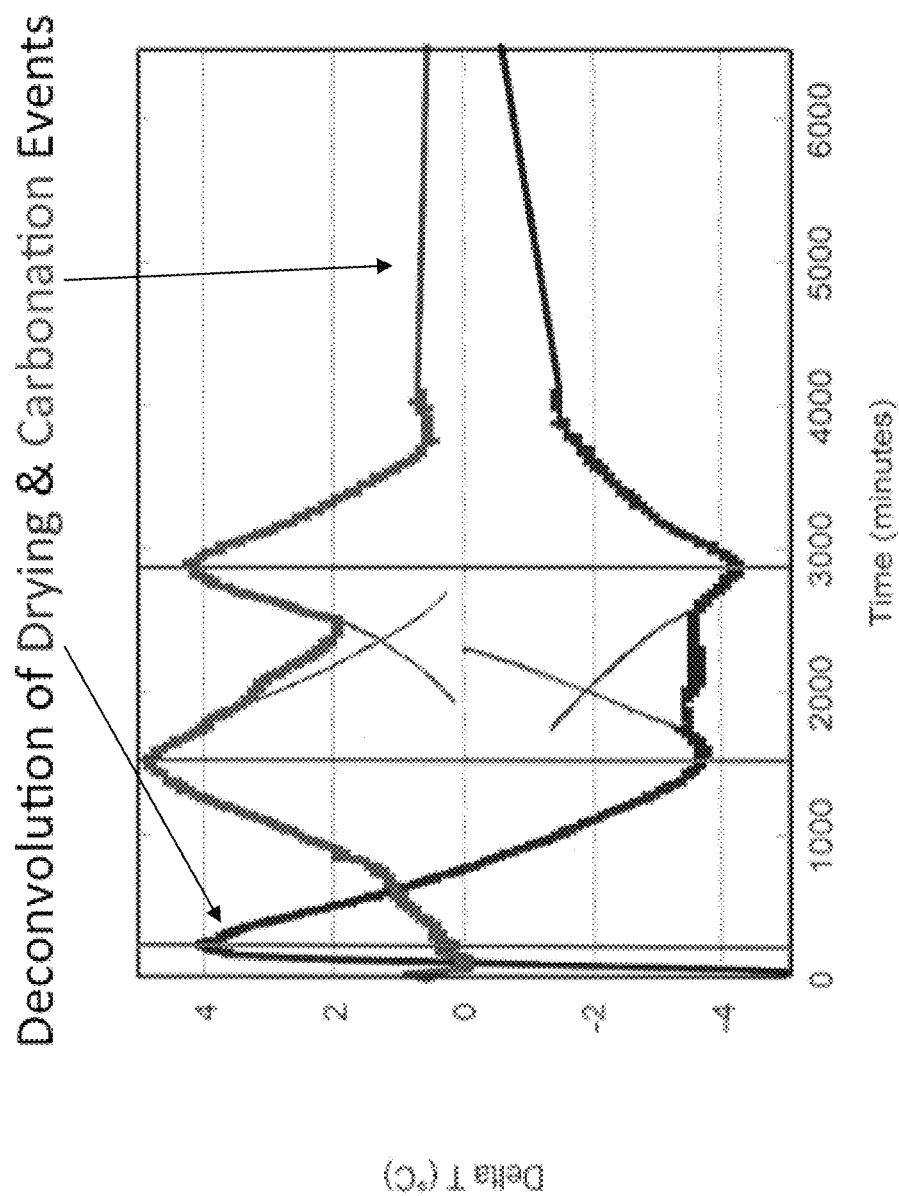
FIG. 22 is a graph showing the calculated temperature behavior with time for drying alone and for carbonation alone (de-convolution).

FIG. 22 is a graph showing the calculated temperature behavior with time for drying alone and for carbonation alone (de-convolution). Comparison of the carbonation exotherm with the drying endotherm plotted on the same time scale in FIG. 22.

One can conclude from these observations that drying and carbonation are coupled, simultaneous events. Both processes occur in two stages. The first stage effect is approximately twice as large as the second stage effect. In the example described, out of the total reaction completion of 65%, about 43% occurred in stage 1 and 22% in stage 2. The extent of reaction was limited by water availability to 65%. With the casting bed as the only source of heat (at 90° C.), slab heating and carbonation are too slow to be practical. It appears that it is advantageous to heat the gas stream as well as the bed. Water management also is advantageously performed to prevent premature dryout, which limits reaction completion.

Figures 23A, 23B, 23C:
FIG. 23A is an image of a cured slab.
FIG. 23B is an image of a cured slab immersed in a water bath.
FIG. 23C is a closeup image of the cured slab of FIG. 23B after immersion in water showing the wetting front rising toward the top surface of the slab.

FIG. 23A through FIG. 23C show the re-infiltration of water into a slab by submersion. One can compute the fraction of original porosity remaining after reaction as the ratio of the weight of uptake water/weight of water in the initial mix. Here, that ratio is 66%, therefore 33% of the original porosity was closed off by reaction even though the carbonation proceeded to 65% completion.

Hollow core (HC) slab production is a particularly challenging precast application for $CO_2$ composite material. In a typical commercial plant a conventional concrete slab is extruded on a heated bed that is between 300 feet and 1000 feet long. The slabs are pre-tensioned by steel cables that run the length of the bed because, in application, the slabs often must support loads across rather long spans between columns. A single long slab is cut into smaller segments (such as 10 feet, 20 feet, 30 feet and so forth) as required for the particular job at hand after the extrusion has been cured sufficiently. The long slab cannot be cut before attaining a compressive strength of at least about 3000 psi or it cannot resist the pre-tensioning force. It is not economically feasible to individually pretension short HC slabs, so the entire length of the extrusion preferably is to be cured as a single piece. This means, in the case of $CO_2$ composite material, not only does one need to manage a vertical temperature gradient but also gradients in both temperature and relative humidity that can develop along the length of the bed. The discussion and associated figures show how this can be achieved.

Figures 24A, 24B:
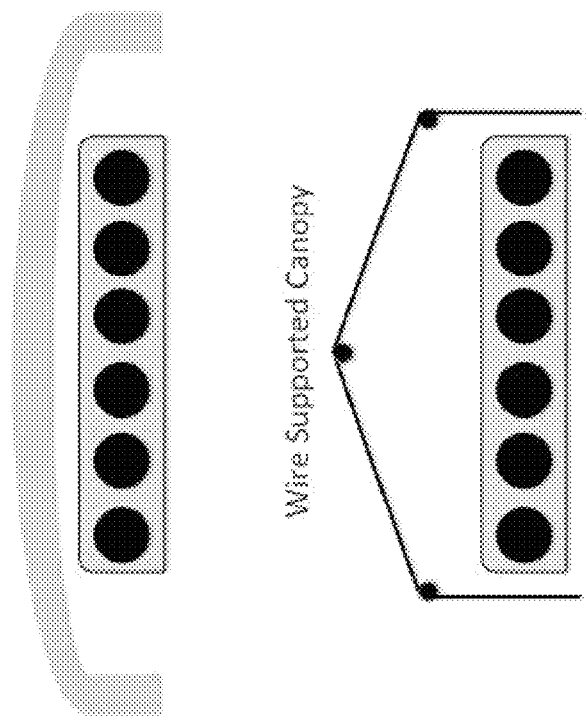
FIG. 24A is a schematic diagram in end view of an inflatable canopy in which a material to be cured (such as a hollow core slab) is placed.
FIG. 24B is a schematic diagram in end view of a wire supported canopy in which a material to be cured (such as a hollow core slab) is placed.

FIG. 24A is a schematic diagram in end view of an inflatable canopy in which a material to be cured (such as a hollow core slab) is placed.

FIG. 24B is a schematic diagram in end view of a wire supported canopy in which a material to be cured (such as a hollow core slab) is placed.

Figures 25A, 25B:
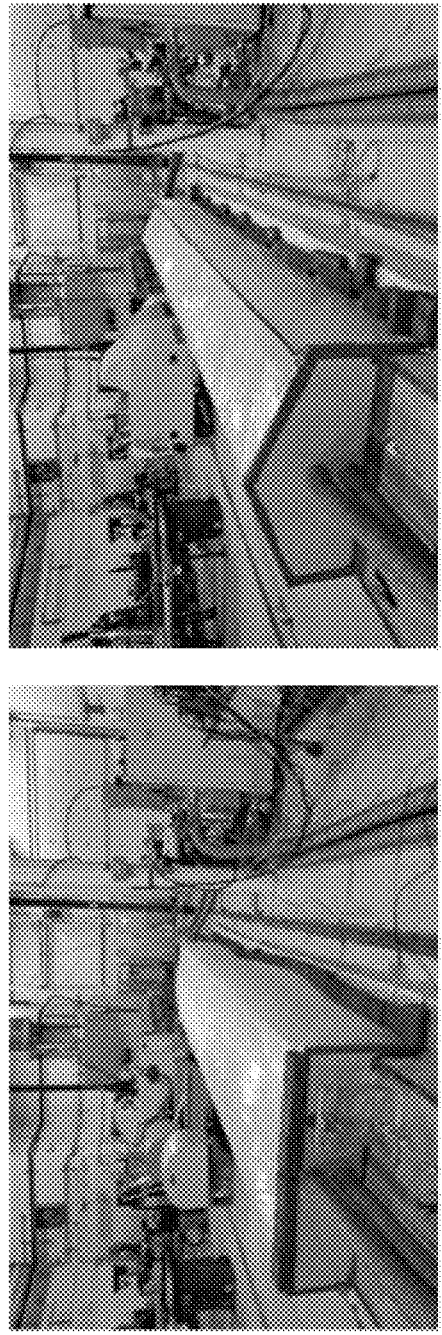
FIG. 25A is an image of one embodiment of an inflatable canopy for curing materials.
FIG. 25B is an image of one embodiment of a wire supported canopy for curing materials.

FIG. 25A is an image of one embodiment of an inflatable canopy for curing materials.

FIG. 25B is an image of one embodiment of a wire supported canopy for curing materials.

Figures 26A, 26B, 26C:
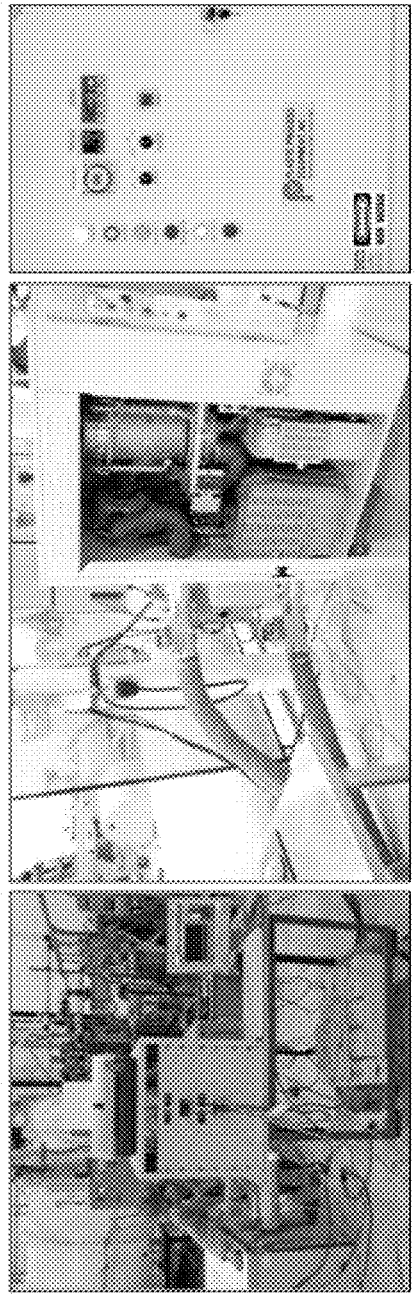
FIG. 26A is an image of a computer used for processing plastic materials that was modified to be used in curing $CO_2$ composite materials.
FIG. 26B is an image of process equipment including a variable speed blower, make up $CO_2$ apparatus, water condenser, desiccant dryer, process gas heater and flow direction control used in curing $CO_2$ composite materials.
FIG. 26C is an image of a process control panel used in curing $CO_2$ composite materials.

FIG. 26A is an image of a computer used for processing plastic materials that was modified to be used in curing $CO_2$ composite materials.

FIG. 26B is an image of process equipment including a variable speed blower, make up $CO_2$ apparatus, water condenser, desiccant dryer, process gas heater and flow direction control used in curing $CO_2$ composite materials.

FIG. 26C is an image of a process control panel used in curing $CO_2$ composite materials.

Figure 27A:
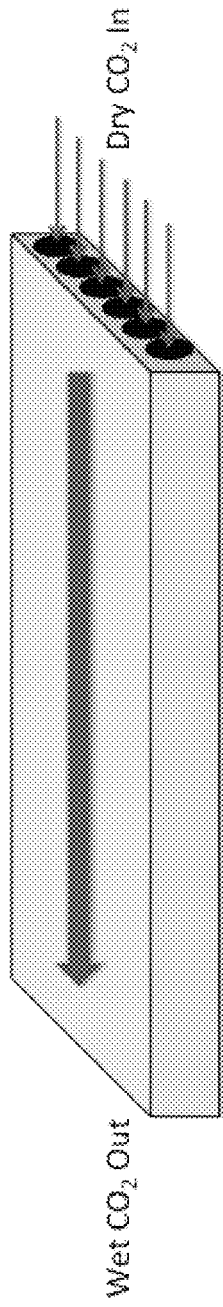
FIG. 27A is a schematic diagram that illustrates a problem that is encountered when a unidirectional flow of process gases is used in curing long $CO_2$ composite materials.
Figure 27B:
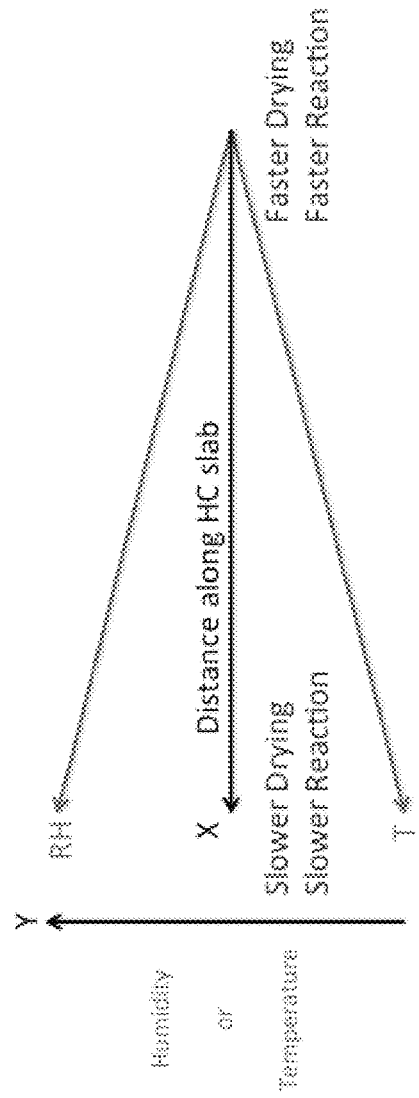
FIG. 27B is a schematic diagram that shows how the humidity and temperature vary along a $CO_2$ composite material when a unidirectional flow of process gases is used.

FIG. 27A and FIG. 27B illustrate why a single gas flow direction leads to problems. FIG. 27A is a schematic diagram that illustrates a problem that is encountered when a unidirectional flow of process gases is used in curing long $CO_2$ composite materials. FIG. 27B is a schematic diagram that shows how the humidity and temperature vary along a $CO_2$ composite material when a unidirectional flow of process gases is used. As is seen from FIG. 27B, for a long length of material to be cured, the relative humidity rises (and for a long enough object will attain saturation) and the temperature will fall, leading to a slower reaction rate (and possibly a cessation of reaction far along the slab) until the reaction front traverses the entire slab.

Figures 28A, 28B:
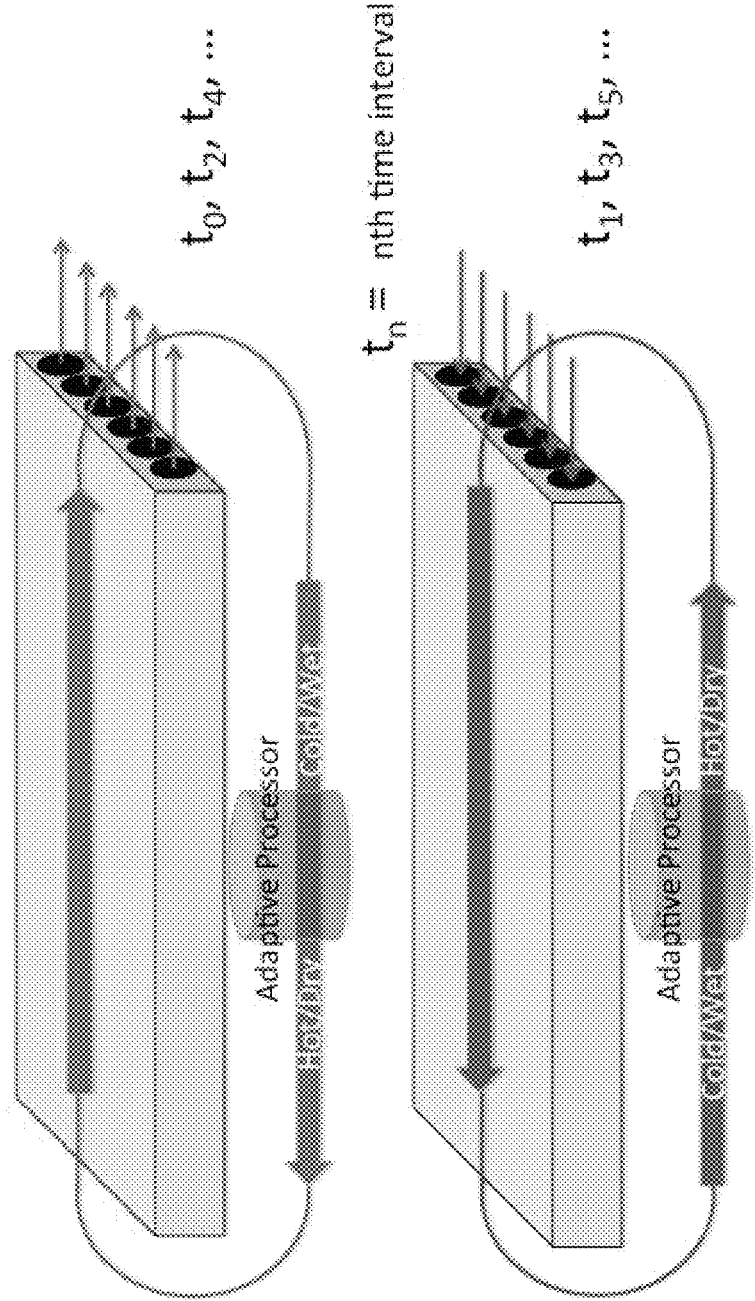
FIG. 28A is a schematic diagram that illustrates the changes in process gases in a first direction of flow of the process gases used in curing long $CO_2$ composite materials.
FIG. 28B is a schematic diagram that illustrates the changes in process gases in a second direction of flow of the process gases used in curing long $CO_2$ composite materials, in which the first direction and the second direction are reversed, one from the other.

FIG. 28A and FIG. 28B illustrate some of the features of the invention. FIG. 28A is a schematic diagram that illustrates the changes in process gases in a first direction of flow of the process gases used in curing long $CO_2$ composite materials. FIG. 28B is a schematic diagram that illustrates the changes in process gases in a second direction of flow of the process gases used in curing long $CO_2$ composite materials, in which the first direction and the second direction are reversed, one from the other. In one embodiment, the oscillating gas flow establishes "time averaged" mirror symmetry along the length of the bed while maintaining side-to-side mirror symmetry. It is seen that periodic reversal of temperature and humidity gradients in a symmetrical curing chamber can time average these gradients to zero resulting in uniform physical properties in the cured hollow core slab.

In order to carry out the process as illustrated in FIG. 28A and FIG. 28B, one can use a soft-wall curing chamber to contain the curing gases ($CO_2$ and $H_2O$). The curing chamber can employ an inflatable or wire suspended canopy which provides the advantages of being easy to setup, easy to take down, easy to transport, and inexpensive to construct.

The system further includes adaptive gas conditioning of recirculating curing gases. It includes multiple sensors that reveal the current process state as the process is operated. It includes actuation hardware to move the process to new state by changing process variables. Operation can be controlled using a general purpose programmable computer operating under the control of a set of instructions that rely on an algorithm to perform analysis of sensor data and control of the actuation hardware and process conditions.

In particular, the system can control the process variables of humidity, temperature, gas flow direction and gas flow speed. The system can be constructed at a low capital cost, and is believed to be suitable for curing all solid precast concrete products that use $CO_2$ as a reagent. The system can control heating, ventilation and $CO_2$ conditioning engineering.

We now present some data relating to actual hollow core slab material that has been process using the systems and methods of the invention.

Hollow core slabs were extruded on a commercial extrusion bed using a commercial extruder (Elematic). The curing chamber was erected over the extruded slab and attached to the gas conditioning system. The air in the chamber was exchanged for $CO_2$ (typically >90%) by purging. A blower, which is part of the gas conditioning system, circulated the atmosphere within the chamber. The gas flow is reversed periodically (typically every 30 or 60 minutes). Water removal from the circulating gases controls the drying rate of the slab. The drying rate is strongly coupled to the curing rate. The cure was affected by controlling the bed temperature (typically 70° C.), the gas inlet temperature (75 and 70° C. in the examples), and the blower speed (typically 30 Hz). The differential pressure between the inside and outside of the chamber was maintained at about 0.12 inches of water column (IWC). As the gas flowed along the bed it was cooled by water evaporating from the slab and its relative humidity increased. When the gas flow direction was reversed so was the direction the temperature and humidity gradients. The periodic reversals served to average out the effects of temperature and humidity gradients. As the slab dried the relative humidity within the curing chamber decreased. The initial drop in relative humidity signaled the onset of the curing reaction. When the upper level of the humidity envelope dropped below about 30% that was taken as a signal of the end of curing. The progress of the cure was also followed by monitoring the rate of $CO_2$ uptake (first derivative of the accumulated total of $CO_2$ added to the system to maintain a constant differential pressure), and the accumulation of condensate water.

The hollow-core slabs in the examples were made from lightweight aggregate, sand and Solidia cement. They were variously 12 or 15 feet long, 4 feet wide and 8 inches high. Each slab had 6 cores. Each core was 7 inches in diameter.

We have used the same curing system to cure concrete pavers, concrete blocks (also known as CMUs) and a prototype concrete railroad tie.

Figures 29A, 29B, 29C:
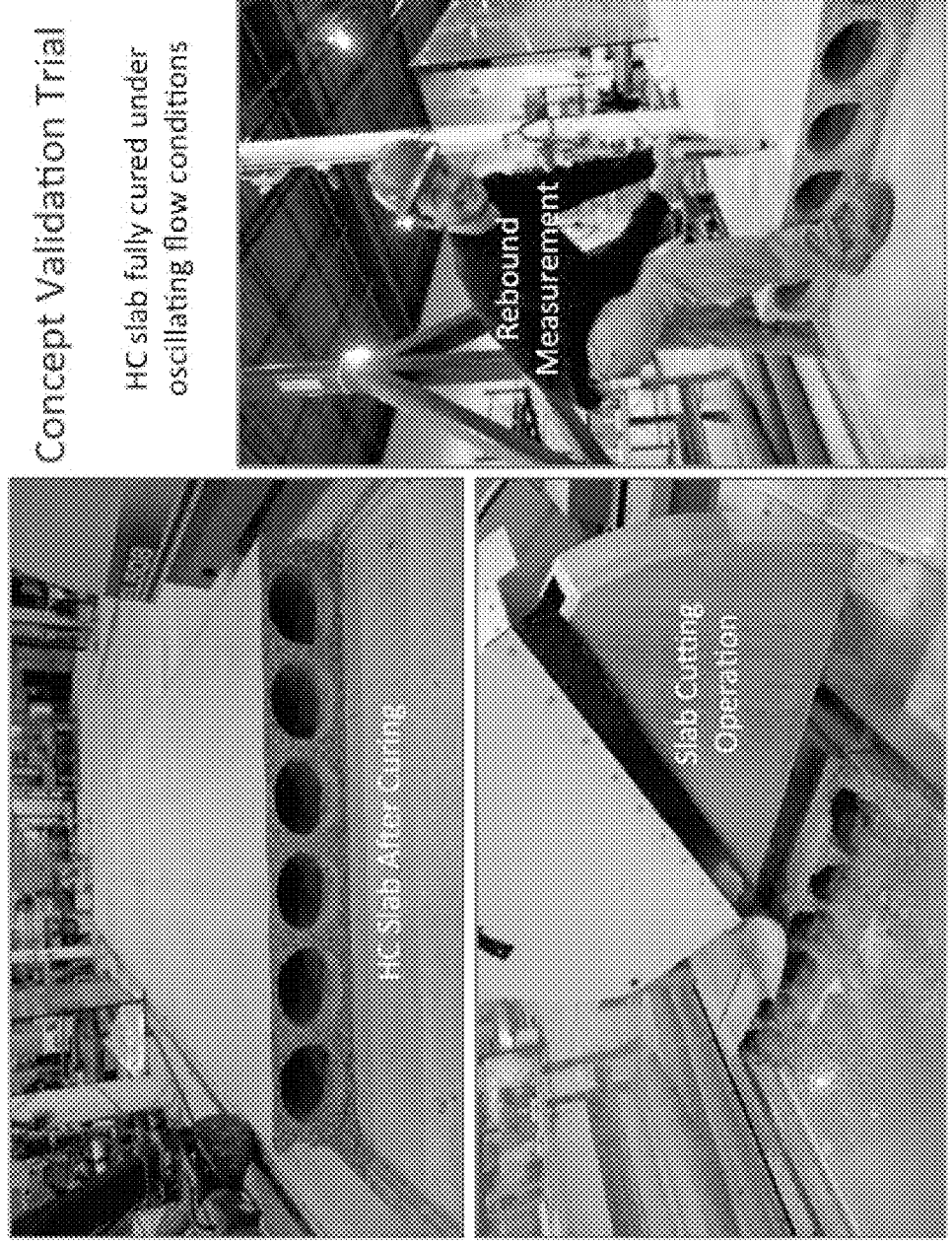
FIG. 29A is an image of a hollow core slab seen end on, after curing under oscillating conditions (the flow reversal procedure) as illustrated in FIG. 28A and FIG. 28B.
FIG. 29B is an image of a slab cutting operation, in which a cured slab is cut to a desired length.
FIG. 29C is an image of a worker performing a rebound measurement on a cured hollow core slab.

FIG. 29A is an image of a hollow core slab seen end on, after curing under oscillating conditions (the flow reversal procedure) as illustrated in FIG. 28A and FIG. 28B.

FIG. 29B is an image of a slab cutting operation, in which a cured slab is cut to a desired length.

FIG. 29C is an image of a worker performing a rebound measurement on a cured hollow core slab.

Figure 30:
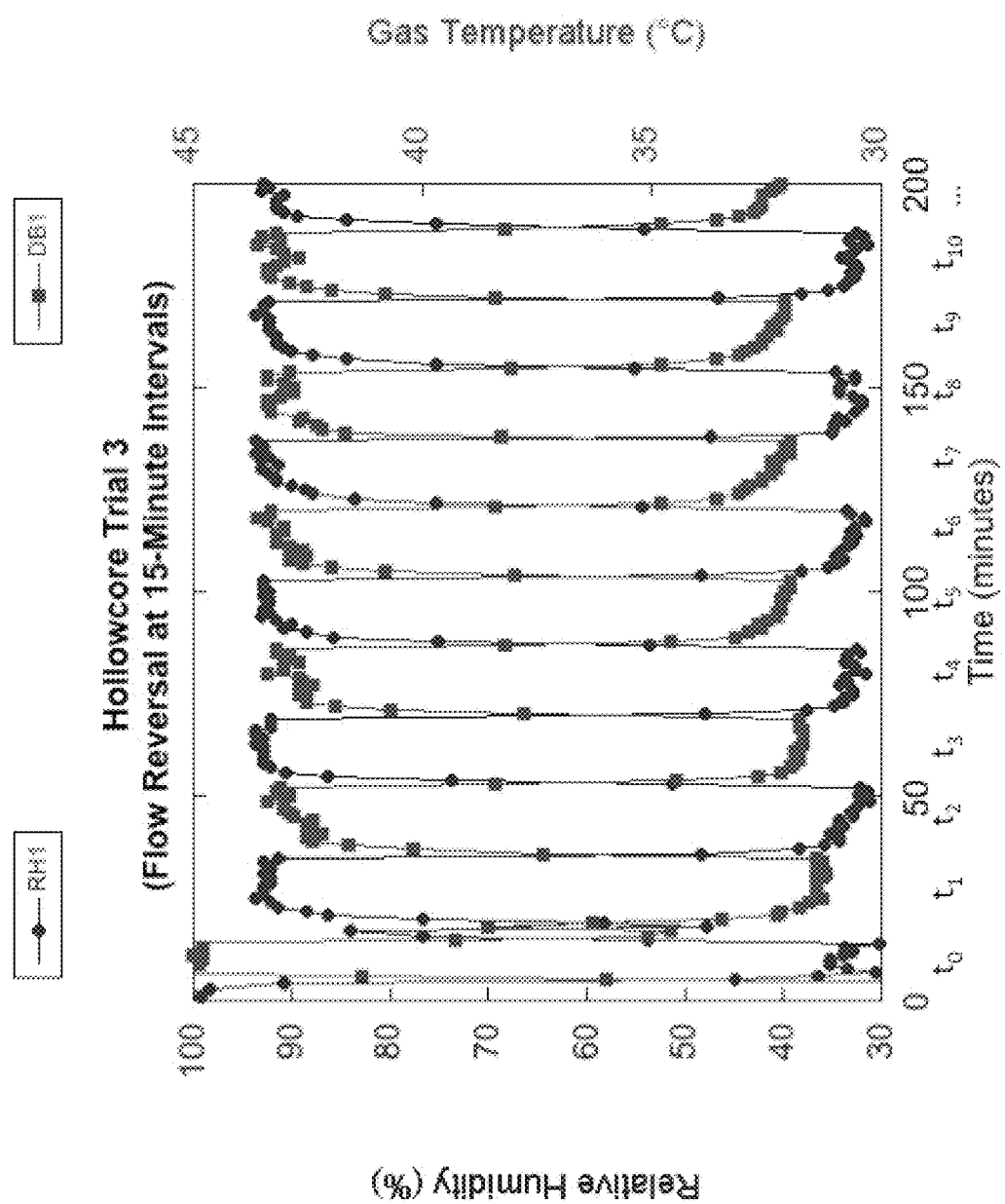
FIG. 30 is a graph showing the relative humidity (diamonds) and the gas temperature (squares) in gas flows as a function of time, using the flow reversal procedure illustrated in FIG. 28A and FIG. 28B, with reversal of flow direction at 15 minute intervals.

FIG. 30 is a graph showing the relative humidity (diamonds) and the gas temperature (squares) in gas flows at one end of the hollow-core slab in Hollow-core Trial 3 as a function of time, using the flow reversal procedure illustrated in FIG. 28A and FIG. 28B, with reversal of flow direction at 15 minute intervals. It is seen that the gas temperature (DB1) is high (~43 C) and the relative humidity (RH1) is low (~33%) when this end is the gas inlet; when this end is the gas outlet, the DB1 is lower (~33 C) and RH1 is higher (93%).

Figure 31:
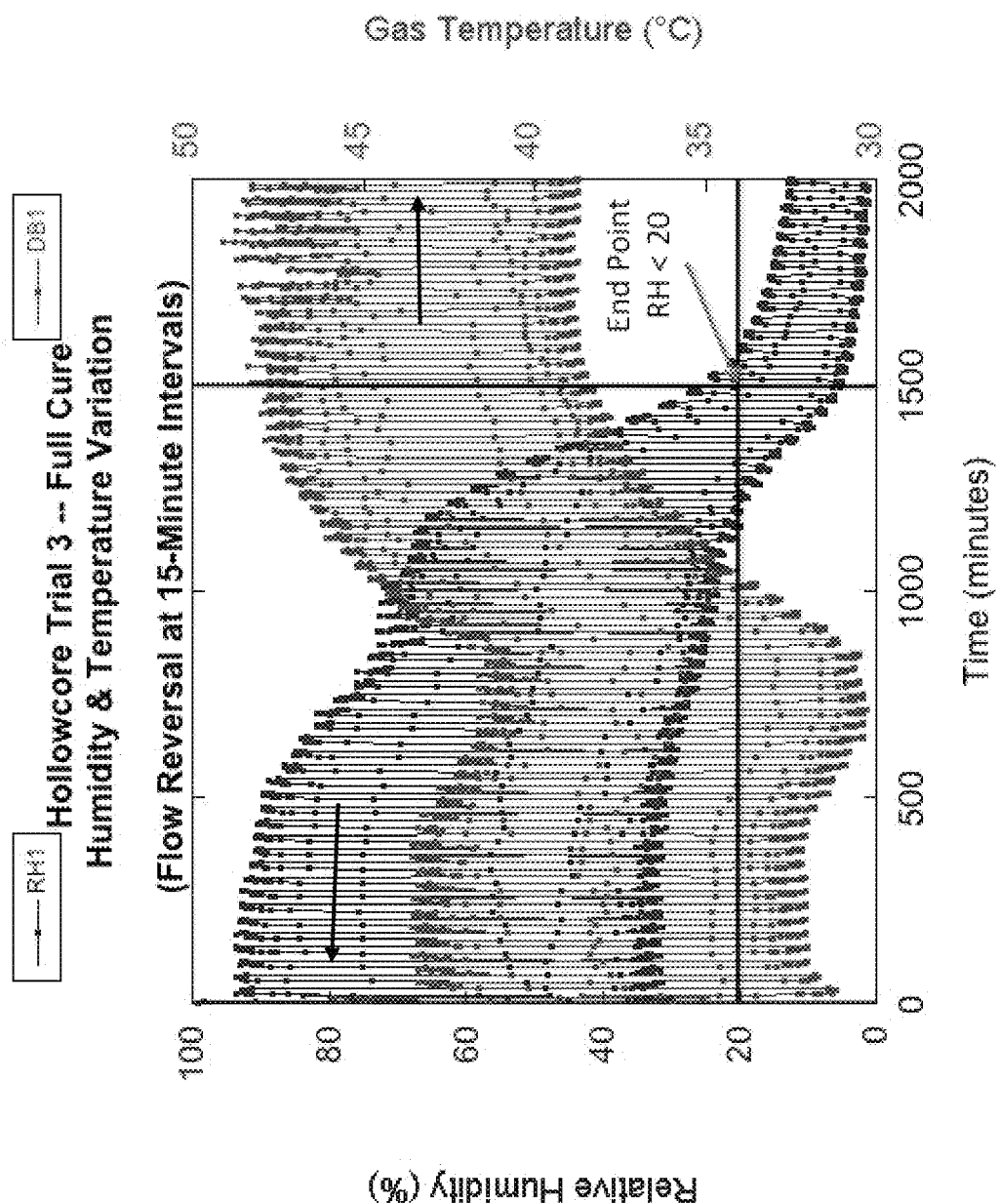
FIG. 31 is a graph over an entire 2000 minute procedure showing the relative humidity (diamonds) and the gas temperature (squares) in gas flows as a function of time, using the flow reversal procedure illustrated in FIG. 28A and FIG. 28B, with the end point of the process being the point where the relative humidity does not exceed 20%.

FIG. 31 is a graph over the entire 2000 minute procedure of Hollow-core Trial 3 showing the relative humidity (diamonds) and the gas temperature (squares) in gas flows as a function of time, using the flow reversal procedure illustrated in FIG. 28A and FIG. 28B, with the end point of the process being the point where the relative humidity does not exceed 20%. The data are measured at one end of the hollow-core slab in Hollow-core Trial 3.

FIG. 32 through FIG. 37 show operational data taken in curing hollow core slabs according to principles of the invention.

Figure 32:
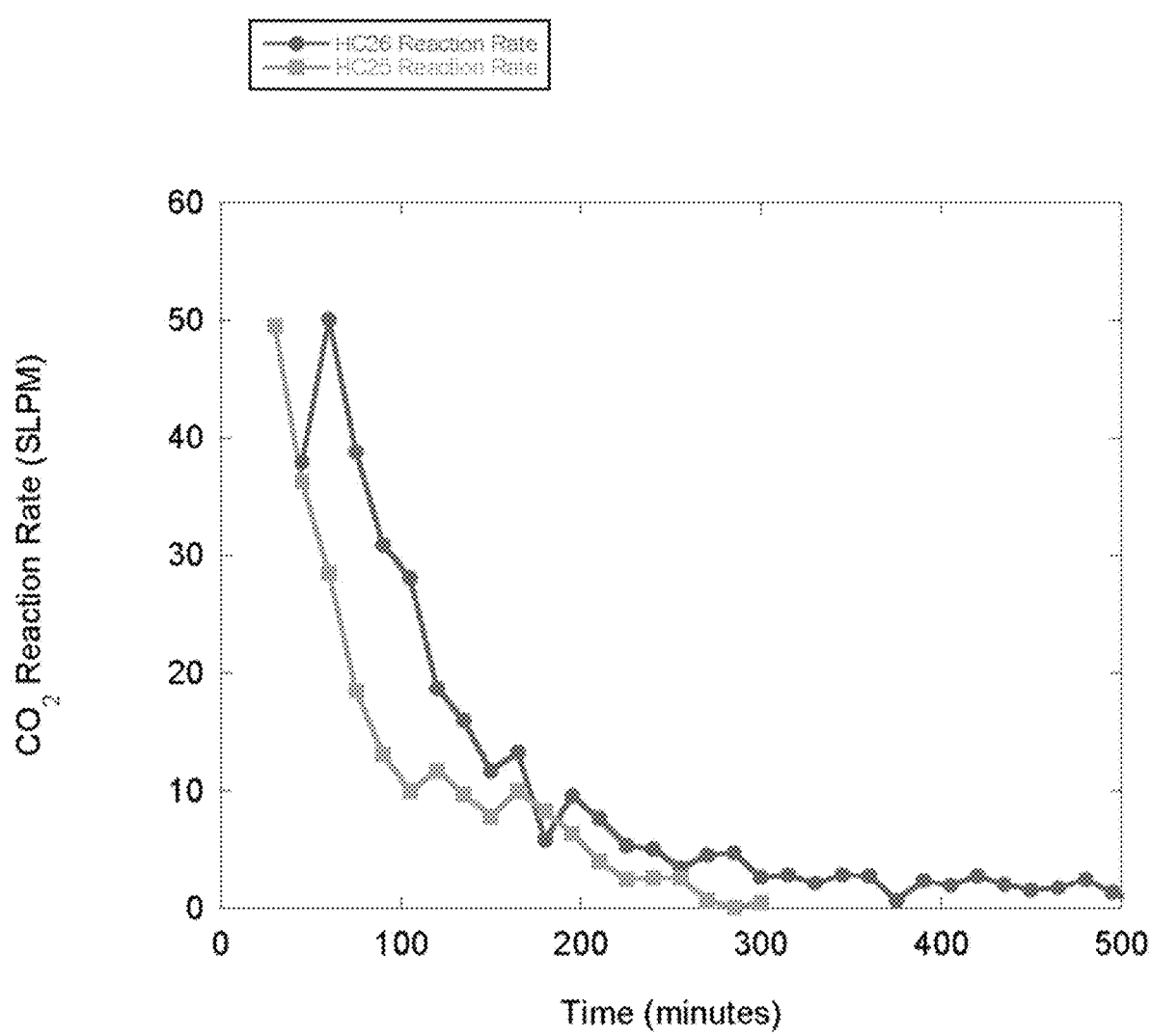
FIG. 32 is a graph showing the $CO_2$ reaction rate with time for two hollow core specimens.

FIG. 32 is a graph showing the $CO_2$ reaction rate with time for two hollow core specimens.

Figure 33:
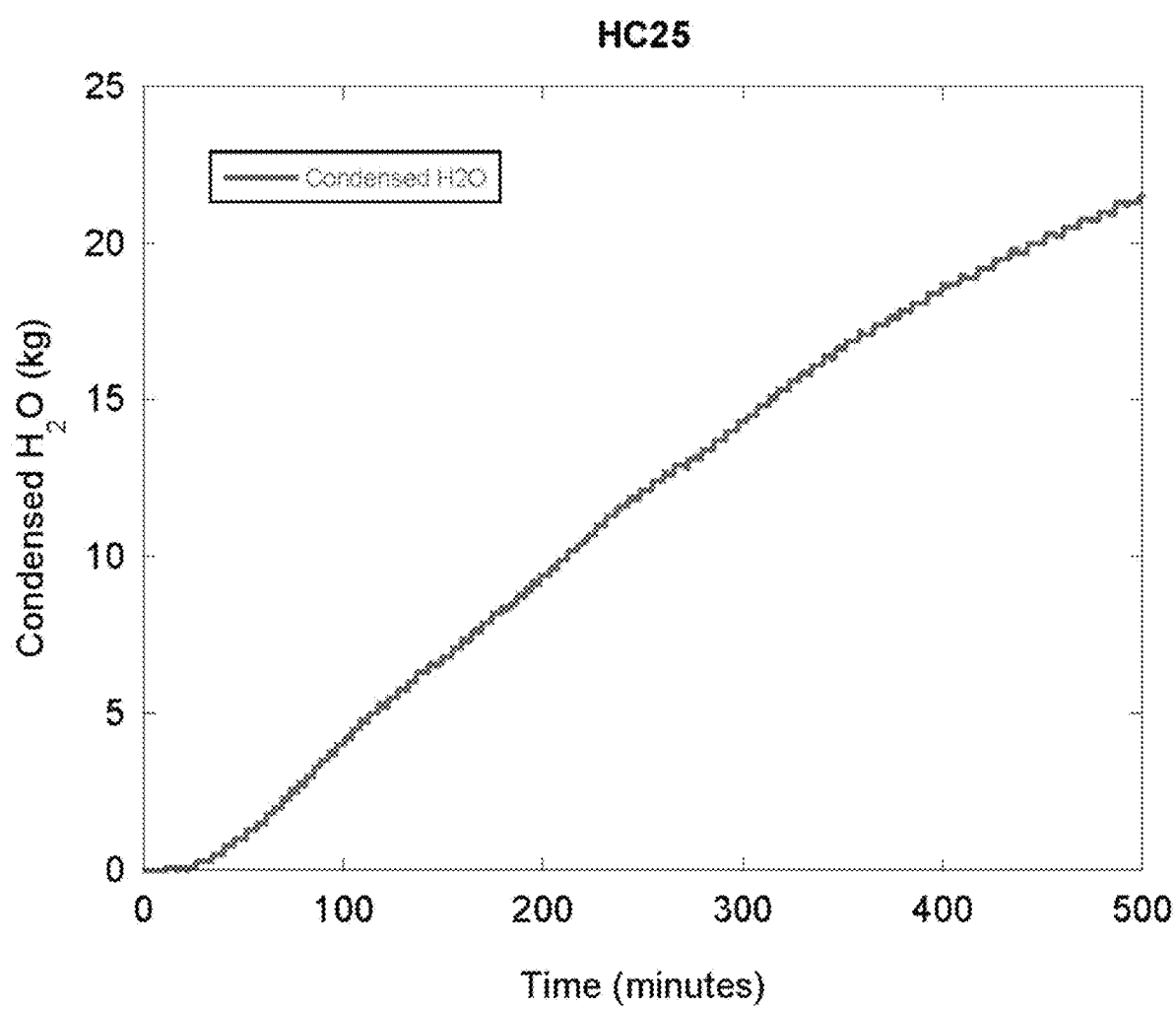
FIG. 33 is a graph showing the amount of condensed water with time for one hollow core specimen.

FIG. 33 is a graph showing the amount of condensed water with time for one hollow core specimen.

Figure 34:
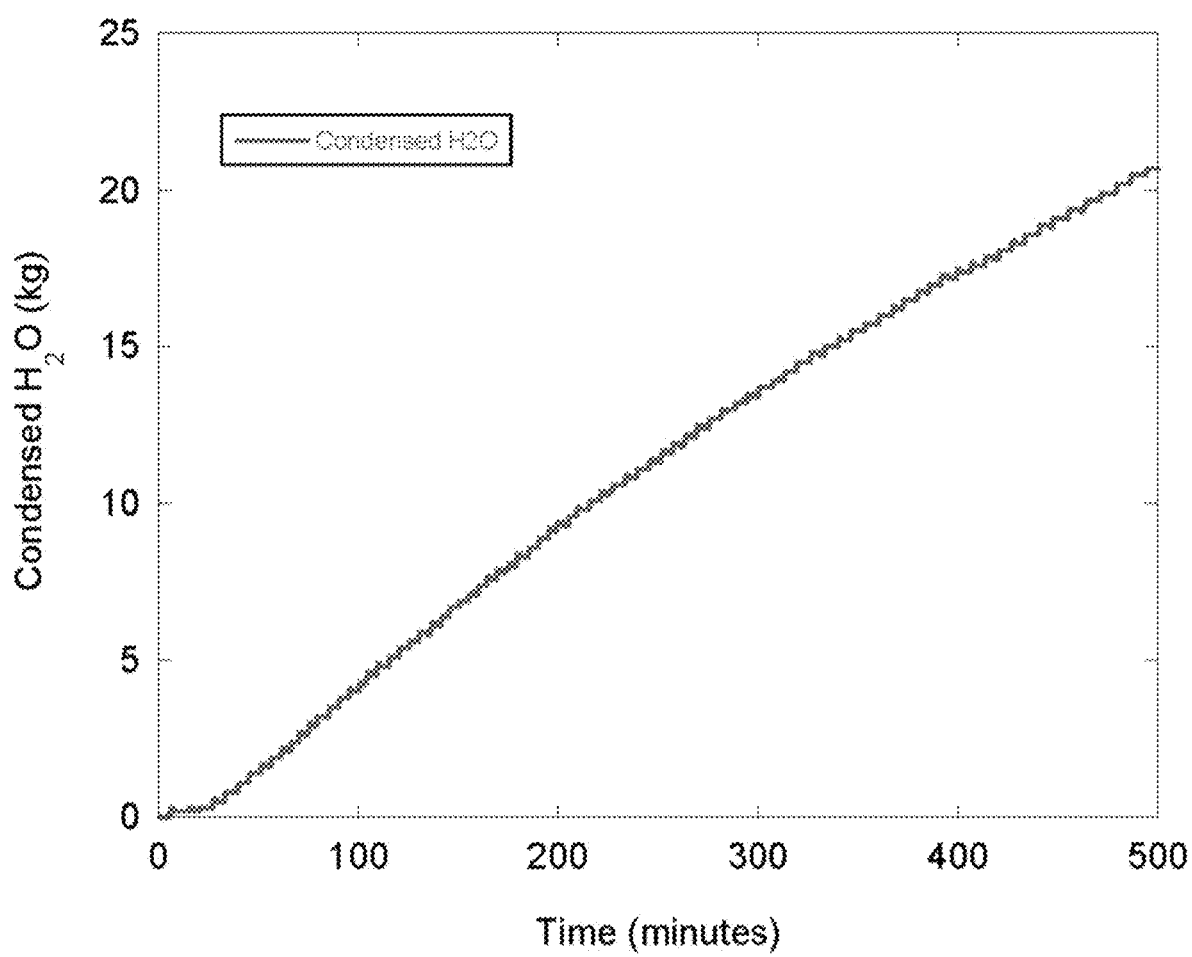
FIG. 34 is a graph showing the amount of condensed water with time for a second hollow core specimen.

FIG. 34 is a graph showing the amount of condensed water with time for a second hollow core specimen.

Figure 35:
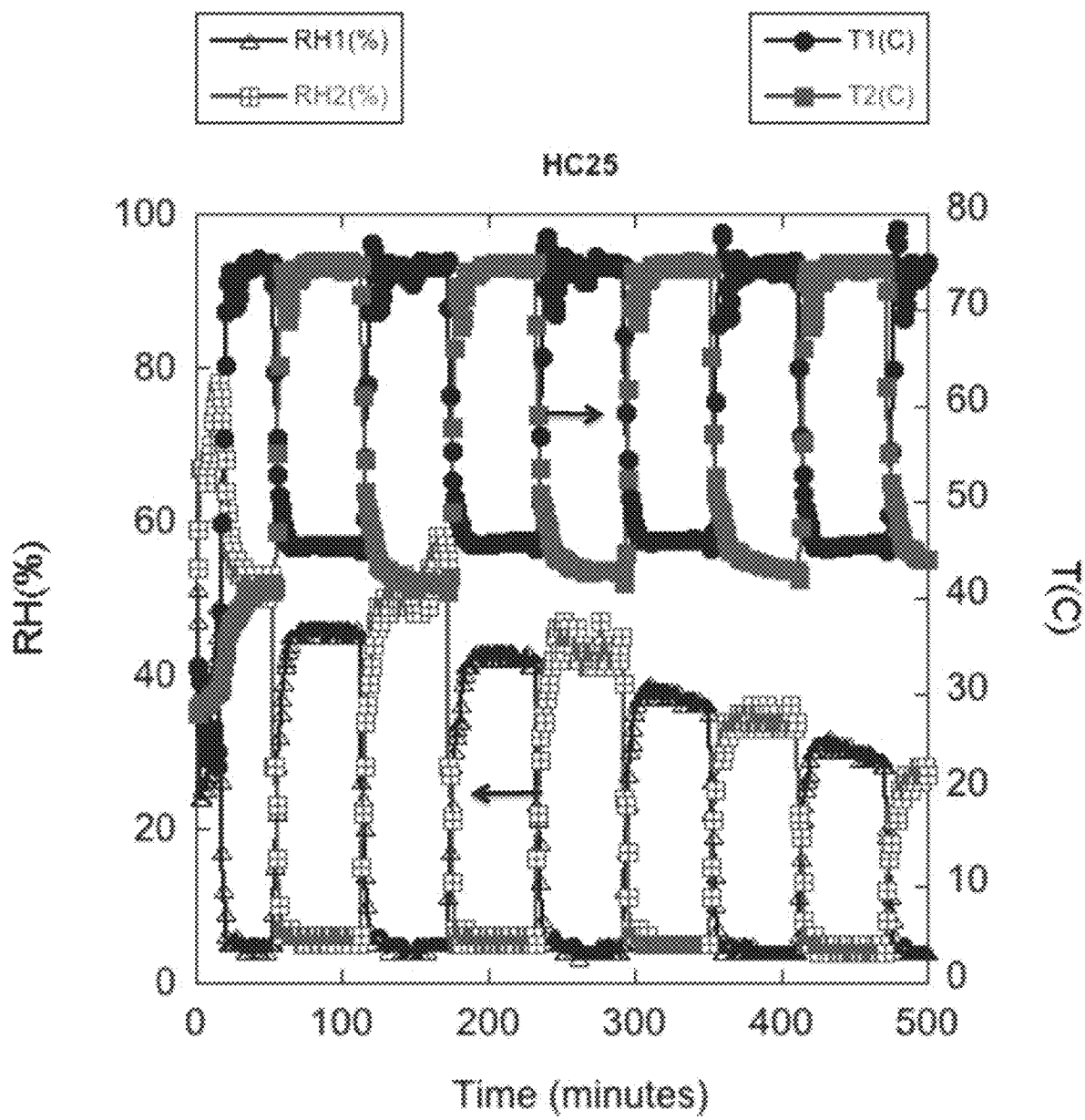
FIG. 35 is a graph showing the time evolution of the relative humidity and the gas temperature in the two opposite gas flows for one hollow core specimen during the early stages of a curing process.

FIG. 35 is a graph showing the time evolution of the relative humidity and the gas temperature in the two opposite gas flows for one hollow core specimen during the early stages of a curing process in Hollow-core Trial 25. Relative humidity RH1 and temperature T1 were measured at one end of the hollow-core slab while relative humidity RH2 and temperature T2 were measured at the other end of the hollow-core slab.

Figure 36:
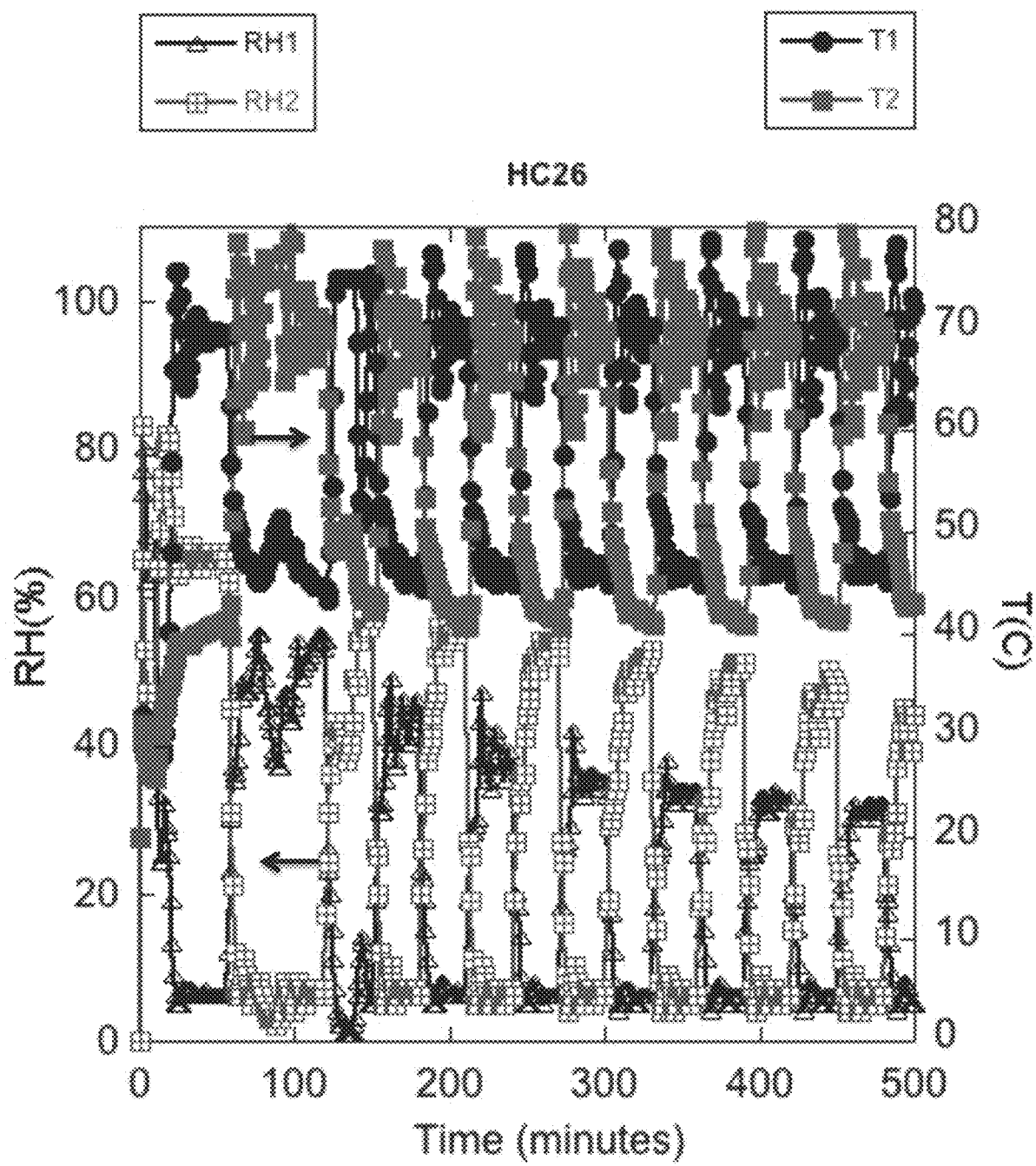
FIG. 36 is a graph showing the time evolution of the relative humidity and the gas temperature in the two opposite gas flows for a second hollow core specimen during the early stages of a curing process.

FIG. 36 is a graph showing the time evolution of the relative humidity and the gas temperature in the two opposite gas flows for a second hollow core specimen (Hollow-core Trial 26) during the early stages of a curing process.

Figure 37:
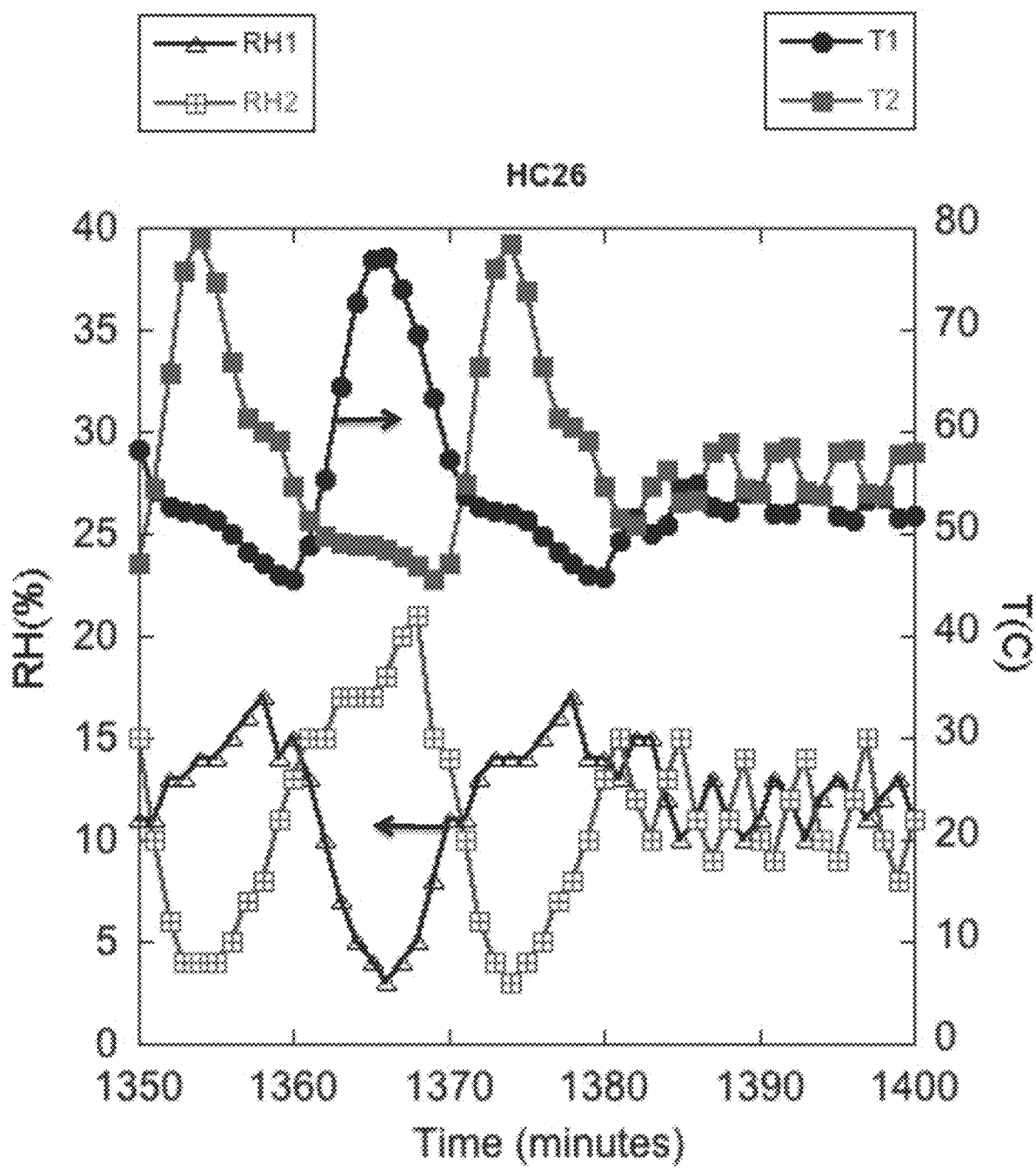
FIG. 37 is a graph showing the time evolution of the relative humidity and the gas temperature in the two opposite gas flows for a second hollow core specimen at the end of the curing process, showing the effect of changing the gas flow reversal frequency on RH and T.

FIG. 37 is a graph showing the time evolution of the relative humidity and the gas temperature in the two opposite gas flows for a second hollow core specimen (Hollow-core Trial 26) at the end of the curing process, showing the effect of changing the gas flow reversal frequency on RH and T levels Table 2 lists some parameters that demonstrate the validity of the approach based on observed results of operation.

TABLE 2

| Initial Relative Humidity | Time-Averaged |
|---|---|
| $RH_{low}$ = 33% $RH_{high}$ = 93% | $RH_{average}$ = 63% |
| Initial Gas Temperature | Time-Averaged |
| $T_{low}$ = 33° C. $T_{high}$ = 43° C. | $T_{average}$ = 38° C. |
| Curing at Near-Ambient Conditions | |
| P = 1 Atmosphere | |
| T = 38°(is near the body temperature of humans | |

Additional observations further support the approach described.

The adequacy of inexpensive sensors is demonstrated by the successful use of wet bulb/dry bulb thermocouples to sense progression of curing process and indicate when curing is complete.

The effectiveness of computer control is demonstrated by the relatively rapid cure under mild conditions on the first try. Curing was completed in 25 hours (1500 minutes) at ambient pressure and low temperature (38° C.), The uniformity of mechanical properties further demonstrates that the approach is effective. Forty-nine (49) rebound (R) measurements indicate uniform curing over full 8"×4'×18' hollow core (HC) slab, with $R_{average}$=37 (comparable to conventional concrete cured 45 days), a standard deviation $\sigma_R$=3, $R_{max}$=47, and $R_{min}$=32.

This invention is generally applicable to any concrete product. Precast products made in a factory setting are preferable, e.g. hollow core slabs or planks; but "on-site" production as in a field-deployable, stackable, low-temperature, low-pressure reactor for making highway white toppings is also facilitated. It is believed that the invention should work to cure any precast product. In the extreme it may be employed for making concrete highways, segment by segment.

FIG. 38 through FIG. 58 show various embodiments of curing chambers for making hollow-core slabs from Solidia concrete. In some embodiments, the curing chambers have side-to-side mirror symmetry as well as mirror symmetry along the bed axis.

Figure 38:
FIG. 38 is an image of a curing chamber assembly including a weighted gas seal, a polymer sheet cover, and a gas outlet hose, in which the $CO_2$ gas inlet was located at the other end of the slab.

FIG. 38 is an image of a curing chamber assembly including a weighted gas seal 3830, a polymer sheet cover 3810, and a gas outlet hose 3820, in which the $CO_2$ gas inlet was located at the other end of the slab. This was a flow through system with no gas recirculation.

Figure 39:
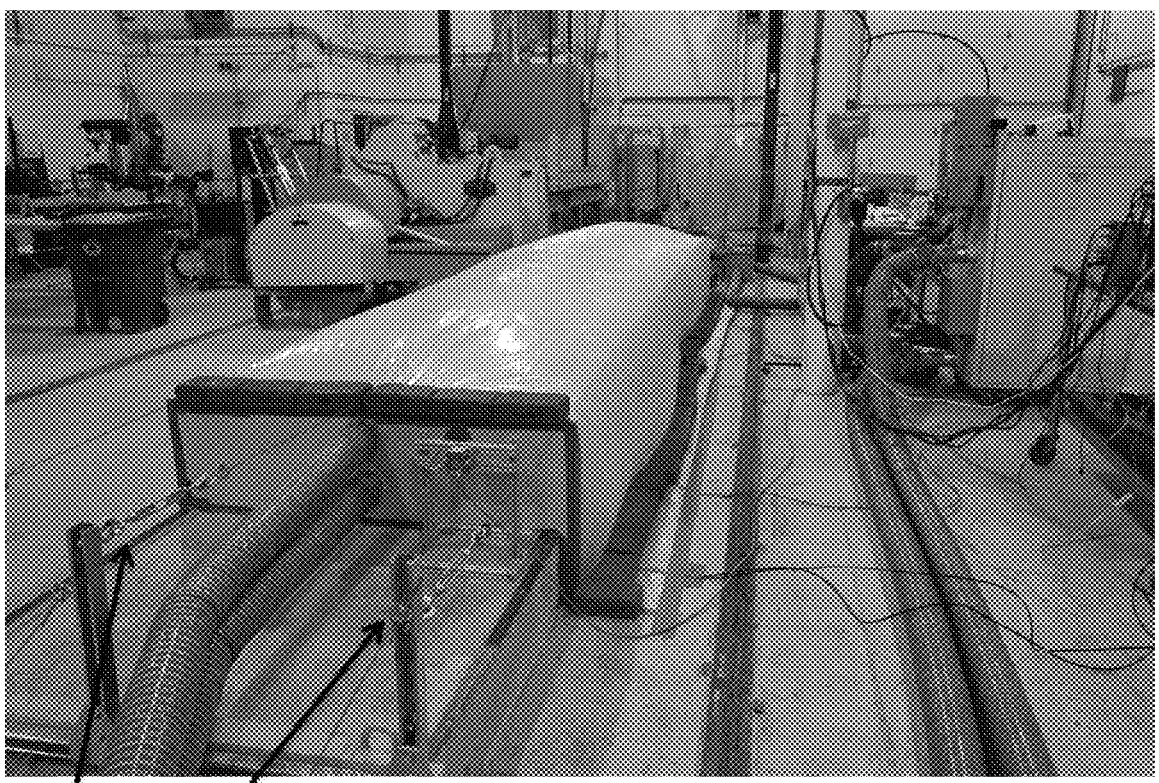
FIG. 39 is an image of a curing chamber assembly including a cable supported polymer sheet canopy having a flat topped end wall with inlet and outlet ducts at each end.

FIG. 39 is an image of a curing chamber assembly including a cable supported polymer sheet canopy having a flat topped end wall with inlet and outlet ducts at each end. This embodiment included weights and a tape seal to seal the cove, a pressure sensor, gas recirculation and water removal by rotary desiccant dryer.

Figure 40:
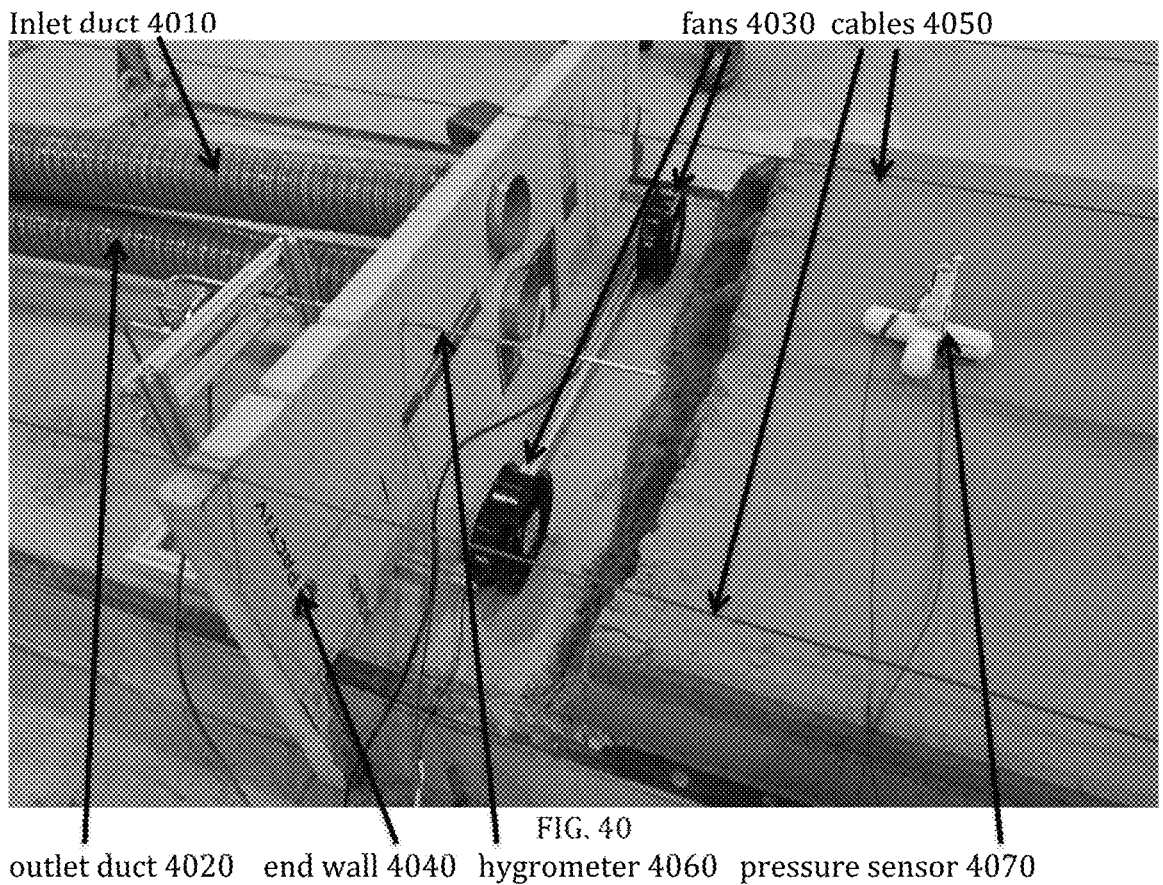
FIG. 40 is an image of a curing chamber assembly end wall showing an inlet duct, an outlet duct, fans, canopy support cables, a pressure sensor and a hygrometer.

FIG. 40 is an image of a curing chamber assembly end wall showing an inlet duct, an outlet duct, fans, canopy support cables, a pressure sensor and a hygrometer.

Figure 41:
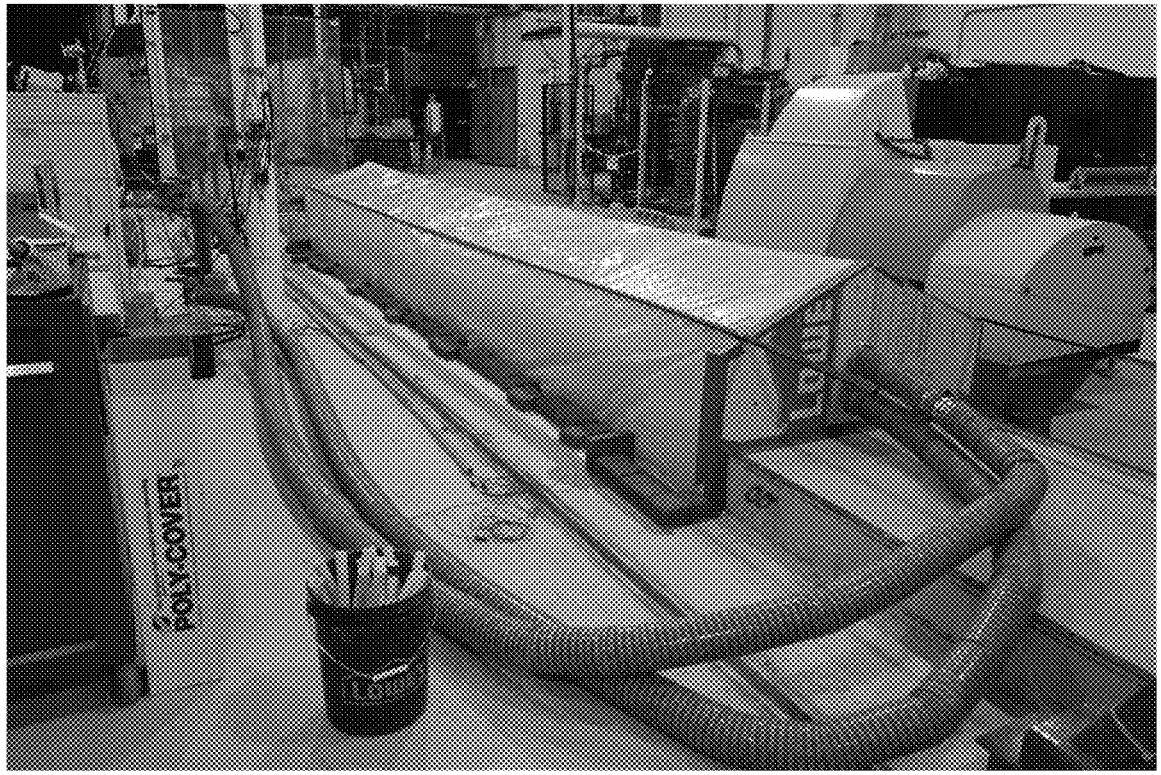
FIG. 41 is an image of a curing chamber assembly including a cable supported polymer sheet canopy having a gabled end wall, inlet and outlet ducts at each end, and a weight and tape seal.

FIG. 41 is an image of a curing chamber assembly including a cable supported polymer sheet canopy having a gabled end wall, inlet and outlet ducts at each end, and a weight and tape seal.

Figure 42:
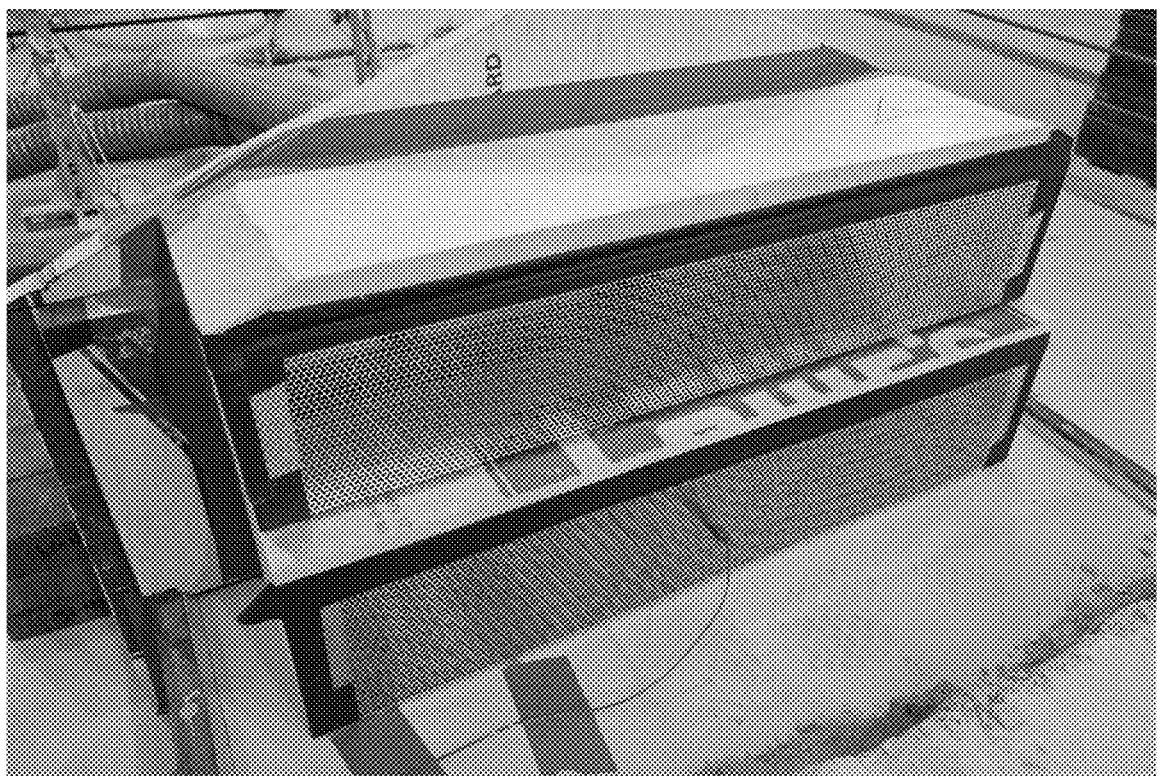
FIG. 42 is an image of a curing chamber assembly having a gabled end wall, inlet and outlet plena and a temperature probe.

FIG. 42 is an image of a curing chamber assembly having a gabled end wall, inlet and outlet plena and a temperature probe.

Figure 43:
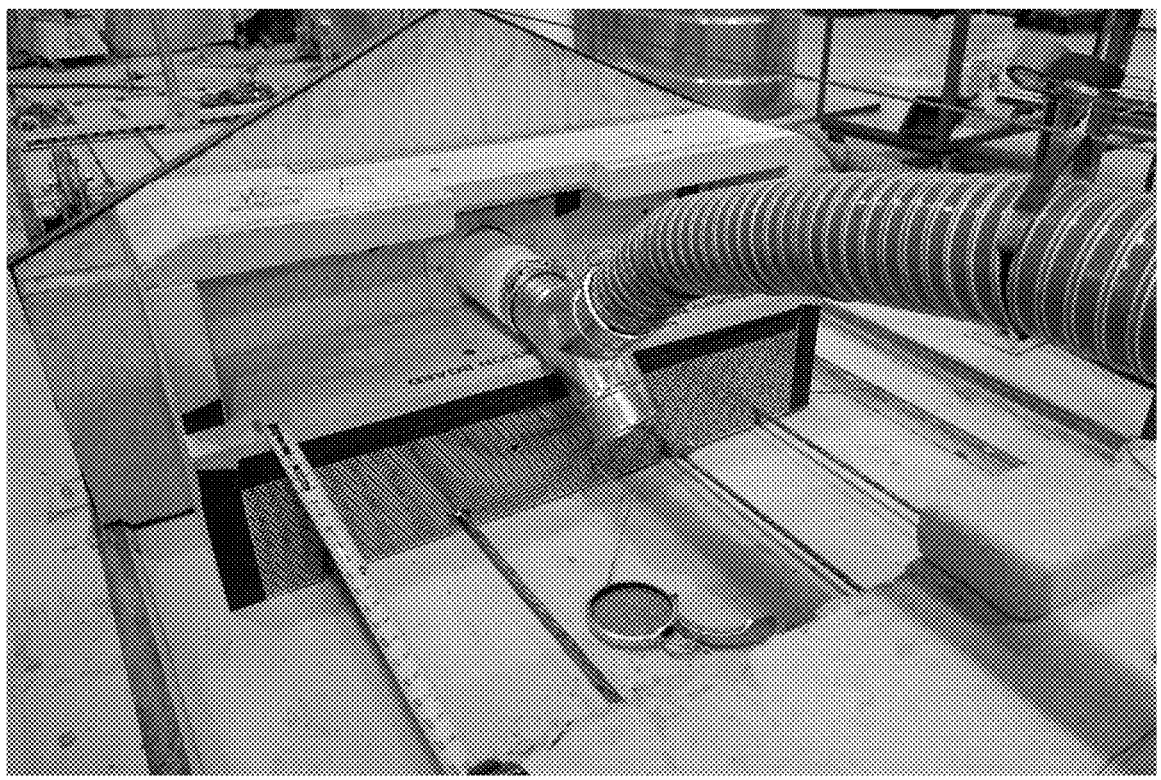
FIG. 43 is an image of a curing chamber end wall with outlet plenum and split duct inlet with one branch duct to distribute gas over length of slab and another branch to provide flow through hollow cores.

FIG. 43 is an image of a curing chamber end wall with outlet plenum and split duct inlet with one branch duct to distribute gas over length of slab and another branch to provide flow through hollow cores. Pretensioned cables for a hollow core slab are also shown.

Figure 44:
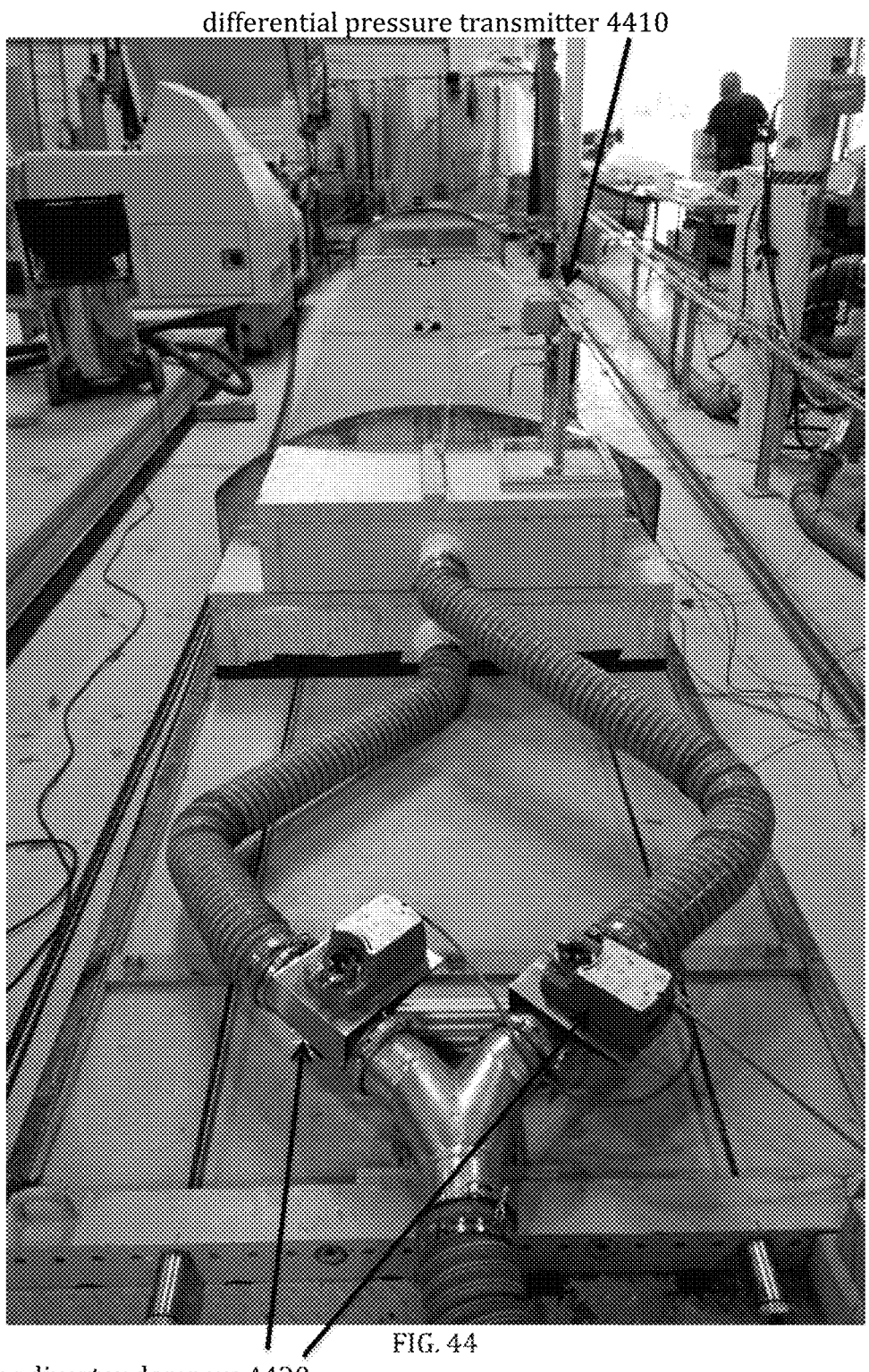
FIG. 44 is an image of a curing chamber end wall with a curved top.

FIG. 44 is an image of a curing chamber end wall with a curved top. Plena are provided outside the end wall with gas flow diverter dampers 4420, a shared inlet/outlet duct, a differential pressure transmitter 4410 for $CO_2$ dosing, and pretension cables. Water removal is accomplished by a chilled water condenser.

Figure 45:
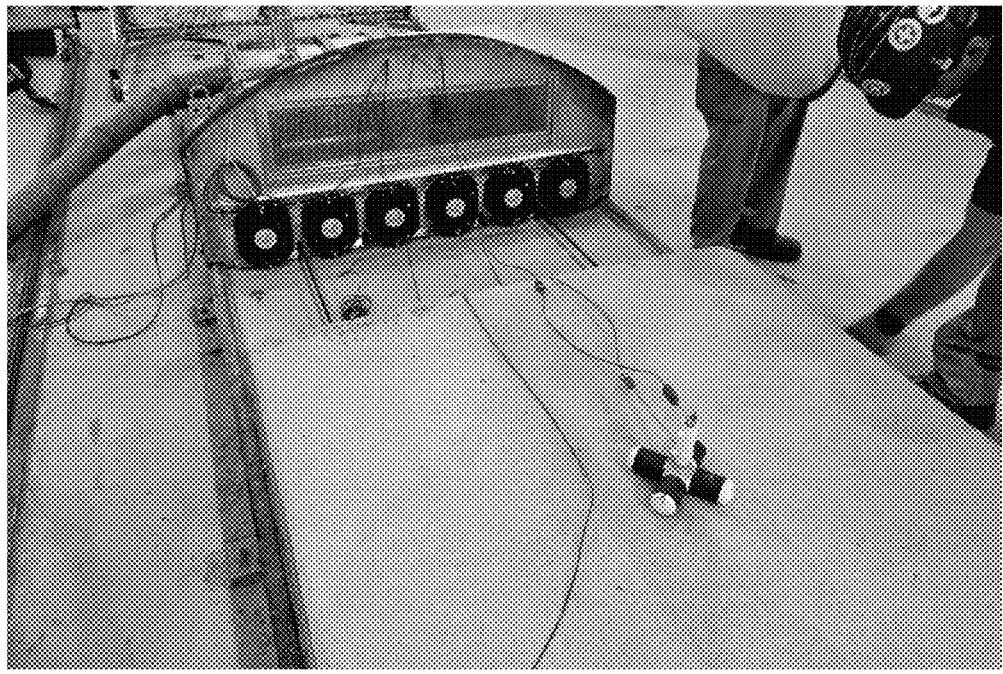
FIG. 45 is an image of a curing chamber end wall with a fan inside the top inlet plenum and a fan array feeding gas to an outlet plenum.

FIG. 45 is an image of a curing chamber end wall with a fan inside the top inlet plenum and a fan array feeding gas to an outlet plenum.

Figure 46:
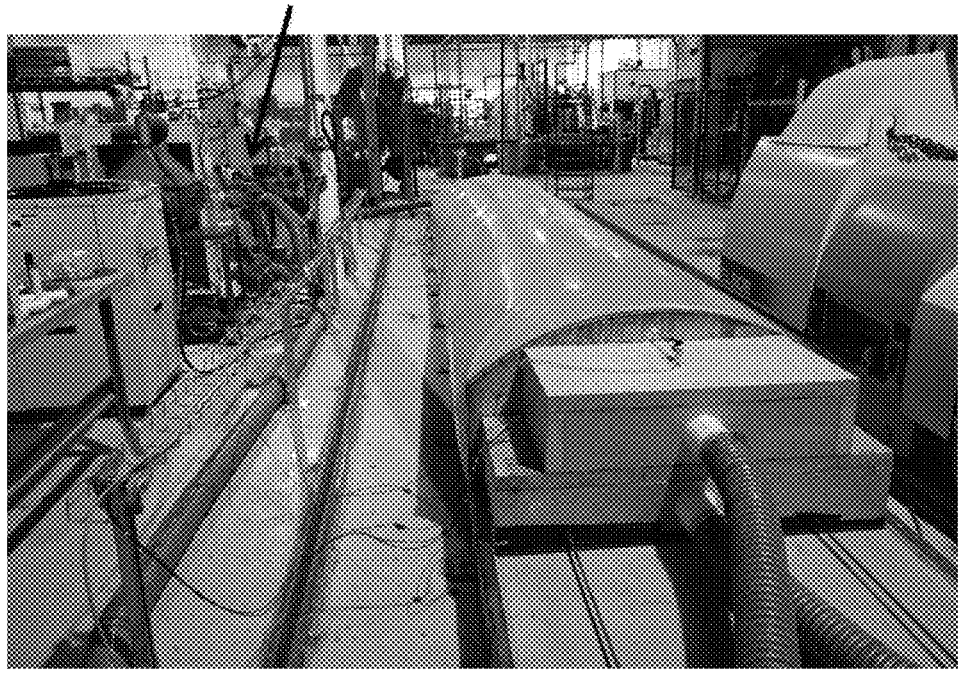
FIG. 46 is an image of a curing chamber assembly using an inflated polymer sheet and magnetic seals

FIG. 46 is an image of a curing chamber assembly using an inflated polymer sheet and magnetic seals. Diverter dampers 4610 (the four boxes halfway down the chamber on the left) are provided at the gas processing unit.

Figure 47:
FIG. 47 is an image of a polymer sheet with a single plenum at each end.

FIG. 47 is an image of a polymer sheet with a single plenum at each end. The chamber has a low profile flat top end wall, magnetic seals, and a $CO_2$ concentration monitor 4710.

Figure 48:
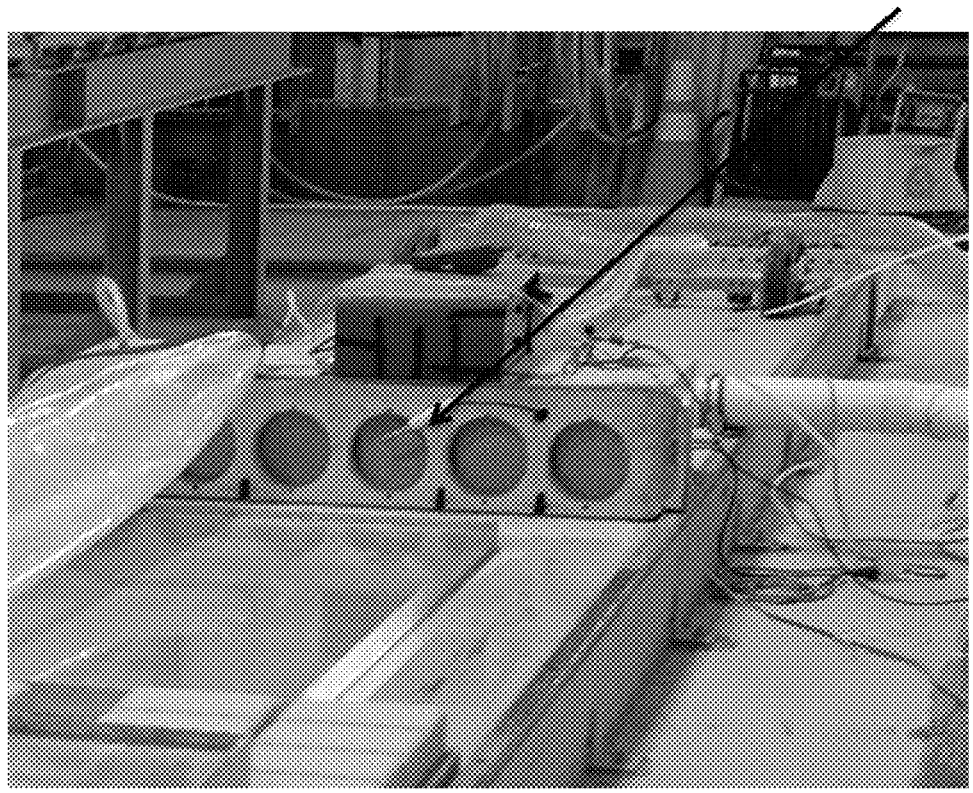
FIG. 48 is an image of a low profile end wall, including a plenum, a $CO_2$ monitor, and a humidity probe.

FIG. 48 is an image of a low profile end wall, including a plenum, a $CO_2$ monitor, and a humidity probe 4810.

Figure 49:
FIG. 49 is an image of a low profile end wall with integral heater and port for gas purging.

FIG. 49 is an image of a low profile end wall with integral heater and port for gas purging.

Figure 50:
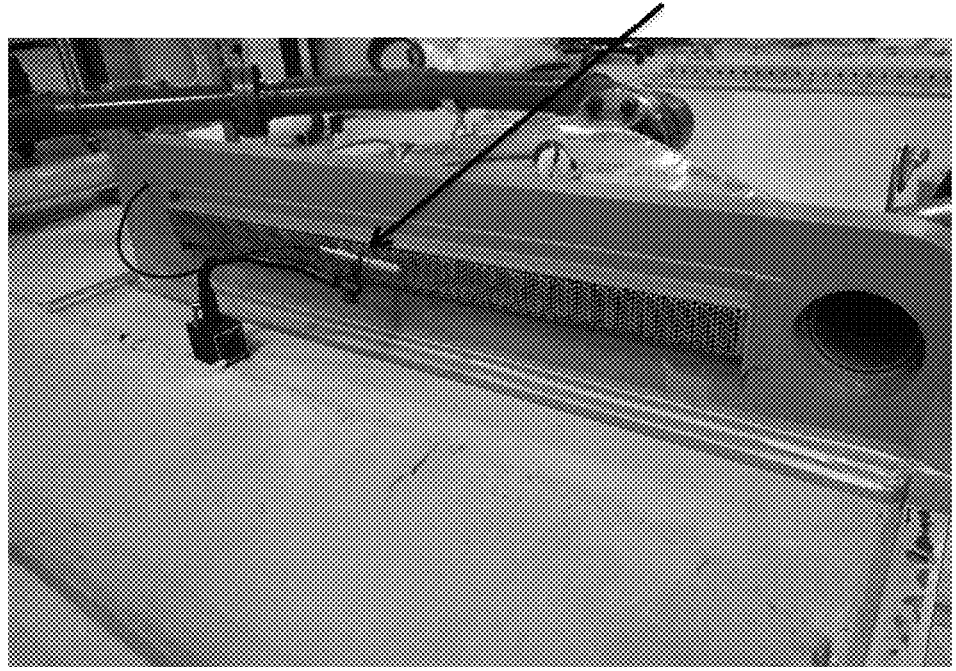
FIG. 50 is an image of a low profile end wall with an integral heater and plenum and a humidity/temperature probe.

FIG. 50 is an image of a low profile end wall with an integral heater and plenum and a humidity/temperature probe 5010.

Figure 51:
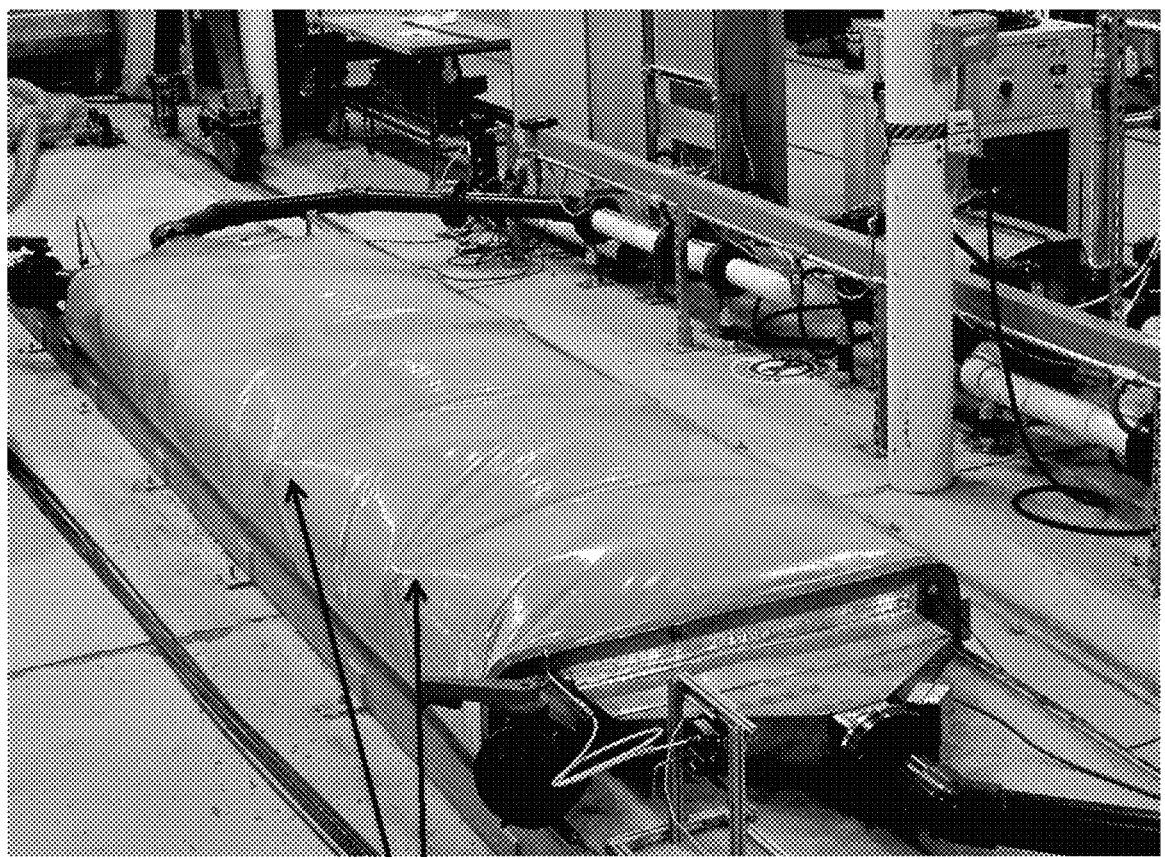
FIG. 51 is an image of a polymer canopy for a curing chamber with rib standoffs to improve gas flow along the sides of the slab.

FIG. 51 is an image of a polymer canopy for a curing chamber with rib standoffs 5110 to improve gas flow along the sides of the slab.

Figure 52:
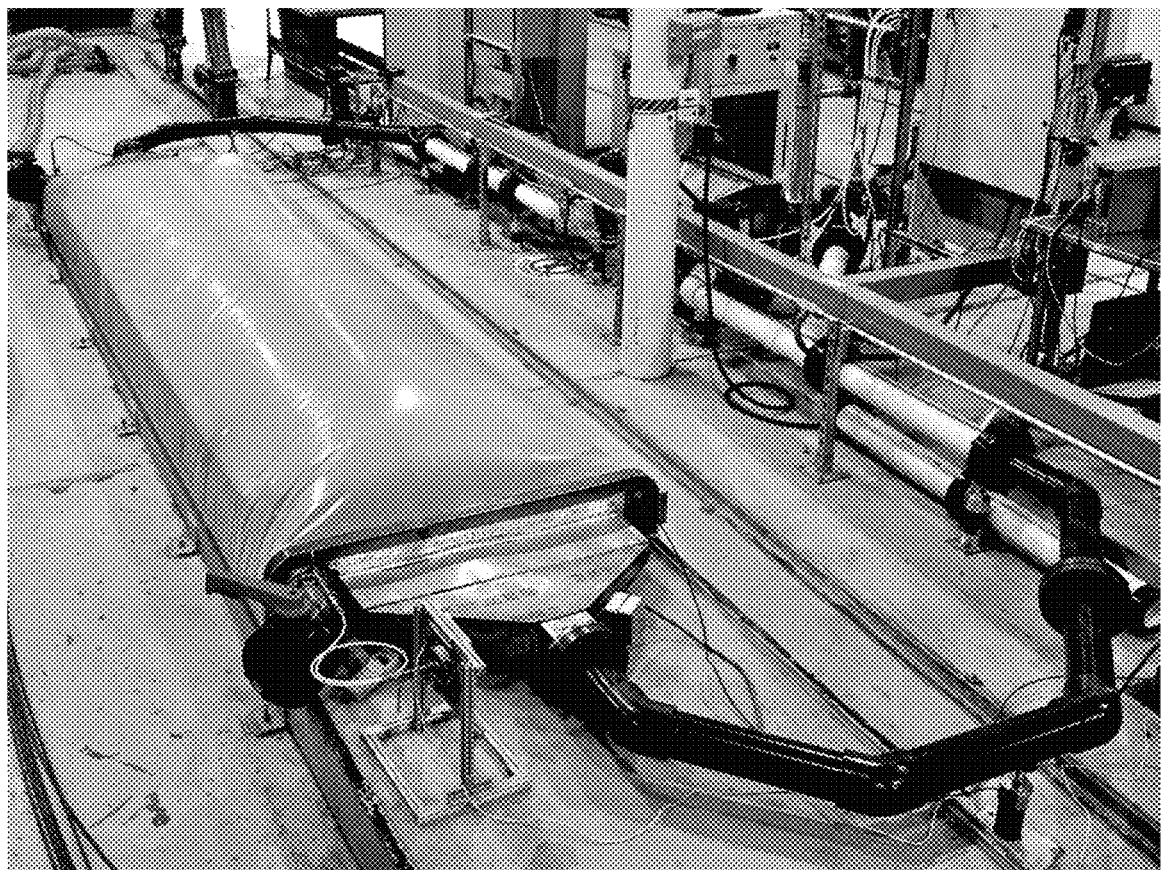
FIG. 52 is an image of a polymer canopy for a curing chamber that is supported without rib standoffs.

FIG. 52 is an image of a polymer canopy for a curing chamber that is supported without rib standoffs.

Figure 53:
FIG. 53 is an image of a rolled-up canopy that is ready for storage or transport to a field site.

FIG. 53 is an image of a rolled-up canopy that is ready for storage or transport to a field site.

Figure 54:
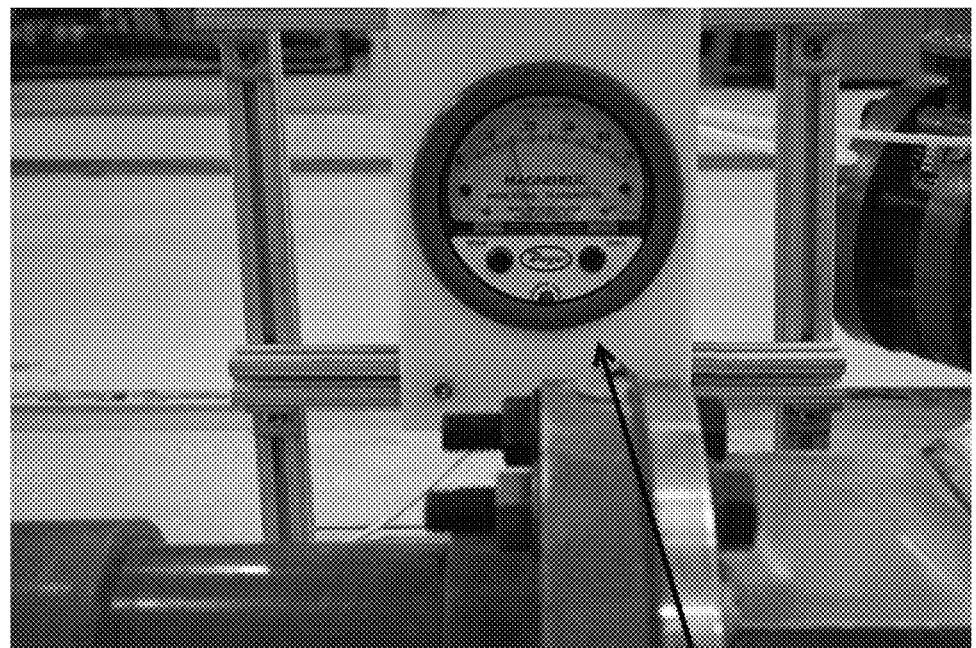
FIG. 54 is an image of a differential pressure transmitter.

FIG. 54 is an image of a differential pressure transmitter 5410.

Figure 55:
FIG. 55 is an image of a $CO_2$ concentration monitor.

FIG. 55 is an image of a $CO_2$ concentration monitor 5510.

Figure 56:
FIG. 56 is an image of gas temperature controllers.

FIG. 56 is an image of gas temperature controllers 5610.

Figure 57:
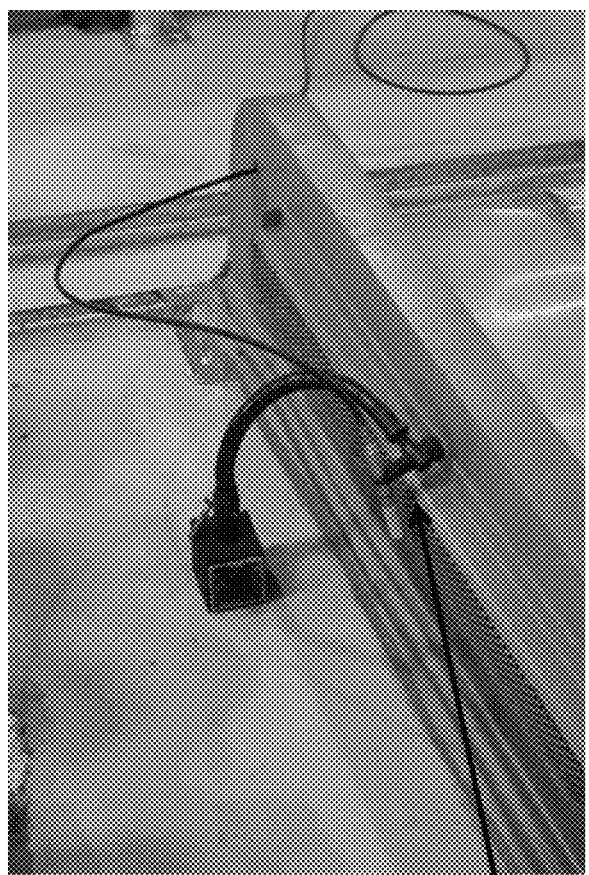
FIG. 57 is an image of a humidity/temperature sensor.

FIG. 57 is an image of a humidity/temperature sensor 5710.

Figure 58:
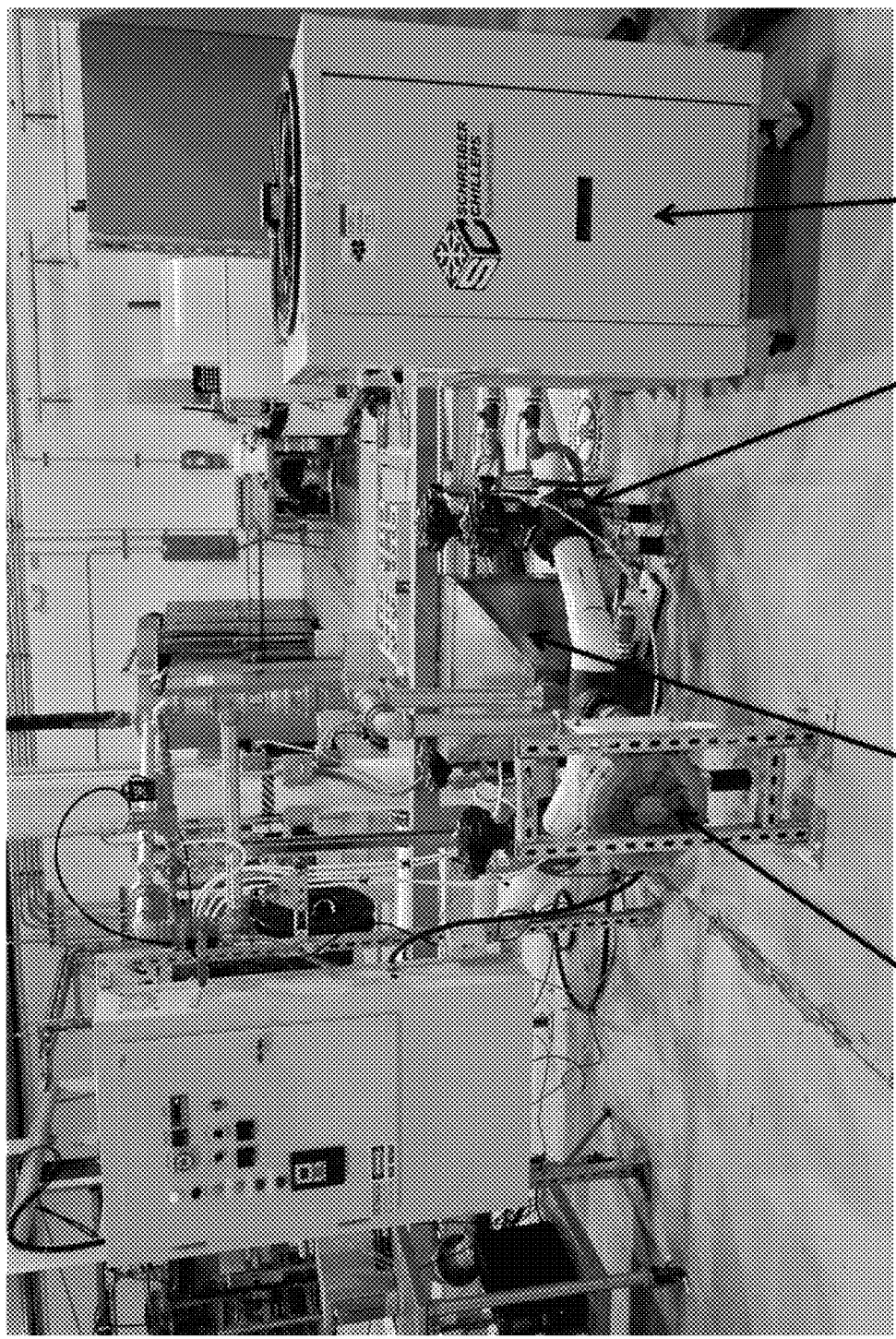
FIG. 58 is an image of a $CO_2$ gas conditioning system including a water condenser, a chiller, a blower, butterfly valves for controlling gas flow direction, electronics cabinets and a computer.

FIG. 58 is an image of a $CO_2$ gas conditioning system including a water condenser 5610, a chiller 5820, a blower 3830, butterfly valves 5840 for controlling gas flow direction, electronics cabinets and a computer.

Turning now to FIG. 59, there is shown a schematic diagram of an embodiment of a curing system for use with $CO_2$ Composite Material. In FIG. 59 there is a gas conditioning system 5902 and a curing chamber 5920 which are connected together by a gas delivery tube 5940 and a gas recovery tube 5942. The gas conditioning system 5902 includes elements of each of a source of carbon dioxide, a gas flow subsystem, a temperature control subsystem, a humidity control subsystem and a subsystem for controlling the curing process parameters. In the embodiment of FIG. 59, the gas delivery tube 5940 and the gas recovery tube 5942 can be any convenient size tabulation, for example a 6 inch diameter metal pipe. A gas source such as a $CO_2$ supply 5930, and, as needed, sources of other gases such as air and/or water vapor are provided. The gas delivery and conditioning system can include a controller 5916, such as a programmable logic controller (PLC) or another microprocessor-based controller, such as a general purpose programmable computer that can operate using a set of instructions recorded on a machine-readable medium. As illustrated in FIG. 59 a typical curing chamber 5920 can include a plenum 5922 that is configured to provide a gas atmosphere by way of one or more locations at which gas can be injected into the curing chamber to create a gas flow 5924 having desired properties such as flow velocity or flow patterns in various portions of the curing chamber 5920. The curing chamber in some embodiments will be as simple as an enclosure that can contain a CCM to be processed and process gas with an inlet and an outlet to allow the gas to be introduced and as needed removed. Additional details of such systems will be provided hereinafter.

In the embodiment of FIG. 59 there are provided a number of thermocouples or other temperature sensors (5904, 5904', 5904'', 5904''', 5904'''', collectively temperature sensors 5904) and a plurality of relative humidity sensors (5906, 5906', collectively relative humidity sensors 5906), which can be for example dry-bulb wet-bulb sensors that utilize the psychrometric ratios for carbon dioxide and water vapor or dipole polarization water vapor measurement instruments or chilled mirror hygrometers or capacitive humidity sensors.

In the embodiment shown in FIG. 59, the piping used to connect the gas conditioning system 5902 can be 8 inch pipe. Different sizes of heaters can be used to heat the gas provided to the curing chamber, which in FIG. 59 is illustrated as six 1,3 kW heaters (5914). As will be understood, in any particular system the precise capacities of the various components will be sized in relation to the intended amount of material to be cured in the curing chamber 5920.

The controller 5916 can receive data from the temperature sensors 5904 and the relative humidity sensors 5906, and can communicate bi-directionally (e.g., take data from and send commands to) the valves, the chiller (or cooler) 5910, the chiller (or cooler) heat exchanger 5912, the blower 5908, the heaters (5914) and the $CO_2$ supply 5930 so as to be able to log data as a function of time, make determinations regarding the state of curing of a load in the curing chamber 5920, and take corrective or predetermined actions so as to control the curing process. The controller 5916 can also receive commands from a user, display information to the user, and record data and the commands that may be issued from time to time so that a record of the curing process may be produced in machine-readable form for later use.

Definitions

Unless otherwise explicitly recited herein, any reference to an electronic signal or an electromagnetic signal (or their equivalents) is to be understood as referring to a non-volatile electronic signal or a non-volatile electromagnetic signal.

Recording the results from an operation or data acquisition, such as for example, recording results at a particular frequency or wavelength, is understood to mean and is defined herein as writing output data in a non-transitory manner to a storage element, to a machine-readable storage medium, or to a storage device. Non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. Unless otherwise explicitly recited, any reference herein to "record" or "recording" is understood to refer to a non-transitory record or a non-transitory recording.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use, so that the result can be displayed, recorded to a non-volatile memory, or used in further data processing or analysis.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A curing apparatus for material that cures by reaction with a gaseous reagent, comprising:
a housing said housing having a plurality of ports, each of said plurality of ports configured to allow gas to enter or exit, at least one of said ports being an inlet and at least one of said ports being an outlet, said housing configured to contain a material to be cured by reaction with a gaseous reagent, said housing configured to permit the control for said gaseous reagent of at least one of a flow rate, a partial pressure, an inlet temperature, an outlet temperature, a gas composition at said inlet and a gas composition at said outlet;
a water supply line for providing water vapor into the housing; and
a gas conditioning system in communication with the housing, said gas conditioning system comprising a controller and sensors configured to permit the control for the gaseous reagent of at least, one of a flow rate, a partial pressure, and/or an inlet temperature, said gas conditioning system comprising a gas flow oscillator to control a gaseous reagent flow direction in said housing, said gas flow direction being defined as a flow of said gaseous reagent within said housing from a first one or more of said plurality of ports where the gaseous reagent is introduced into the housing to another one or more of said plurality of ports where the gaseous reagent is withdrawn from the housing, said gas flow oscillator configured to repeatedly reverse said gaseous reagent flow direction from time to time.

2. The curing apparatus for material that cures by reaction with a gaseous reagent of claim 1, wherein said gaseous reagent is $CO_2$.

3. The curing apparatus for material that cures by reaction with a gaseous reagent of claim 1, further comprising a heated bed configured to support said material to be cured by reaction with a gaseous reagent.

4. The curing apparatus for material that cures by reaction with a gaseous reagent of claim 1, wherein said housing comprises a membrane material, said membrane material being impervious to said gaseous reagent.

5. The curing apparatus for material that cures by reaction with a gaseous reagent of claim 1, wherein said housing is supported by a pressure of said gaseous reagent.

6. The curing apparatus for material that cures by reaction with a gaseous reagent of claim 1, wherein said housing comprises support cables.

7. The curing apparatus for material that cures by reaction with a gaseous reagent of claim 1, wherein said housing comprises ribs.

8. The curing apparatus for material that cures by reaction with a gaseous reagent of claim 1, further comprising a heater located at a selected one of said inlet and said outlet.

9. The curing apparatus for material that cures by reaction with a gaseous reagent of claim 1, further comprising a water condenser configured to remove water vapor from said gaseous reagent.

10. The curing apparatus for material that cures by reaction with a gaseous reagent of claim 1, wherein said gas conditioning system includes valves configured to control said direction of flow of said gaseous reagent.

11. The curing apparatus for material that cures by reaction with a gaseous reagent of claim 1, further comprising a hygrometer.

12. The curing apparatus for material that cures by reaction with a gaseous reagent of claim 1, further comprising a humidity measuring device.

13. The curing apparatus for material that cures by reaction with a gaseous reagent of claim 1, further comprising at least one of a $CO_2$ flow meter and a $CO_2$ concentration meter.

14. The curing apparatus for material that cures by reaction with a gaseous reagent of claim 1, further comprising a temperature measurement device.

15. The curing apparatus for material that cures by reaction with a gaseous reagent of claim 1, wherein said temperature measurement device is a selected one of a thermocouple, a thermometer and an RTD.

16. The curing apparatus for material that cures by reaction with a gaseous reagent of claim 1, wherein the housing maintains a pressure in a range of from ambient atmospheric pressure to 50 psi above ambient atmospheric pressure.

* * * * *